(12) United States Patent
Fitting

(10) Patent No.: US 8,230,464 B2
(45) Date of Patent: Jul. 24, 2012

(54) DOCSIS MAC CHIP ADAPTED

(75) Inventor: Robert Arthur Fitting, Carlsbad, CA (US)

(73) Assignee: ViaSat, Inc., Carlsbad, CA (US)

( * ) Notice: Subject to any disclaimer, the term of this patent is extended or adjusted under 35 U.S.C. 154(b) by 725 days.

(21) Appl. No.: 12/411,312

(22) Filed: Mar. 25, 2009

(65) Prior Publication Data

US 2010/0017826 A1    Jan. 21, 2010

Related U.S. Application Data

(63) Continuation-in-part of application No. PCT/US2007/079577, filed on Sep. 26, 2007.

(60) Provisional application No. 60/828,038, filed on Oct. 3, 2006, provisional application No. 60/828,045, filed on Oct. 3, 2006, provisional application No. 60/828,046, filed on Oct. 3, 2006, provisional application No. 60/828,048, filed on Oct. 3, 2006, provisional application No. 60/828,032, filed on Oct. 3, 2006, provisional application No. 60/828,034, filed on Oct. 3, 2006, provisional application No. 60/828,035, filed on Oct. 3, 2006, provisional application No. 60/827,038, filed on Sep. 26, 2006.

(51) Int. Cl.
*H04N 7/20* (2006.01)
*H04N 7/173* (2011.01)
*H04N 7/16* (2011.01)

(52) U.S. Cl. .............. 725/66; 725/68; 725/70; 725/131; 725/151

(58) Field of Classification Search .................. None
See application file for complete search history.

(56) References Cited

U.S. PATENT DOCUMENTS

| | | | |
|---|---|---|---|
| 5,594,490 A * | 1/1997 | Dawson et al. | 725/67 |
| 5,867,208 A * | 2/1999 | McLaren | 725/139 |
| 5,898,681 A | 4/1999 | Dutta | |
| 5,937,331 A * | 8/1999 | Kalluri et al. | 725/146 |
| 6,125,261 A | 9/2000 | Anselmo et al. | |
| 6,377,561 B1 | 4/2002 | Black et al. | |

(Continued)

FOREIGN PATENT DOCUMENTS

WO    WO 2008/060760 A2    5/2008

OTHER PUBLICATIONS

Non-Final Office Action of Sep. 16, 2011 for U.S. Appl. No. 12/411,738, 14 pages.

(Continued)

*Primary Examiner* — Brian Pendleton
*Assistant Examiner* — Ryan Stronczer
(74) *Attorney, Agent, or Firm* — Kilpatrick Townsend & Stockton LLP

(57) ABSTRACT

Disclosed in one embodiment is the use of a terrestrial media access control (MAC) chip or circuit in a satellite modem. The satellite modem comprises a satellite receiver, a satellite transmitter, an adaptor, and a terrestrial MAC chip. The adapter translates between the satellite physical layer and the physical layer of the terrestrial MAC chip. Protocols, messaging and signaling is spoofed for the terrestrial MAC chip such that it can be integrated into a satellite system. The received satellite signal is filtered so select one or more sub-channels that are fed to the terrestrial MAC chip. The terrestrial MAC chip could use a variety of physical layers, for example, Data Over Cable Service Interface Specifications (DOCSIS) or World Interoperability for Microwave Access (WiMAX).

24 Claims, 35 Drawing Sheets

U.S. PATENT DOCUMENTS

| | | | |
|---|---|---|---|
| 6,487,183 B1 | 11/2002 | Lo et al. | |
| 6,511,020 B2 | 1/2003 | Higgins | |
| 6,735,188 B1 | 5/2004 | Becker et al. | |
| 6,847,626 B1 | 1/2005 | Carneal et al. | |
| 6,865,609 B1 | 3/2005 | Gubbi et al. | |
| 6,937,580 B2 | 8/2005 | Heatwole et al. | |
| 6,985,725 B2 | 1/2006 | Berger | |
| 7,027,454 B2 | 4/2006 | Dent | |
| 7,088,678 B1* | 8/2006 | Freed et al. | 370/230 |
| 7,113,743 B2 | 9/2006 | Karabinis | |
| 7,142,809 B1 | 11/2006 | Godwin | |
| 7,149,526 B2 | 12/2006 | Karabinis et al. | |
| 7,203,204 B2 | 4/2007 | Carneal et al. | |
| 7,336,967 B2 | 2/2008 | Kelly et al. | |
| 7,408,892 B2* | 8/2008 | Dale et al. | 370/316 |
| 7,415,001 B2 | 8/2008 | Naguleswaran et al. | |
| 7,450,914 B2 | 11/2008 | Valdivia et al. | |
| 7,508,785 B2* | 3/2009 | Dale et al. | 370/322 |
| 7,650,379 B2* | 1/2010 | Hart et al. | 709/203 |
| 7,738,596 B2 | 6/2010 | Lin et al. | |
| 7,894,510 B2* | 2/2011 | Miller et al. | 375/219 |
| 7,995,515 B2 | 8/2011 | Thesling | |
| 2002/0019984 A1* | 2/2002 | Rakib | 725/111 |
| 2002/0021678 A1 | 2/2002 | Heatwole et al. | |
| 2002/0026643 A1* | 2/2002 | Ewen et al. | 725/109 |
| 2002/0031120 A1 | 3/2002 | Rakib | |
| 2002/0032003 A1 | 3/2002 | Avitzour et al. | |
| 2003/0027522 A1 | 2/2003 | Valdivia et al. | |
| 2003/0073435 A1 | 4/2003 | Thompson et al. | |
| 2004/0022307 A1* | 2/2004 | Dale et al. | 375/222 |
| 2004/0023658 A1 | 2/2004 | Karabinis et al. | |
| 2004/0157560 A1 | 8/2004 | Yamasaki | |
| 2004/0172657 A1* | 9/2004 | Phillips et al. | 725/110 |
| 2005/0055720 A1* | 3/2005 | Atad et al. | 725/68 |
| 2005/0124289 A1* | 6/2005 | Coffin | 455/3.02 |
| 2005/0190947 A1* | 9/2005 | Dulac | 382/100 |
| 2005/0226418 A1 | 10/2005 | Lee et al. | |
| 2006/0053436 A1* | 3/2006 | Allwein et al. | 725/1 |
| 2006/0171418 A1 | 8/2006 | Casini et al. | |
| 2006/0271988 A1* | 11/2006 | Chapman et al. | 725/111 |
| 2007/0214482 A1* | 9/2007 | Nguyen | 725/91 |
| 2007/0256001 A1* | 11/2007 | Suzuki et al. | 714/774 |
| 2009/0081946 A1 | 3/2009 | Dankberg et al. | |
| 2009/0092037 A1 | 4/2009 | Hadad | |
| 2009/0129334 A1 | 5/2009 | Ma et al. | |
| 2009/0138336 A1* | 5/2009 | Ashley et al. | 705/10 |
| 2009/0187934 A1* | 7/2009 | Norman | 725/14 |
| 2009/0290536 A1 | 11/2009 | Eidenschink et al. | |
| 2010/0142437 A1* | 6/2010 | Gin et al. | 370/316 |
| 2010/0262895 A1* | 10/2010 | Dale et al. | 714/786 |
| 2010/0278098 A1* | 11/2010 | Lin et al. | 370/316 |

OTHER PUBLICATIONS

Notice of Allowance of Jan. 11, 2012 for U.S. Appl. No. 12/411,738, 18 pages.

* cited by examiner

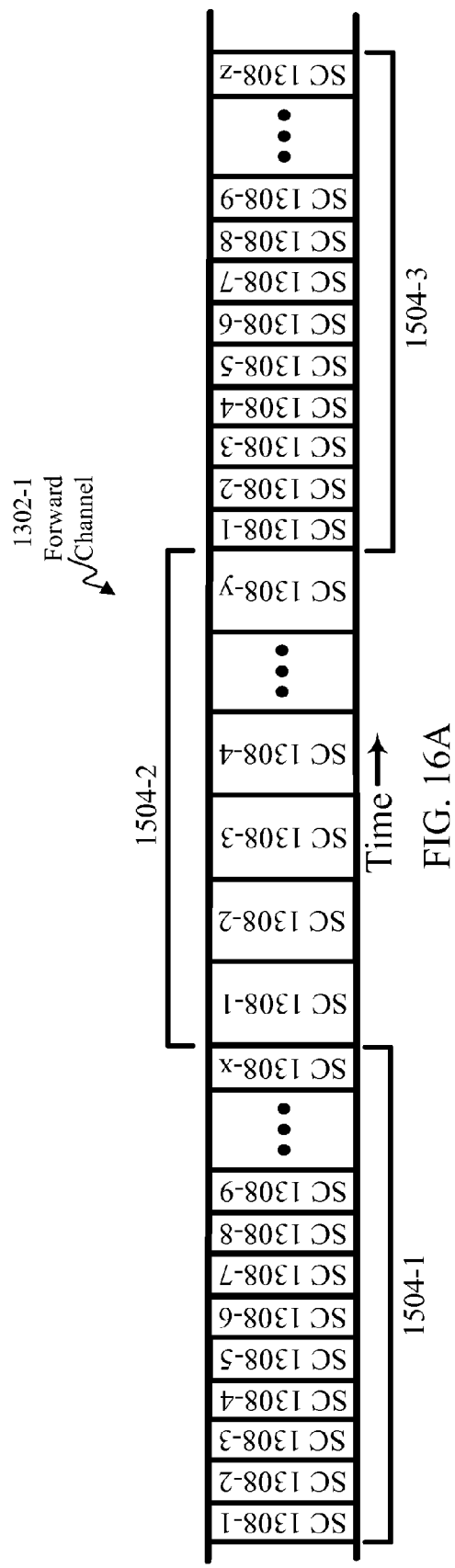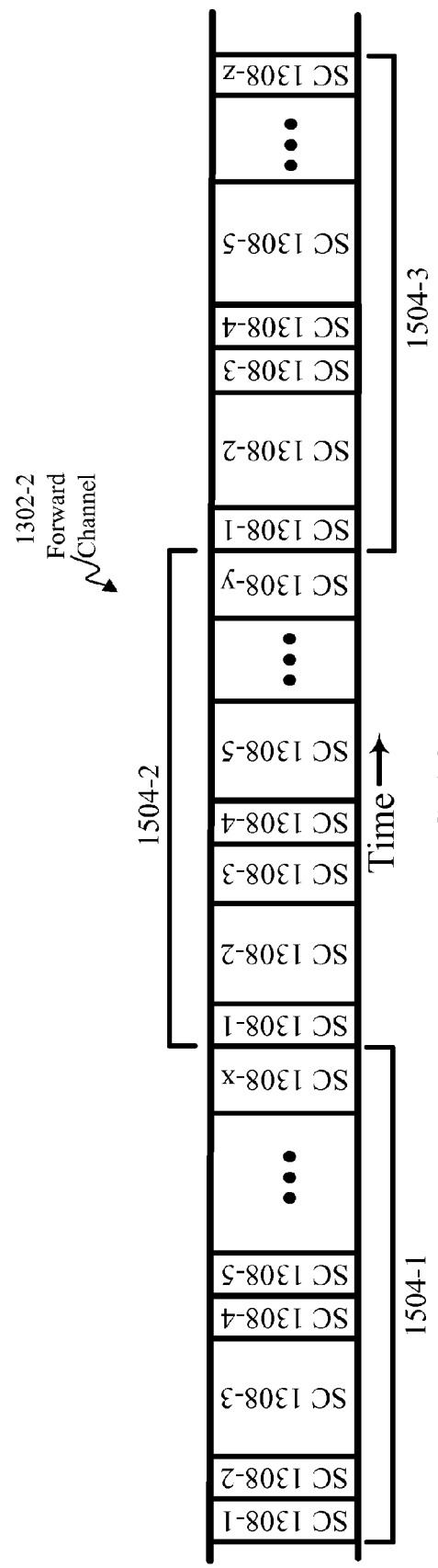

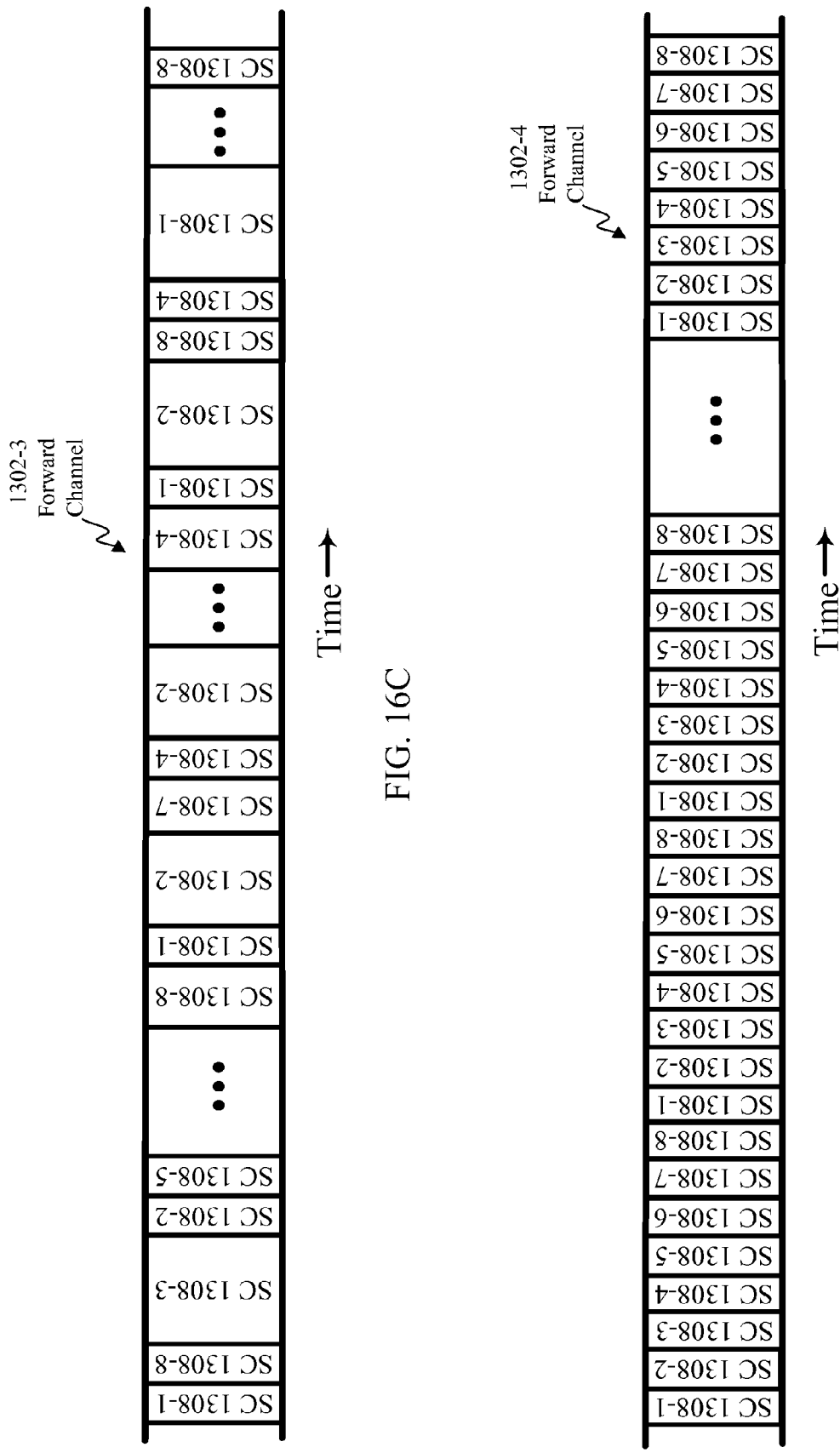

DOCSIS MAC CHIP ADAPTED

This is a continuation of PCT Application No. PCT/US07/79577 entitled "Improved Spot Beam Satellite Ground Systems" and filed on Sep. 26, 2007, which is a non-provisional of:

Provisional Application Ser. No. 60/828,038 entitled "DOCSIS MAC Chip Adapted" and filed on Oct. 3, 2006;

Provisional Application Ser. No. 60/828,045 entitled "Satellite Downstream Virtual Channels" and filed on Oct. 3, 2006;

Provisional Application Ser. No. 60/828,046 entitled "Virtual Channel Load Balancing" and filed on Oct. 3, 2006;

Provisional Application Ser. No. 60/828,048 entitled "Satellite Upstream/Downstream Virtual Channel Architecture" and filed on Oct. 3, 2006;

Provisional Application Ser. No. 60/828,032 entitled "Multi-User Detection in Satellite Return Link" and filed on Oct. 3, 2006;

Provisional Application Ser. No. 60/828,034 entitled "Multi-Rate Downstreaming in Multiple Virtual Channel Environment" and filed on Oct. 3, 2006;

Provisional Application Ser. No. 60/828,035 entitled "Satellite System Business Method" and filed on Oct. 3, 2006; and Provisional Application Ser. No. 60/827,038 entitled "Satellite Architecture and Piggy-back Satellite Payload" and filed on Sep. 26, 2006;

each of which are hereby expressly incorporated by reference in their entirety for all purposes.

This application expressly incorporates by reference each of the following co-pending patent applications in their entirety for all purposes:

PCT Application Serial No. PCT/US07/79561 entitled "Multi-Service Provider Subscriber Authentication" and filed on Sep. 26, 2007;

PCT Application Serial No. PCT/US07/79565 entitled "Large Packet Concatenation In Satellite Communication System" and filed on Sep. 26, 2007;

PCT Application Serial No. PCT/US07/79569 entitled "Upfront Delayed Concatenation In Satellite Communication System" and filed on Sep. 26, 2007;

PCT Application Serial No. PCT/US07/79571 entitled "Map-Trigger Dump Of Packets In Satellite Communication System" and filed on Sep. 26, 2007;

PCT Application Serial No. PCT/US07/79563 entitled "Web/Bulk Transfer Preallocation Of Upstream Resources In A Satellite Communication System" and filed on Sep. 26, 2007;

PCT Application Serial No. PCT/US07/79567 entitled "Improved Spot Beam Satellite Systems" and filed on Sep. 26, 2007;

PCT Application Serial No. PCT/US07/79517 entitled "Downstream Waveform Sub-Channelization For Satellite Communications" and filed on Sep. 26, 2007;

PCT Application Serial No. PCT/US07/79523 entitled "Packet Reformatting For Downstream Links" and filed on Sep. 26, 2007; and PCT Application Serial No. PCT/US07/79541 entitled "Upstream Resource Allocation For Satellite Communications" and filed on Sep. 26, 2007.

FIELD OF THE INVENTION

The present invention relates to wireless communications in general and, in particular, to a broadband satellite communications network.

BACKGROUND OF THE INVENTION

Consumer broadband satellite services are gaining traction in North America with the start up of star network services using Ka-band satellites. While such first generation satellite systems may provide multi-gigabit per second (Gbps) per satellite overall capacity, the design of such systems inherently limits the number of customers that may be adequately served. Moreover, the fact that the capacity is split across numerous coverage areas further limits the bandwidth to each subscriber.

While existing designs have a number of capacity limitations, the demand for such broadband services continues to grow. The past few years have seen strong advances in communications and processing technology. This technology, in conjunction with selected innovative system and component design, may be harnessed to produce a novel satellite communications system to address this demand.

SUMMARY OF THE INVENTION

Disclosed in one embodiment is the use of a terrestrial media access control (MAC) chip or circuit in a satellite modem. The satellite modem comprises a satellite receiver, a satellite transmitter, an adaptor, and a terrestrial MAC chip. The adapter translates between the satellite physical layer and the physical layer of the terrestrial MAC chip. Protocols, messaging and signaling is spoofed for the terrestrial MAC chip such that it can be integrated into a satellite system. The received satellite signal is filtered so select one or more sub-channels that are fed to the terrestrial MAC chip. The terrestrial MAC chip could use a variety of physical layers, for example, Data Over Cable Service Interface Specifications (DOCSIS) or World Interoperability for Microwave Access (WiMAX).

In another embodiment, a satellite modem for transmitting and receiving information with a satellite link is disclosed. The satellite modem includes a satellite receiver, a satellite transmitter, a terrestrial cable modem, and an adapter. The satellite receiver receives a receive satellite signal. The satellite transmitter transmits a transmit satellite signal. The adapter is communicatively coupled with the satellite receiver, the satellite transmitter and the terrestrial cable modem. The adapter is configured to filter a sub-channel of information from a signal from the satellite receiver for further processing, translate signaling and/or protocol between the satellite receiver and the terrestrial cable modem, and translate signaling and/or protocol between the terrestrial cable modem and the satellite transmitter.

In yet another embodiment, a satellite modem for transmitting and receiving information with a satellite link is disclosed. The satellite modem includes a satellite receiver, a satellite transmitter, a terrestrial cable modem, and means. The satellite receiver receives a receive satellite signal. The satellite transmitter transmits a transmit satellite signal. The means is communicatively coupled with the satellite receiver, the satellite transmitter and the terrestrial cable modem. The means is used for filtering a sub-channel of information from a signal from the satellite receiver for further processing, translating signaling and/or protocol between the satellite receiver and the terrestrial cable modem, and translating signaling and/or protocol between the terrestrial cable modem and the satellite transmitter.

In still another embodiment, a method for receiving information with a satellite link is disclosed. A satellite signal, coupled to an antenna, is received at a satellite receiver. The satellite signal is processed to produce a data stream from information sent over the satellite link. A sub-channel of the data stream is produced from a filter to form a filtered data stream. The filtered data stream is delivered to a terrestrial cable modem.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures:

FIGS. 16A, 16B, 16C, and 16D depict diagrams of embodiments of a physical forward channel;

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is being understood that various changes may be made in the function and arrangement of elements without departing from the spirit and scope as set forth in the appended claims.

Figure 1:
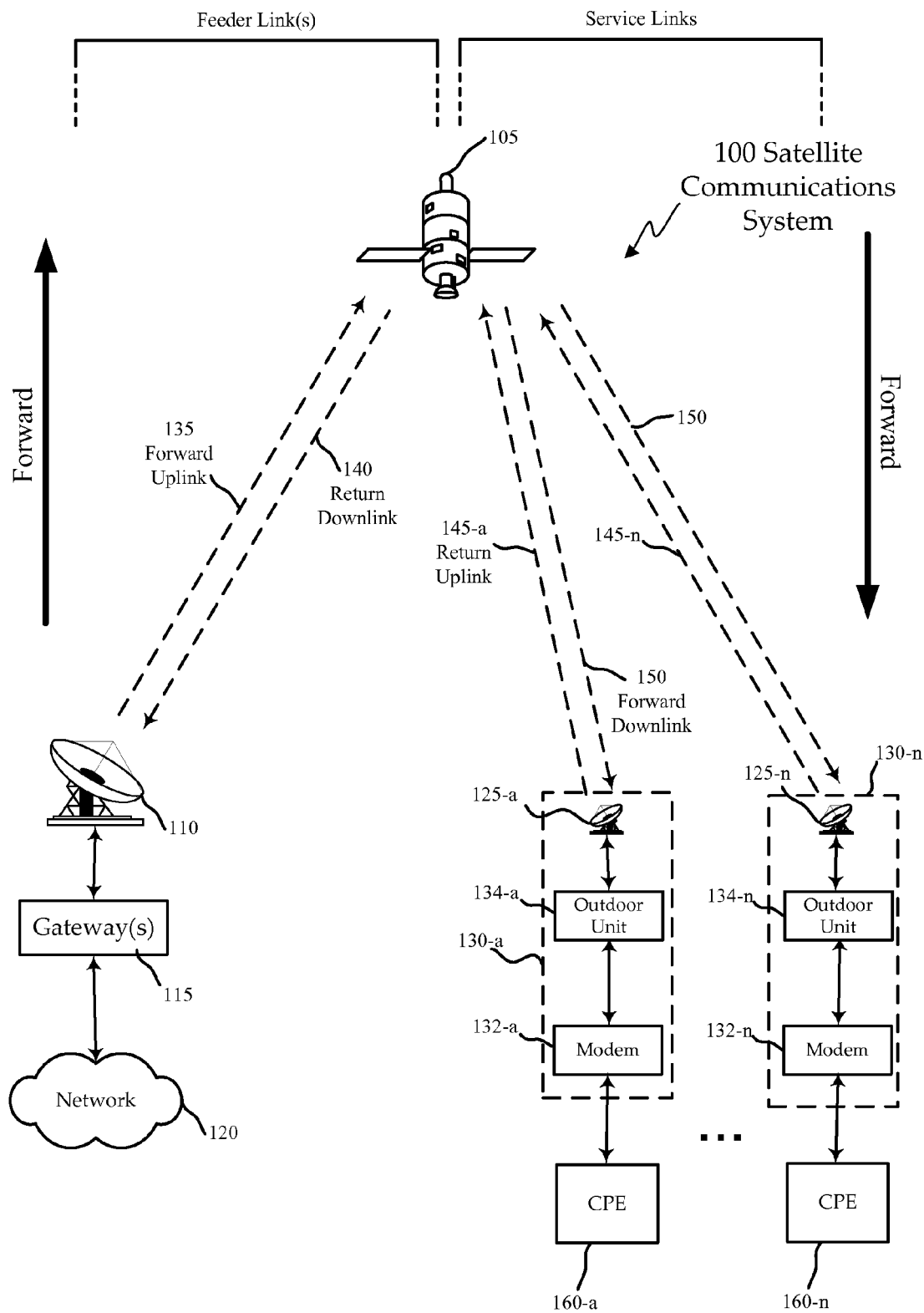
FIG. 1 depicts a block diagram of an embodiment of an exemplary satellite communications system.

FIG. 1 is a block diagram of an exemplary satellite communications system 100 configured according to various embodiments of the invention. The satellite communications system 100 includes a network 120, such as the Internet, interfaced with one or more gateways 115 that is configured to communicate with one or more subscriber terminals 130, via a satellite 105. The gateway 115 is sometimes referred to as a hub or ground station. Subscriber terminals 130 are sometimes called modems, satellite modems or user terminals. Although the communications system 100 is illustrated as a geostationary satellite 105 based communication system 100, it should be noted that various embodiments described herein are not limited to use in geostationary satellite based systems, for example some embodiments could be low earth orbit (LEO) satellite based systems.

A satellite communications system 100 applicable to various embodiments of the invention is broadly set forth herein. In this embodiment, there is a predetermined amount of frequency spectrum available for transmission. The feeder links 135, 140 may use the same or overlapping frequencies with the service links 145, 150 or could use different frequencies. The gateways 115 could be placed outside the service spot beams 205 when frequencies are reused.

In this embodiment, approximately 2 gigahertz (GHz) of bandwidth is used, comprising four 300 megahertz (MHz) bands of continuous spectrum. Employment of dual-circular polarization results in usable frequency comprising eight 300 MHz non-overlapping bands with 4 GHz of total usable bandwidth. This particular embodiment employs a multi-beam satellite 105 with physical separation between the gateways 115 and service spot beams 205, and is configured to permit reuse of the frequency on the various links 135, 140, 145, 150. A single Traveling Wave Tube Amplifier (TWTA) is used for each service link spot beam 205 on the downstream downlink 150, and each TWTA is operated at full saturation for maximum efficiency. A single wideband carrier signal, for example using one of the 300 MHz bands of frequency in its entirety, fills the entire bandwidth of the TWTA, thus allowing a minimum number of space hardware elements in this embodiment. Spotbeam size and TWTA power may be optimized to achieve maximum flux density on the earth's surface of 118 decibel-watts per meter squared per megahertz (dbW/$m^2$/MHz). Thus, assuming 2 bits per second per hertz (bits/s/Hz), there is approximately 1 Gbps of available bandwidth per spot beam.

The network 120 may be any type of network and can include, for example, the Internet, an Internet Protocol (IP) network, an intranet, a wide-area network ("WAN"), a local-area network ("LAN"), a virtual private network, a fiber optical network, the Public Switched Telephone Network ("PSTN"), and/or any other type of network supporting data communication between devices described herein, in different embodiments. The network 120 may include both wired and wireless connections, containing optical links. As illustrated in a number of embodiments, the network may connect the gateway 115 with other gateways (not pictured), which are also in communication with the satellite 105.

The gateway 115 is sometimes referred to as a hub or ground station. The gateway 115 services the feeder links 135, 140 to and from the satellite 105. Although only one gateway 115 is shown, this embodiment has a number of gateways all coupled to the network 120, for example, sixteen, twenty or forty gateways. The gateway 115 schedules traffic to the satellite modems 132, although other embodiments could perform scheduling in other parts of the satellite communications system 100. The gateway 115 may be configured to receive data and information directed to one or more satellite modems 132, and can format the data and information for delivery to the respective destination device via the satellite 105. Similarly, the gateway 115 may be configured to receive signals from the satellite 105 (e.g., from one or more satellite modems 132) directed to a destination connected with the network 120, and can format the received signals for transmission along the network 120. The gateway 115 may use a broadcast signal, with a modulation and coding ("modcode") format adapted for each packet to the link conditions of the terminal 130 or set of terminals 130 to which the packet is directed (e.g., to account for the variable service link 150 conditions from the satellite 105 to each respective terminal 130).

A device (not shown) connected to the network 120 may communicate with one or more satellite modems 132 and through the gateway 115. Data and information, for example Internet protocol (IP) datagrams, may be sent from the device in the network 120 to the gateway 115. The gateway 115 may format a Medium Access Control (MAC) frame in accordance with a physical layer definition for transmission to the satellite 105. A variety of physical layer transmission modulation and coding techniques may be used with certain embodiments of the invention, including those defined with the Digital Video Broadcasting-Satellite-Second Generation (DVB-S2), Data Over Cable Service Interface Specifications (DOCSIS) and World Interoperability for Microwave Access (WiMAX) standards. The link 135 from the gateway 115 to the satellite 105 is referred to hereinafter as the downstream uplink 135.

The gateway 115 may use an antenna 110 to transmit the downstream uplink signal to the satellite 105. In one embodiment, the antenna 110 comprises a parabolic reflector with high directivity in the direction of the satellite 105 and low directivity in other directions. The antenna 110 may comprise a variety of alternative configurations and include operating features such as high isolation between orthogonal polarizations, high efficiency in the operational frequency bands, and low noise.

In one embodiment, a geostationary satellite 105 is configured to receive the signals from the location of antenna 110 and within the frequency band and specific polarization transmitted. The satellite 105 may, for example, use a reflector antenna, lens antenna, phased array antenna, active antenna, or other mechanism known in the art for reception of such signals. The satellite 105 may process the signals received from the gateway 115 and forward the signal from the gateway 115 to one or more satellite modems 132. In one embodiment, the satellite 105 operates in a multi-beam mode, transmitting a number of narrow beams, each beam is directed at a different region of the earth, allowing for segregating satellite modems 132 into the various narrow beams. With such a multibeam satellite 105, there may be any number of different signals switching configurations on the satellite 105, allowing signals from a single gateway 115 to be switched between different spot beams.

In one embodiment, the satellite 105 may be configured as a "bent pipe" satellite, wherein the satellite 105 may convert the frequency and polarization of the received carrier signals before retransmitting these signals to their destination, but otherwise perform little or no other processing on the contents of the signals. A variety of physical layer transmission modulation and coding techniques may be used by the satellite 105 in accordance with certain embodiments of the invention. Adaptive coding and modulation can be used in some embodiments. For other embodiments, a number of configurations are possible (e.g., using LEO satellites, or using a mesh network instead of a star network), as evident to those skilled in the art.

The service link signals are transmitted from the satellite 105 to one or more satellite modems 132 and received with the respective subscriber antenna 125. In one embodiment, the antenna 125 and terminal 130 together comprise a very small aperture terminal (VSAT), with the antenna 125 measuring approximately 0.6 meters in diameter and having approximately 2 watts of power. In other embodiments, a variety of other types of antennas 125 may be used at the subscriber terminal 130 to receive the signal from the satellite 105. The link 150 from the satellite 105 to the subscriber terminals 130 may be referred to hereinafter as the downstream downlink 150. Each of the subscriber terminals 130 may comprise a single user terminal or, alternatively, comprise a hub or router (not pictured) that is coupled to multiple user terminals. Each subscriber terminal 130 may be connected to various consumer premises equipment (CPE) 160 comprising, for example computers, local area networks, Internet appliances, wireless networks, etc.

In one embodiment, a Multi-Frequency Time-Division Multiple Access (MF-TDMA) scheme is used for upstream links 140, 145, allowing efficient streaming of traffic while maintaining flexibility in allocating capacity among each of the subscriber terminals 130. In this embodiment, a number of frequency channels are allocated which may be fixed, or which may be allocated in a more dynamic fashion. A Time-Division Multiple Access (TDMA) scheme is also employed in each frequency channel. In this scheme, each frequency channel may be divided into several time slots that can be assigned to a connection (i.e., a satellite modem 132). In other embodiments, one or more of the upstream links 140, 145 may be configured with other schemes, such as Frequency-Division Multiple Access (FDMA), Orthogonal Frequency Division Multiple Access (OFDMA), Code Division Multiple Access (CDMA), and/or any number of hybrid or other schemes known in the art.

Subscriber or user terminals 130 include an outdoor unit (ODU) 134, a satellite modem 132 and an antenna 125. Although the satellite communications system 100 is illustrated a geostationary satellite based communication system, it should be noted that various embodiments described herein are not limited to use in geostationary satellite based systems, for example some embodiments could be low earth orbit (LEO) satellite based systems. Some embodiments could have one satellite 105, while others could have more working together in concert.

A subscriber terminal, for example 130-a, may transmit data and information to a destination on the network 120 via the satellite 105. The subscriber terminal 130 transmits the signals via the upstream uplink 145-a to the satellite 105 using the antenna 125-a. A subscriber terminal 130 may transmit the signals according to a variety of physical layer transmission modulation and coding techniques. In various embodiments, the physical layer techniques may be the same for each of the links 135, 140, 145, 150, or may be different. The link from the satellite 105 to the gateway 115 may be referred to hereinafter as the upstream downlink 140.

Figure 2A:
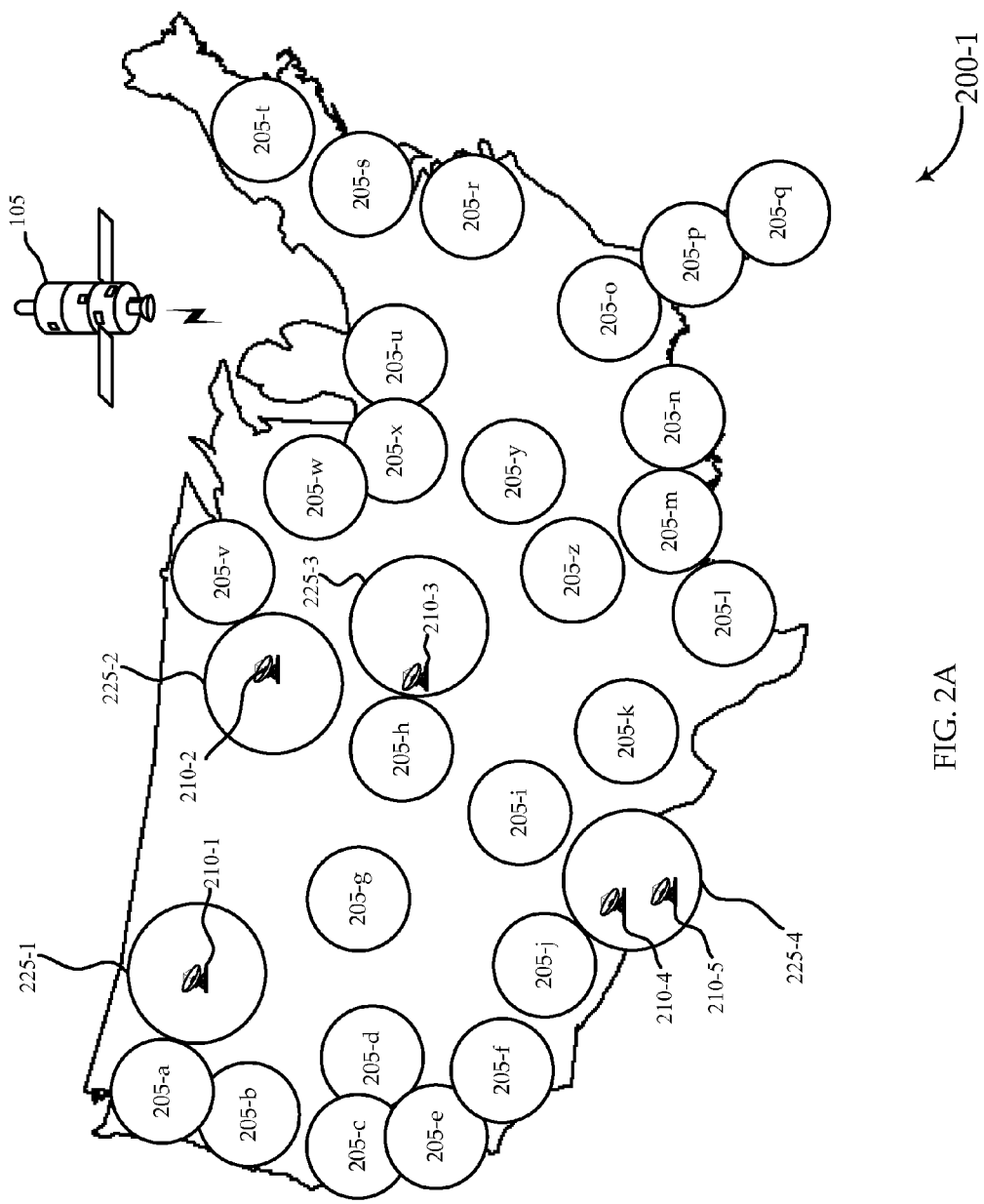
FIGS. 2A and 2B depict diagrams of embodiments of a multi-beam system.
Figure 2B:
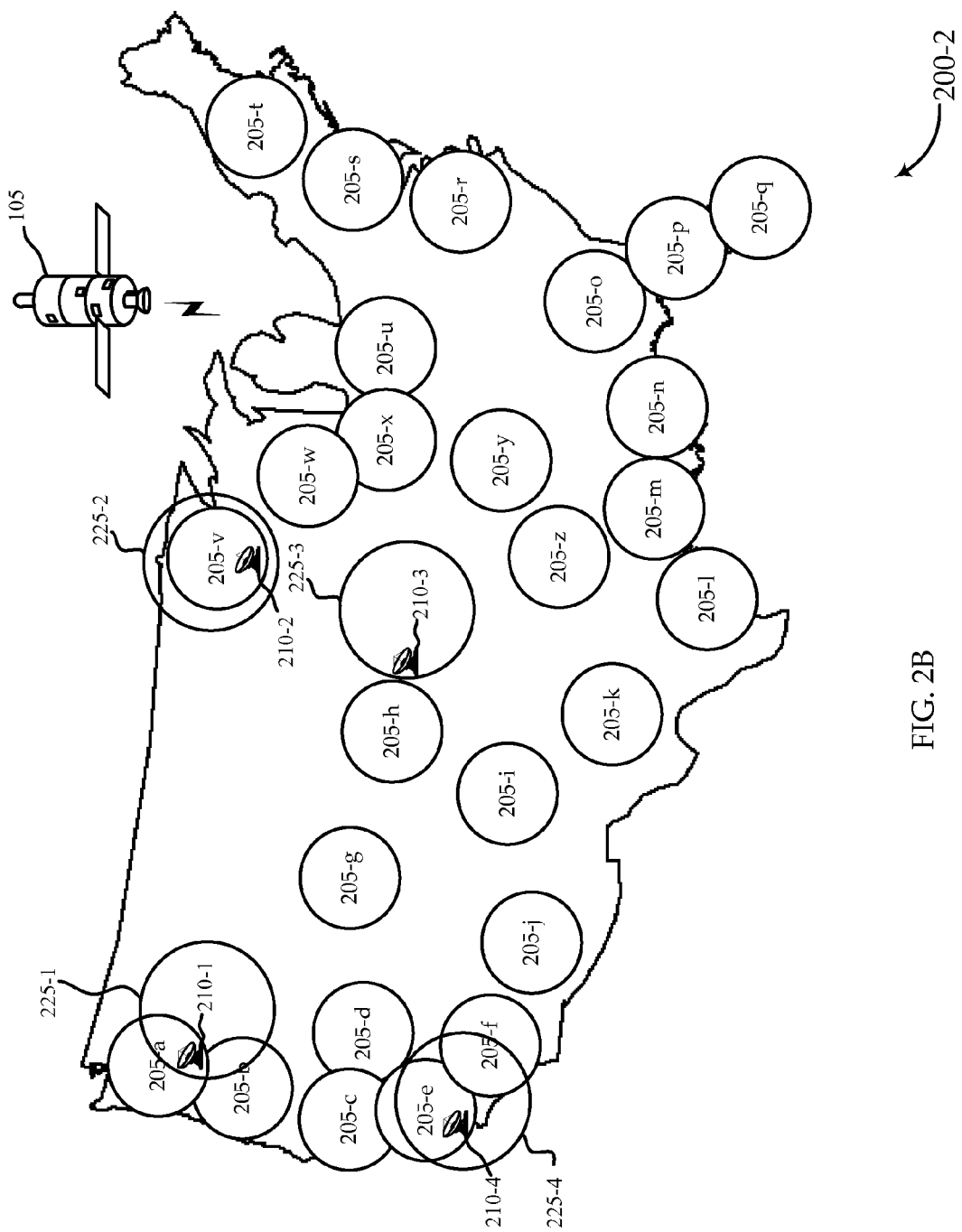

Turning to FIGS. 2A and 2B, examples of a multi-beam system 200 configured according to various embodiments of the invention are shown. The multi-beam system 200 may, for example, be implemented in the satellite communications system 100 described in FIG. 1. Shown are the coverage of a number of feeder and service spot beam regions 225, 205. In this embodiment, a satellite 105 reuses frequency bands by isolating antenna directivity to certain regions of a country (e.g., United States, Canada or Brazil) or geographic region (e.g., Europe, West Africa, Asia). As shown in FIG. 2A, there is geographic exclusivity between the feeder and service spot beams 225, 205. But that is not the case for FIG. 2B where there may in some instances be service spot beam overlap (e.g., 205-c, 205-d, 205-e), while there is no overlap in other areas. However, with overlap, there are certain interference issues that may inhibit frequency band re-use in the overlapping regions. A three or four color pattern helps in avoiding interference even where there is some overlap between neighboring service spot beams 205.

In this embodiment, the gateway terminals 210 are also shown along within their respective feeder spot beams 225. As shown in FIG. 2B, the gateway terminals 210 may be located in a region covered by a service spot beam 205 (e.g., the first, second and fourth gateways 210-1, 210-2, 210-4). However, a gateway may also be located outside of a region covered by a service spot beam 205 (e.g., the third gateway 210-3). By locating gateway terminals 210 outside of the service spot beam regions (e.g., the third gateway terminal 210-3), geographic separation is achieved to allow for re-use of the allocated frequencies.

There are often spare gateway terminals 210 in a given feeder spot beam 225. The spare gateway terminal 210-5 can substitute for the primary gateway terminal 210-4, should the primary gateway terminal 210-4 fail to function properly. Additionally, a spare gateway terminal 210 can be used when a primary is impaired by weather.

Figure 3:
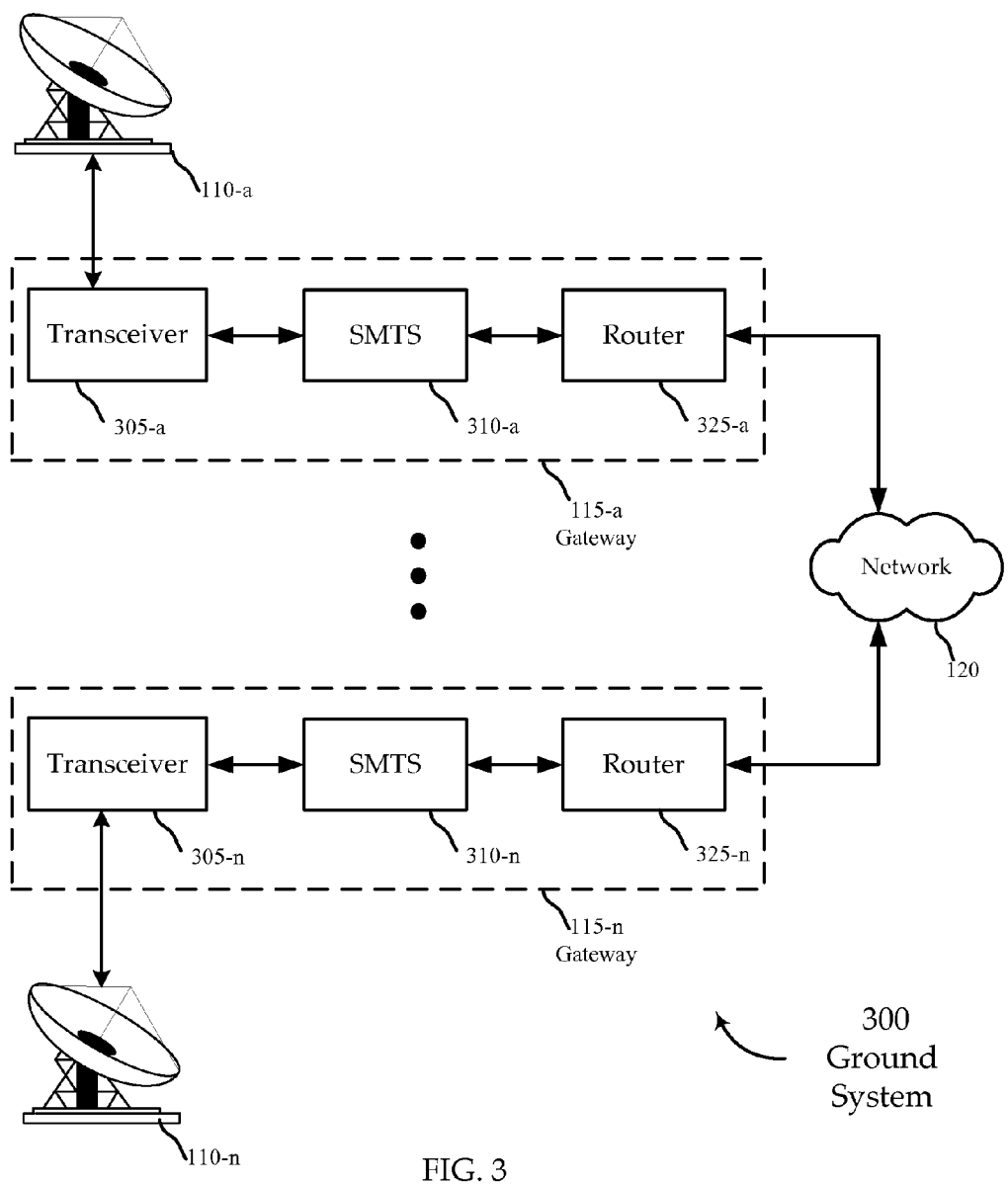
FIG. 3 depicts a block diagram of an embodiment of a ground system including a number of gateways.

Referring next to FIG. 3, an embodiment of a ground system 300 including a number of gateways 115 is shown in block diagram form. One embodiment could have fifteen active gateways 115 (and possibly additional ones as spares) to generate sixty service spot beams 205, for example. Spatial diversity between the feeder spot beams 225 and the service spot beams 205 is used in this embodiment. Each gateway 115 uses its feeder links 135, 140 to service a number of spot beams 205 on the service links 145, 150, for example, four spot beams 205 are serviced with a single gateway 115.

The ground system 300 includes a number of gateways 115 respectively coupled to antennas 110. All the gateways 115 are coupled to a network 120 such as the Internet or a wide area network (WAN). The network 120 is used to gather and disseminate information for the satellite modems 132. Additionally, each satellite modem termination system (SMTS) 310 communicates with other SMTS 310 and the Internet using the network 120 or other WAN (not shown).

Each gateway 115 includes a transceiver 305, a SMTS 310 and a router 325. The transceiver 305 includes both a transmitter and a receiver. In this embodiment, the transmitter takes a baseband signal, upconverts and amplifies the baseband signal for transmission of the downstream uplinks 135 with the antenna 110. The receiver downconverts and tunes the upstream downlinks 140 along with other processing as explained below.

The SMTS 310 processes signals to allow the subscriber terminals 130 to request and receive information and schedules bandwidth for the forward and return channels. Additionally, the SMTS 310 provides configuration information and receives status from the satellite modems 132. Any requested or returned information is processed via the router 325. Other embodiments may not use a SMTS 310 to control the interface between the Internet and the satellite physical layer.

Some embodiments could use a SMTS 310 in one gateway 115 to control another gateway 115. For example, there could be spare SMTSes 310 in some gateways 115 or unused ones. An extra SMTS 310 could be used to receive, transmit and schedule traffic for a transceiver 305 in another gateway 115. The signals to/from the remote transceiver could be transmitted electronically to allow switching among SMTS 310.

Figure 4:
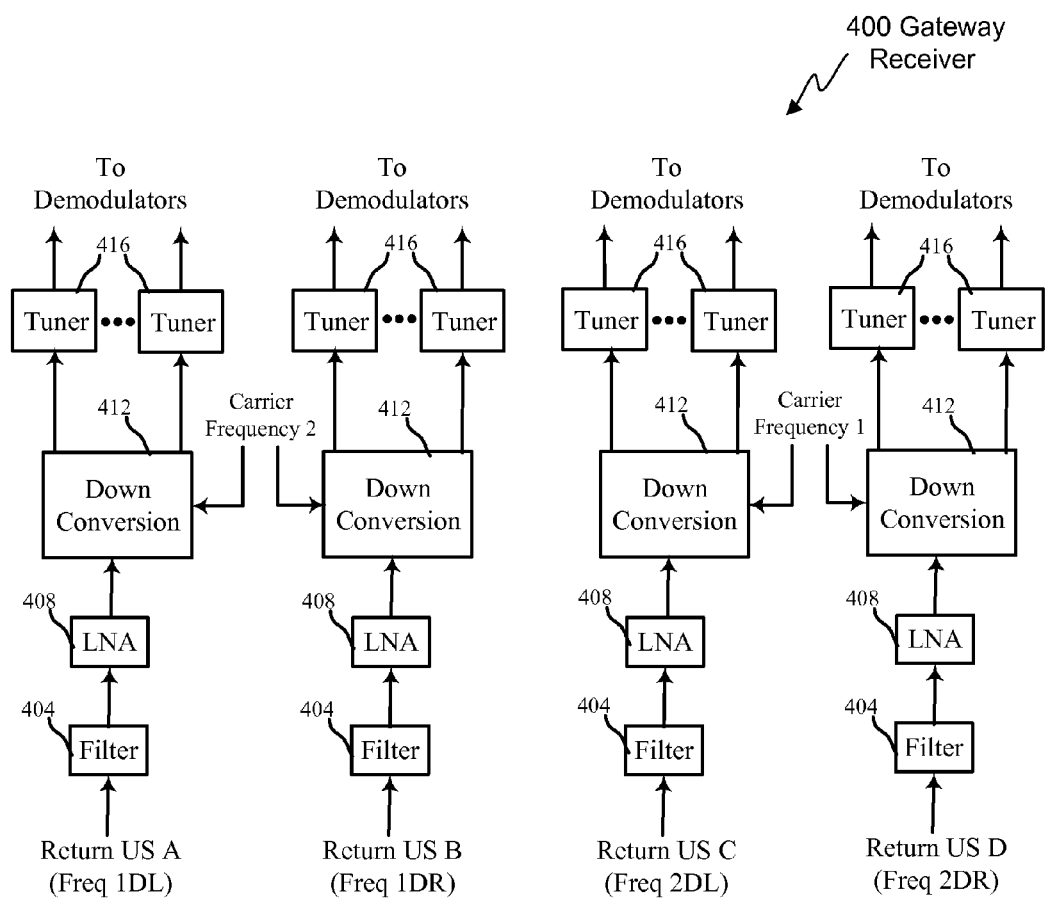
FIG. 4 depicts a block diagram of an embodiment of a gateway receiver.

With reference to FIG. 4, an embodiment of gateway receiver 400 is shown. This embodiment of the receiver 400 processes four return channels from four different service spot beams 205. The return channels may be divided among four pathways using antenna polarization and/or filter 404. Each return channel is coupled to a low-noise amplifier (LNA) 408. Down conversion 412 mixes down the signal into its intermediate frequency. Each of the upstream sub-channels is separated from the signal by a number of tuners 416. Further processing is performed in the SMTS 310.

Figure 5:
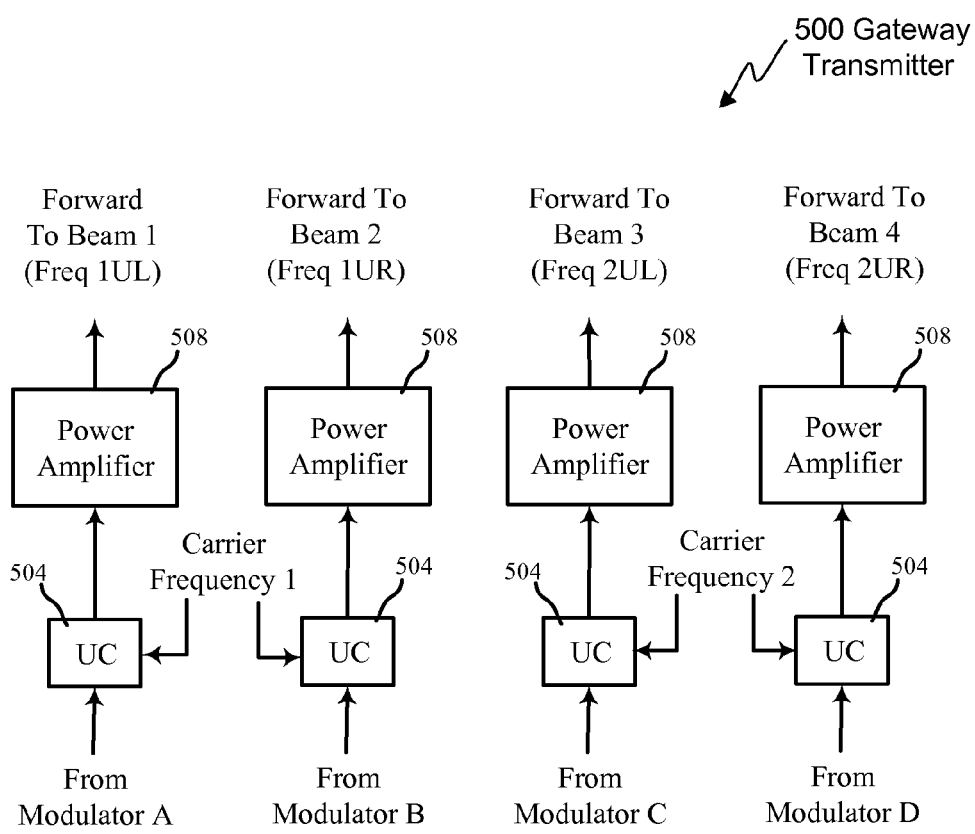
FIG. 5 depicts a block diagram of an embodiment of a gateway transmitter.

Referring next to FIG. 5, an embodiment of a gateway transmitter 500 is shown. The downstream channels are received at their intermediate frequencies from the SMTS 310. With separate pathways, each downstream channel is converted in up-converter (UC) 504 using two different carrier frequencies in this embodiment. A power amplifier 508 increases the amplitude of the forward channel before coupling to the antenna 110. The antenna 110 polarizes the separate signals to keep the four forward channels distinct as they are passed to the satellite 105.

Figure 6:
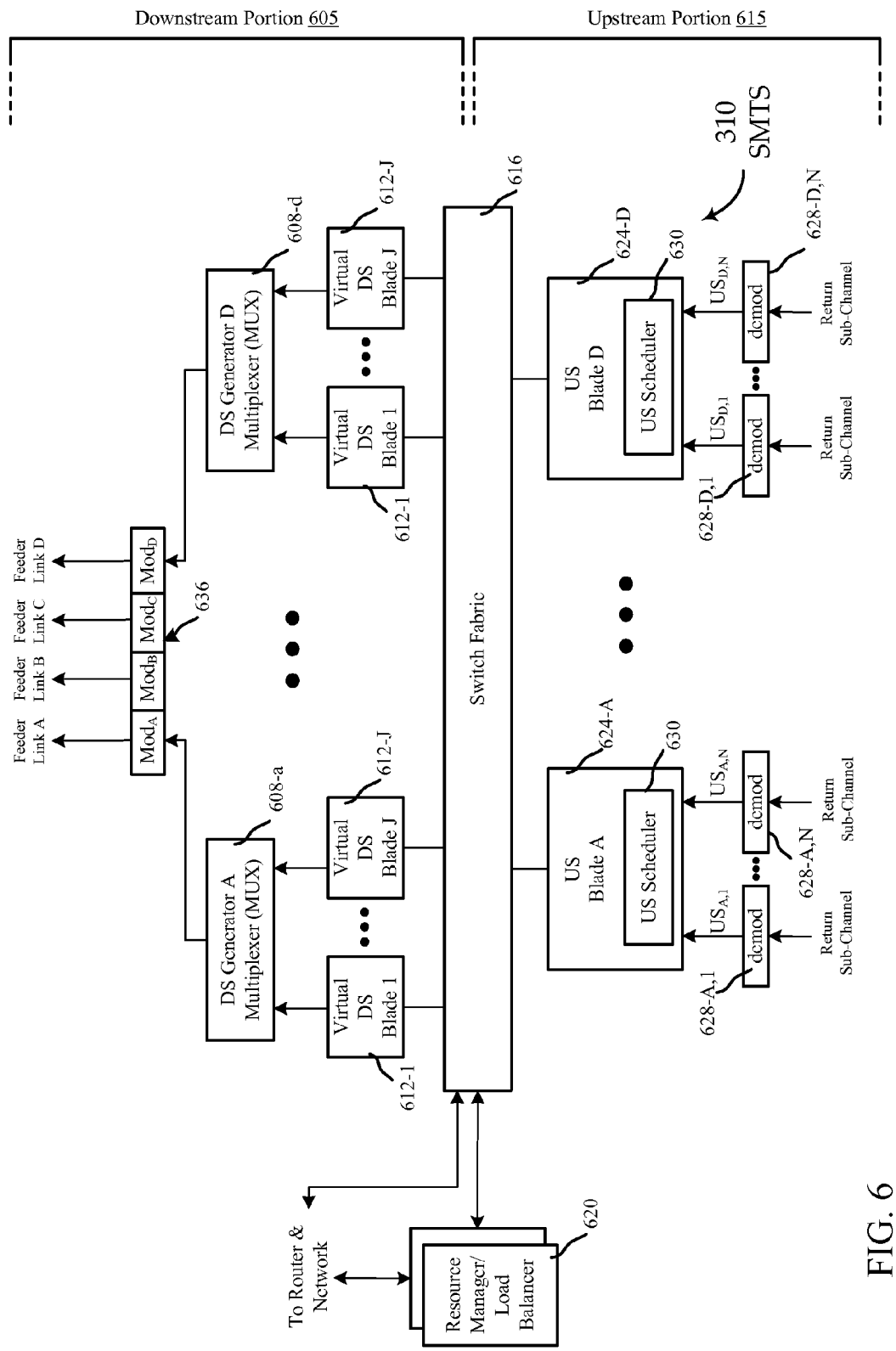
FIG. 6 depicts a block diagram of an embodiment of a satellite modem termination system (SMTS)

With reference to FIG. 6, an embodiment of a SMTS 310 is shown in block diagram form. Baseband processing is done for the feeder links 140, 135 by a number of geographically separated gateways 115. Each SMTS 310 is generally divided into two sections, specifically, the downstream portion 605 to send information to the satellite 105 and the upstream portion 615 to receive information from the satellite 105.

The downstream portion 605 takes information from the switching fabric 616 through a number of downstream (DS) blades 612. The DS blades 612 are divided among a number of downstream generators 608. This embodiment includes four downstream generators 608, with one for each of the downstream channels. For example, this embodiment uses four separate 500 MHz spectrum ranges having different frequencies and/or polarizations. A four-color modulator 636 has a modulator for each respective DS generator 608. The modulated signals are coupled to the transmitter portion of the transceiver 305 at an intermediate frequency. Each of the four downstream generators 608 in this embodiment has J virtual DS blades 612.

The upstream portion 615 of the SMTS 310 receives and processes information from the satellite 105 in the baseband intermediate frequency. After the receiver portion of the transceiver 305 produces all the physical sub-channels for the four separate baseband upstream signals, each physical sub-channel is coupled to a different demodulator 628. Some embodiments could include a switch before the demodulators 628 to allow any return physical sub-channel to go to any demodulator 628 to allow dynamic reassignment between the four return channels. A number of demodulators are dedicated to an upstream (US) blade 624.

The US blades 624 serve to recover the information received from the satellite 105 before providing it to the switching fabric 616. The US scheduler 630 on each US blade 624 serves to schedule use of the return channel for each subscriber terminal 130. Future needs for the satellite modems 132 of a particular return channel can be assessed and bandwidth/latency can be adjusted accordingly in cooperation with the Resource Manager and Load Balancer (RM/LB) block 620.

The RM/LB block 620 assigns traffic among the US and DS blades. By communication with other RM/LB blocks 620 in other SMTSes 310, each RM/LB block 620 can reassign satellite modems 132 and channels to other gateways 115. This reassignment can take place for any number of reasons, for example, lack of resources and/or loading concerns. In this embodiment, the decisions are done in a distributed fashion among the RM/LB blocks 620, but other embodiments could have decisions made by one master RM/LB block or at some other central decision-making authority. Reassignment of satellite modems 132 could use overlapping service spot beams 205, for example.

Figure 7:
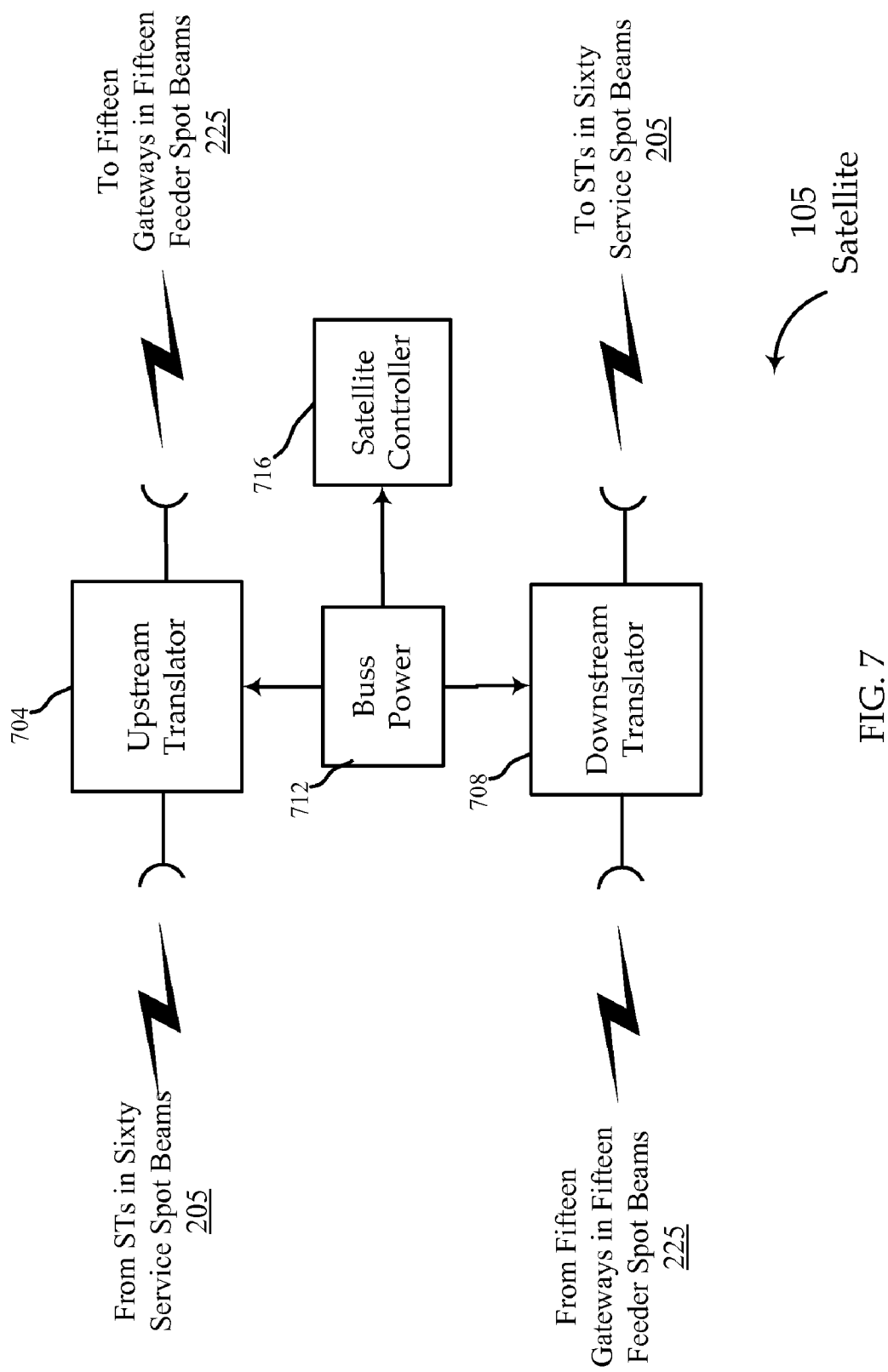
FIG. 7 depicts a block diagram of an embodiment of a satellite.

Referring next to FIG. 7, an embodiment of a satellite 105 is shown in block diagram form. The satellite 105 in this embodiment communicates with fifteen gateways 115 and all subscriber terminal (ST)s 130 using sixty feeder and service spot beams 225, 205. Other embodiments could use more or less gateways/spot beams. There are likely to be thousands or millions of STs 130 divided by geography between the service spot beams. Buss power 712 is supplied using a power source such as chemical fuel, nuclear fuel and/or solar energy. A satellite controller 716 is used to maintain attitude and otherwise control the satellite 105. Software updates to the satellite 105 can be uploaded from the gateway 115 and performed by the satellite controller 716.

Information passes in two directions through the satellite 105. A downstream translator 708 receives information from the fifteen gateways 115 for relay to satellite modems 132 using sixty service spot beams 205. An upstream translator 704 receives information from the satellite modems 132 occupying the sixty spot beam areas and relays that information to the fifteen gateways 115. This embodiment of the satellite can switch carrier frequencies in the downstream or upstream processors 708, 704 in a "bent-pipe" configuration, but other embodiments could do baseband switching between the various forward and return channels. The frequencies and polarization for each service spot beam 205 could be programmable or preconfigured.

Figure 8A:
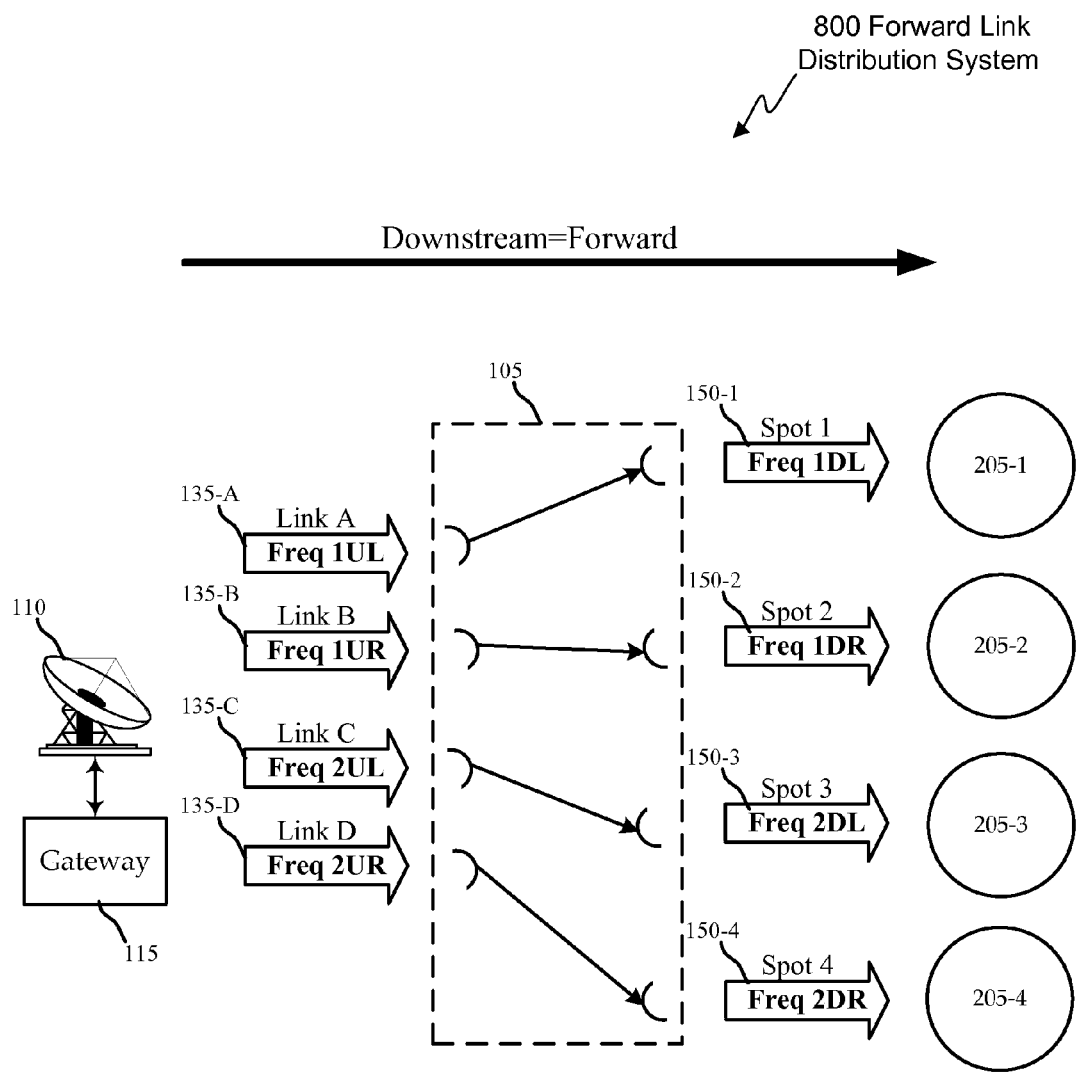
FIGS. 8A and 8B depict diagrams of embodiments of a forward link distribution system.

With reference to FIG. 8A, an embodiment of a forward link distribution system 800 is shown. The gateway 115 is shown coupled to an antenna 110, which generates four downstream signals. A single carrier with 500 MHz of spectrum is used for each of the four downstream uplinks 135. In this embodiment, a total of two-frequencies and two polarizations allow four separate downstream uplinks 135 while using only 1 GHz of the spectrum. For example, link A 135-A could be a first frequency Freq 1 (27.5-28.0 GHz) with uplink left-hand polarization (Freq 1UL), link B 135-B could be a first frequency Freq 1 (27.5-28.0) GHz with uplink right-hand polarization (Freq 1UR), link C could be a second frequency Freq 2 (29.5-30 GHz) with uplink left-hand polarization (Freq 2UL), and link D could be a second frequency Freq 2 (29.5-30 GHz) with uplink right-hand polarization (Freq 2UR).

The satellite 105 is functionally depicted as four "bent pipe" connections between a feeder and service link. Carrier signals can be changed through the satellite 105 "bent pipe" connections along with the orientation of polarization. The satellite 105 converts each downstream uplink 135 signal into a downstream downlink signal 150.

In this embodiment, there are four downstream downlinks 150 that each provides a service link for four spot beams 205. The downstream downlink 150 may change frequency in the bent pipe as is the case in this embodiment. For example, downstream uplink A 135-a changes from a first frequency (i.e., Freq 1) to a second frequency (i.e., Freq 2) through the satellite 105. Other embodiments may also change polarization between the uplink and downlink for a given downstream channel. Some embodiments may use the same polarization and/or frequency for both the uplink and downlink for a given downstream channel.

Figure 8B:
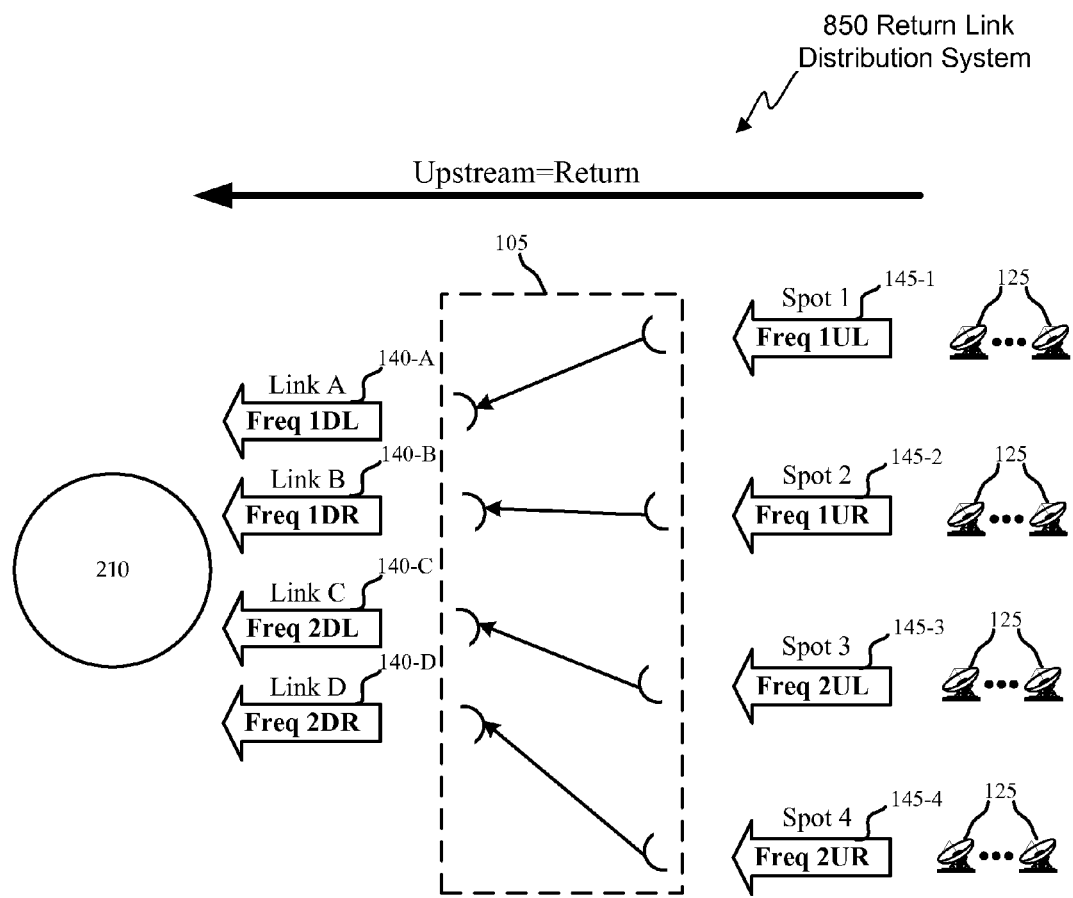

Referring next to FIG. 8B, an embodiment of a return link distribution system 850 is shown. This embodiment shows four upstream uplinks 145 from four sets of subscriber terminals 125. A "bent pipe" satellite 105 takes the upstream uplinks 145, optionally changes carrier frequency and/or polarization (not shown), and then redirects them as upstream downlinks 140 to a spot beam for a gateway 115. In this embodiment, the carrier frequency changes between the uplink 145 and the downlink 140, but the polarization remains the same. Because the feeder spot beams 225 to the gateway 115 is not in the coverage area of the service spot beams 205, the same frequency pairs may be reused for both service links and feeder links.

Figure 9A:
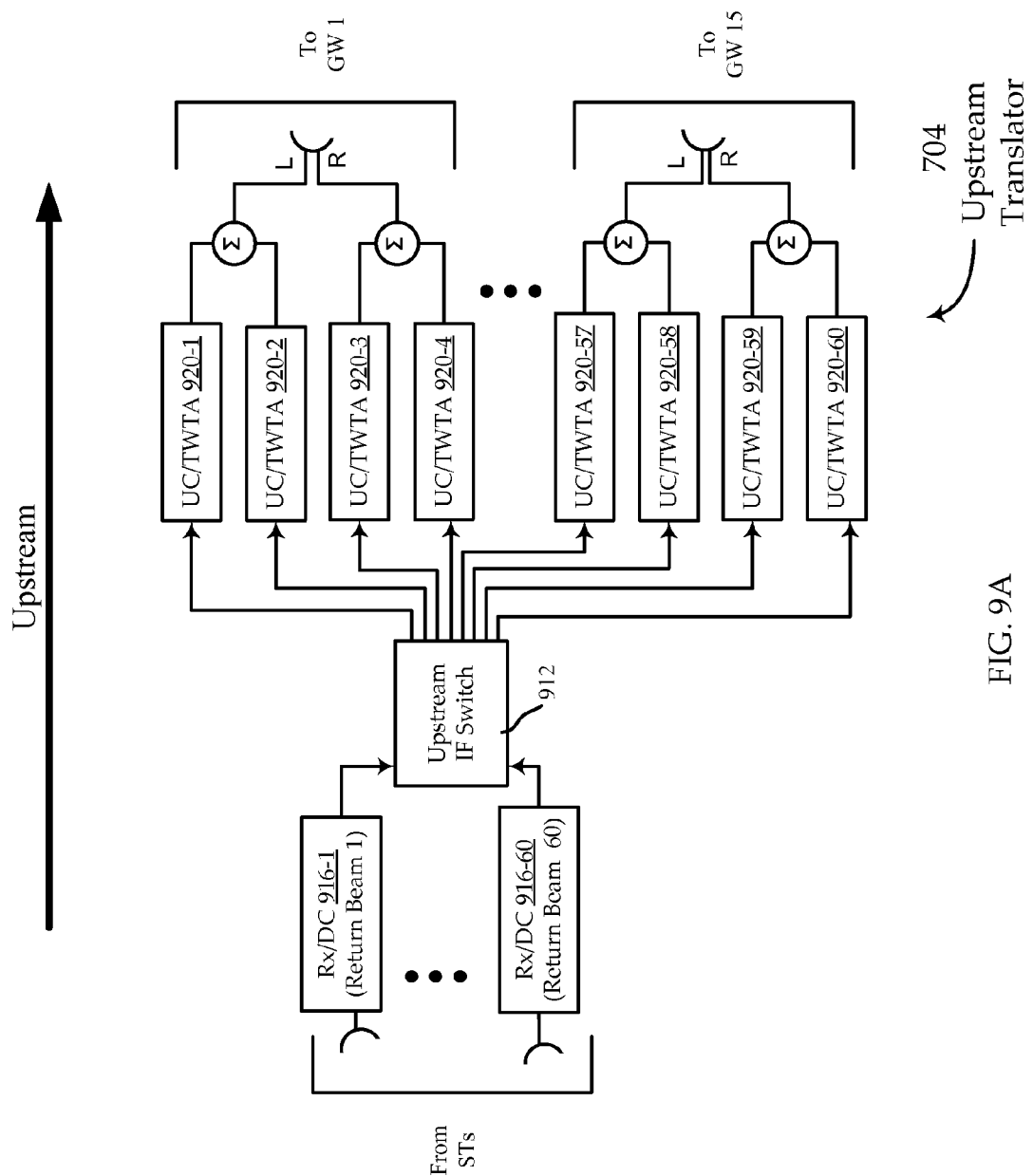
FIGS. 9A and 9B depict block diagrams of embodiments of an upstream translator of the satellite.

With reference to FIG. 9A, an embodiment of an upstream translator 704 of the satellite 105 is shown in block diagram form. A Receiver and Downconverter (Rx/DC) block 916 receives all the return link information for the area defined by a spot beam 205 as an analog signal before conversion to an intermediate frequency (IF). There is a Rx/DC block 916 for each service spot beam area 205. An upstream IF switch 912 routes a particular baseband signal from a Rx/DC block 916 to a particular upstream downlink channel. The upstream downlink channel is filled using an Upconverter and Traveling Wave Tube Amplifier (UC/TWTA) block 920. The frequency and/or polarization can be changed through this process such that each physical return channel passes through the satellite 105 in a bent pipe fashion.

Each gateway 115 is assigned four dedicated UC/TWTA blocks 920 in the upstream translator 504. Two of the four dedicated UC/TWTA blocks 920 operate at a first frequency range and two operate at a second frequency range in this embodiment. Additionally, two use right-hand polarization and two use left-hand polarization. Between the two polarizations and two frequencies, the satellite 105 can communicate with each gateway 115 with four separate upstream downlink channels.

Figure 9B:
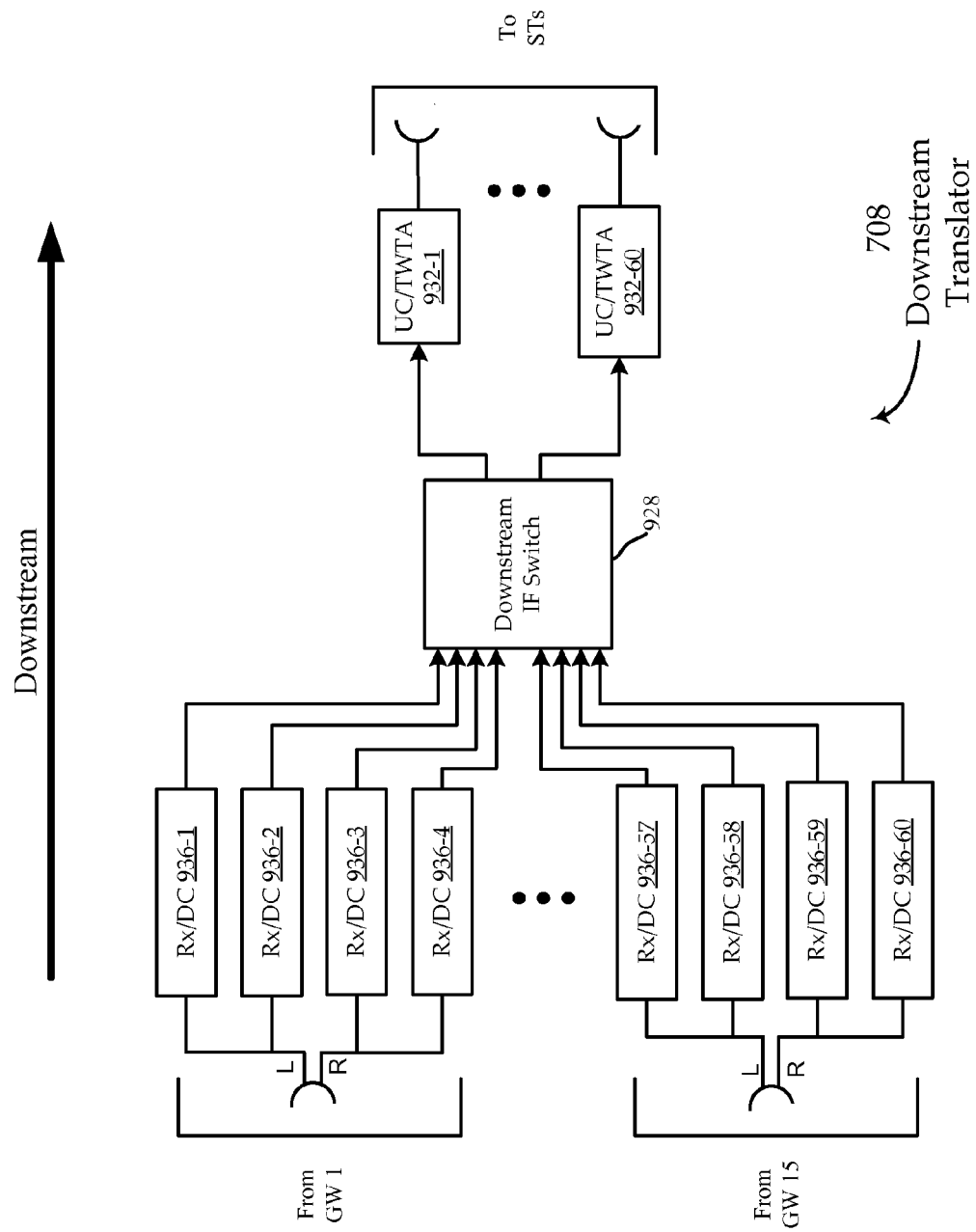

Referring next to FIG. 9B, an embodiment of a downstream translator 708 is shown as a block diagram. Each gateway 115 has four downstream uplink channels to the satellite 105 by use of two frequency ranges and two polarizations. A Rx/DC block 936 takes the analog signal and converts the signal to an intermediate frequency. There is a Rx/DC block 936 for all sixty downstream uplink channels from the fifteen gateways 115. The downstream IF switch 928 connects a particular channel from a gateway 115 to a particular service spot beam 205. Each IF signal from the downstream IF switch 928 is modulated and amplified with a UC/TWTA block 932. An antenna 110 broadcasts the signal using a service spot beam 205 to satellite modems 132 that occupy the area of the service spot beam 205. Just as with the upstream translator 704, the downstream translator 708 can change carrier frequency and polarization of a particular downstream channel in a bent-pipe fashion.

Figure 10A:
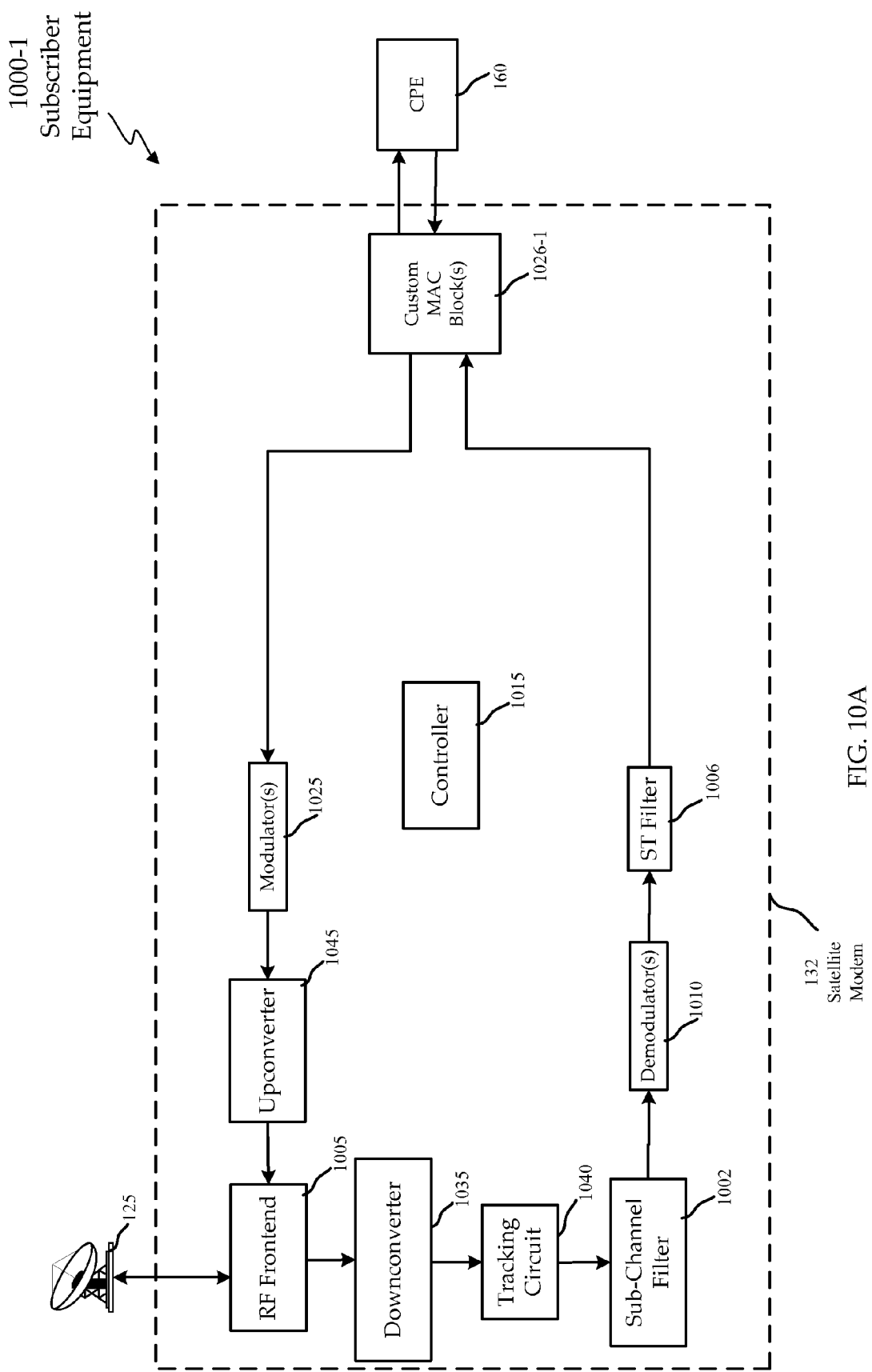
FIGS. 10A, 10B, and 10C depict block diagrams of embodiments of a set of subscriber equipment, which may be located at a subscriber location for the reception and transmission of communication signals.

FIG. 10A comprises a block diagram illustrating a set of subscriber equipment 1000-1, which may be located at a subscriber location for the reception and transmission of communication signals. Components of this set of subscriber equipment 1000 may, for example, comprise the antenna 125, the outdoor unit 134 (not shown), satellite modem 132 and any consumer premises equipment (CPE) 160 (e.g., a computer, a network appliance, a network, etc.)

An antenna 125 receives signals from a satellite 105. The antenna 125 may comprise a Very Small Aperture Terminal (VSAT) antenna, or any of a variety other antenna types (e.g., other parabolic antennas, microstrip antennas, phased array, Multiple-input Multiple-output (MIMO), and/or helical antennas). In some embodiments, the antenna 125 may be configured to dynamically modify its configuration to better receive signals at certain frequency ranges and/or from certain locations.

From the antenna 125, the signals are forwarded (perhaps after some form of processing and/or conditioning) to the satellite modem 132. The satellite modem 132 may include a radio frequency (RF) frontend 1005, a downconverter 1035, an upconverter 1045, a tracking circuit 1040, a controller 1015, a sub-channel filter 1002, a modulator(s) 1025, a demodulator(s) 1010, a subscriber terminal filter 1006, and a custom MAC block 1026.

In this embodiment, the RF frontend 1005 has both transmit and receive functions. The receive function includes amplification of the received signals (e.g., with a low noise amplifier (LNA)). This amplified signal is then downconverted (e.g., using a mixer to combine it with a signal from a local oscillator (LO)) in the downconverter block 1035. This downconverted signal is synchronized and aligned in the tracking circuit 1040, before processing with the sub-channel filter 1002. A subset or sub-channel of each superframe is culled from the downstream channel by the sub-channel filter 1002, for example, one or more sub-channels are filtered off for further processing.

A variety of modulation and coding techniques may be used at the satellite modem 132 for signals received from and transmitted to the satellite 105. In this embodiment, modulation techniques could include BPSK, QPSK, 8PSK, 16APSK, or 32PSK. In other embodiments, additional modulation techniques may include ASK, FSK, MFSK, and QAM, as well as a variety of analog techniques. The demodulator(s) 1010 demodulate and decode the down-converted signals, forwarding the demodulated sub-channel(s) to the ST filter 1006 to strip out the data intended for the particular satellite modem 132 from other information in the sub-channel by finding information associated with a service identifier for the satellite modem 132.

Once the information destined for the particular satellite modem 132 is isolated, the custom MAC block 1026-1 passes the information to the CPE 160. Some embodiments can use an off-the-shelf MAC block 1026, where the native physical layer is spoofed to interface with the satellite link, for example, a DOCSIS or WiMAX MAC chip could be used. This embodiment, however, uses a custom MAC block 1026 that directly ties to the satellite physical layer. Buffering, handshaking, and configuration of the satellite link can be implemented by the custom MAC block 1026 under the management of the controller 1015.

Various functions of the satellite modem 132 are managed by the controller 1015. The controller 1015 may oversee a variety of decoding, interleaving, decryption, and unscrambling techniques, as known in the art. The controller may also manage the functions applicable to the signals and exchange of processed data with one or more CPEs 160. The CPE 160 may comprise one or more user terminals, such as personal computers, laptops, or any other computing devices as known in the art.

The controller 1015, along with the other components of the satellite modem 132, may be implemented in one or more Application Specific Integrated Circuits (ASICs), or a general purpose processor adapted to perform the applicable functions. Alternatively, the functions of the satellite modem 132 may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom Intergrated Circuits), which may be programmed in any manner known in the art. The controller 1015 may be programmed to access a memory unit (not shown). It may fetch instructions and other data from the memory unit, or write data to the memory-unit.

The transmit signal path operates in a generally converse manner. Data is transmitted from the CPE 160 through the satellite modem 132 and up to the satellite 105. The CPE 160 transmits data to the custom MAC block 1026 for conversion to the satellite link protocol of the physical satellite layer. Modulation and coding is performed in the modulator(s) 1025. In some embodiments, adaptive or variable coding and modulation techniques may be used in these transmissions. Specifically, different modulation and coding combinations, or "modcodes," may be used for different packets, depending on the signal quality metrics between the antenna 125 and the satellite 105. Other factors, such as network and satellite congestion issues, may be factored into the determination, as well. Signal quality information may be received from the satellite 105 or other sources, and various decisions regarding modcode applicability may be made locally at the controller 1015 and/or remotely. Next, the modulated signal is mixed to a higher frequency of the carrier signal in the upconverter 1045. The RF frontend 1005 then amplifies the signal for transmission through the antenna 125 to the satellite 105. In one embodiment, a multi-frequency time division multiple access (MF-TDMA) is used for the return channel, but other embodiments could use TDMA, CDMA, FDMA or other techniques to allow many satellite modems 132 to use the return channel.

Figure 10B:
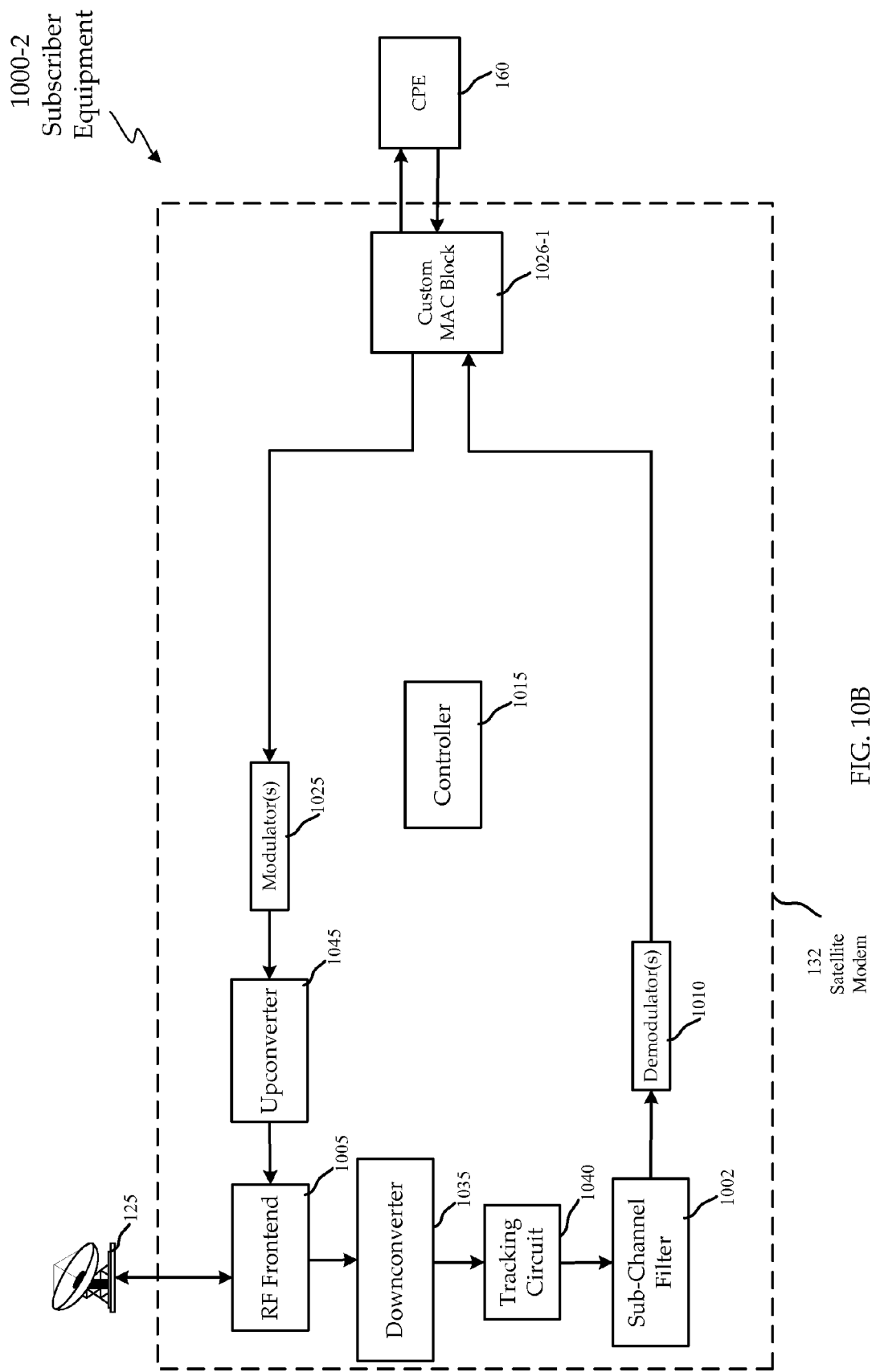

With reference to FIG. 10B, a block diagram illustrating a set of subscriber equipment 1000-2 is shown for another embodiment. In this embodiment, the ST filter 1006 is embedded in the custom MAC block 1026. The MAC block 1026-1 receives the physical sub-channels allocated to the satellite modem 132 as a logical downstream and removes the information tagged with the service ID. The service ID corresponds to information that is destined for the CPE 160 or used in class of service management performed by the MAC block 1026.

Figure 10C:
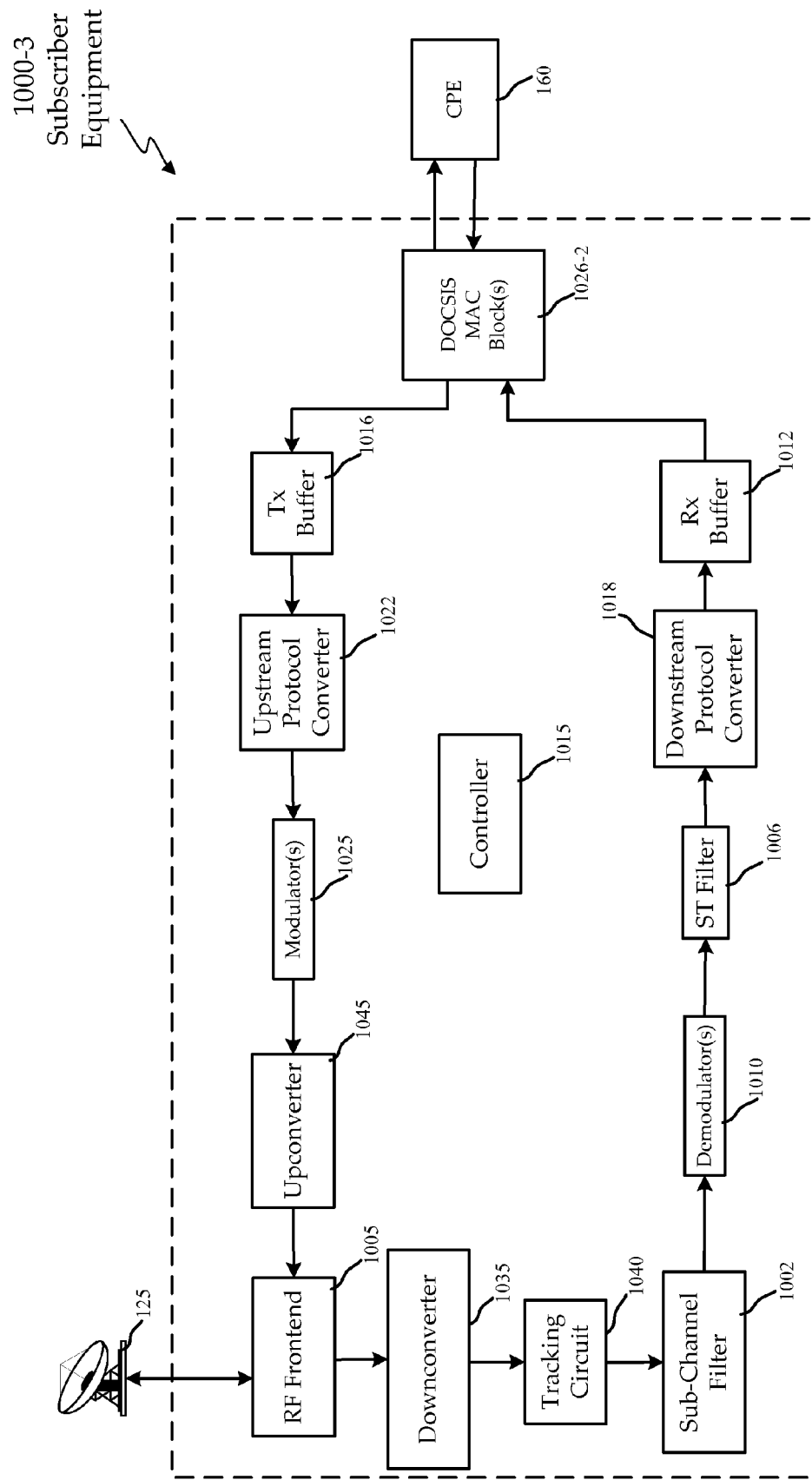

Referring next to FIG. 10C, a block diagram illustrating a set of subscriber equipment 1000-3 is shown for yet another embodiment. This embodiment utilizes protocol converters 1018, 1022 to allow use of an off-the-shelf MAC block 1026-2. Specifically, a downstream protocol converter 1018, an upstream protocol converter 1022, a receive (Rx) buffer 1012, and a transmit (Tx) buffer 1016 are added to the embodiment of FIG. 10A. The MAC block 1026-2 uses a different link protocol, for example, DOCSIS or WiMAX. With protocol conversion and possibly buffering, the satellite link protocol can be translated for the MAC block 1026-2. The MAC block 1026-2 is effectively spoofed into thinking it is communicating in one protocol that is different from the satellite link protocol, which is actually used.

On the receive side, a downstream protocol converter 1018 translates the satellite link protocol into one that the MAC block 1026-2 uses. In this embodiment, the translation could be between Digital Video Broadcasting Satellite (DVB-S) link protocol and DOCSIS link protocol. Embodiments could use an off-the-shelf WiMAX MAC block, DOCSIS block or a combination DOCSIS/WiMAX block. In an alternative embodiment, the MAC block 1026 could be a custom circuit that avoids the use of a downstream protocol converter by using the protocol of the satellite link as depicted in FIG. 10A.

An Rx buffer 1012 is used to convert the high-speed received burst into a lower-speed stream that the MAC block 1026 can process. In this embodiment, the MAC block 1026 is a circuit that receives a DOCSIS stream and manages it for the CPE 160. Tasks such as provisioning, bandwidth management, access control, quality of service, etc. are managed by the MAC block 1026 under the supervision of the controller 1015. The CPE 160 can variously interface with the MAC block 1026 using Ethernet, WiFi, Universal Serial Bus (USB) and/or other standard interfaces.

It is also worth noting that while a downstream protocol converter 1018 and upstream protocol converter 1022 may be used to convert received packets to DOCSIS or WiMAX compatible frames for processing by a MAC block 1026, these converters will not be necessary in many embodiments. For example, in embodiments where DOCSIS or WiMAX based components are not used, the protocol used for the satellite link may also be compatible with the MAC block 1026 without such conversions, and the converters 1018, 1022 may therefore be unnecessary.

On the transmit side of the satellite modem 132, the slow-rate data from the MAC block 1026-2 waits in the Tx buffer 1016 until it is burst over the satellite link. The processed data is then transmitted from the Tx buffer 1016 to the modulator 1025, where it is modulated using one of the techniques described above. In some embodiments, adaptive or variable coding and modulation techniques may be used in these receptions and transmissions.

Table 1 shows various layers of abstraction in a reference model. The satellite physical layer (PHY layer) is the most basic set of layers and includes the channelization sub-layer, coding & modulation sub-layer, and the satellite transport sub-layer. The PHY layer provides the means of transmitting raw bits rather than packets over a physical data link connecting network nodes, for example, between the gateway 115 and the subscriber terminal 130. The vocabulary associated with the physical layer includes terms such as physical forward channel, physical sub-channels, bit rate, symbol rate, channel capacity, and bandwidth. Within a wireless, especially satellite, environment there are additional terms such as frequency, modulation scheme, single carrier, Forward Error Correction (FEC) encoding rate, etc. The PHY layer performs services requested by the Data Link Layer.

TABLE 1

Satellite Link Communication Layers

| Layer | Function |
|---|---|
| Application Layer | Application layer for subscriber equipment |
| Transport Layer | Responds to service request from Application Layer |
| Network Layer | Network interface to subscriber terminal |
| Data Link Layer | Media Access Control (MAC) Sub-layer |
|  | Logical Link Control (LLC) Sub-layer |
| PHY Layer | Channelization Sub-layer limits information decoded for the physical sub-channel, which is a fraction of the physical forward channel Coding & Modulation Sub-layer allows static or adaptive coding and modulation |
|  | Satellite Transport Sub-layer allows transport over satellite link(s) |

The PHY layer is further broken up into the channelization sub-layer, coding & modulation sub-layer and the satellite transport sub-layer. At the lowest level of abstraction, the satellite transport sub-layer, there is a stream of symbols for each spot beam on the physical forward channel transported on a single carrier. Some embodiments may arrange those symbols in packets, frames and/or superframes. The next level in the abstraction is the coding and modulation sub-layer. The symbols used, the symbol rate and modulation are all managed in the coding and modulation sub-layer. Some embodiments could have fixed coding and modulation, while other embodiments could vary the coding and modulation. The variance in the coding and modulation could or could not correspond to physical sub-channels. The next higher level in the abstraction, the channelization sub-layer produces a stream of data bits. The channelization sub-layer screens the stream of data bits according to the physical sub-channel(s) assigned to the subscriber terminal to produce a fraction of the total physical forward channel. The non-assigned sub-channels are discarded in this sub-layer.

The data link layer is logically the next layer above the PHY layer and provides data transfer across the physical satellite link. In many contexts, the data link layer is split into two sub-layers: the upper logical link control (LLC) sub-layer and the lower Medium Access Control (MAC) sub-layer. The MAC control sub-layer allows addressability to a particular modem 132. Physical sub-channels in the PHY layer are mapped one-to-one to logical downstreams in the MAC sub-layer. The LLC sub-layer manages the hand shaking and protocol of the PHY layer. The MAC control sub-layer is implemented in a MAC block. Various embodiments may use a MAC block particular to a particular link protocol, for example, DOCSIS or WiMAX.

In a DOCSIS environment, a MAC sub-layer domain (or simply MAC domain) is a collection of upstream and downstream channels for which a single MAC allocation and management protocol operates. Service identifiers (IDs) are used in the MAC domain. Specifically, service IDs provide both device identification and class-of-service management and are integral to upstream bandwidth allocation. Each service ID is unique within a single MAC sub-layer domain. For example, each modem 132 belongs to a MAC domain, where there could be any number of MAC domains in the satellite communication system 100. The sub-set of the modems 132 assigned to a particular MAC domain are each assigned one or more service IDs that are unique within the particular MAC domain. In other environments, for example WiMAX, there are identifiers equivalent to a service ID used in the MAC sub-layer.

The management protocol for a MAC domain allows controlling the service IDs within that domain. Messages addressed by service ID are intercepted by the satellite modem 132 and processed within the satellite modem 132. Responses can be sent from the satellite modem using the management protocol. A single entity may control one or more domains. The management protocol may be unique to a domain or be used over multiple domains. The management protocol allows defining both PHY layer and MAC sub-layer parameters in some embodiments. For example, the management protocol can assign and change forward downstream and upstream sub-channel(s), change datarates, change and assign service IDs, activate and de-activate some or all portions of the satellite modem 132, communicate the frequency, coding, modulation to use, upgrade the firmware of the satellite modem 132, and/or perform other management tasks for the account and/or satellite modem 132.

Figure 11A:
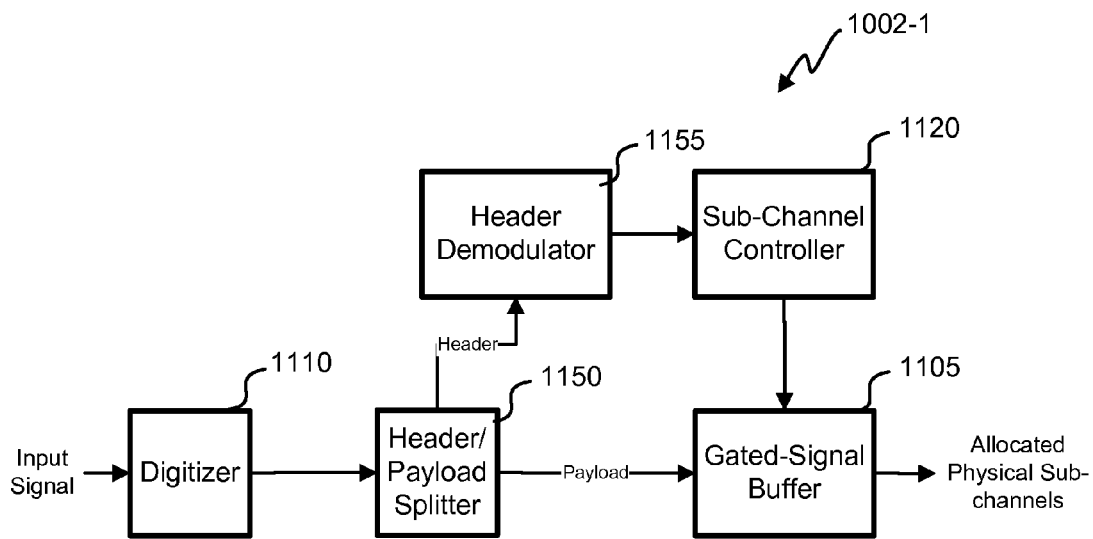
FIGS. 11A and 11B depict block diagrams of embodiments of a physical sub-channel filter.

With reference to FIG. 11A, a block diagram of an embodiment of a physical sub-channel filter 1002 is shown. The sub-channel filter 1002-1 allows stripping out physical sub-channels from the physical forward channel that are not allocated to the satellite modem 132. After downconversion and tracking, the input signal is converted from an analog signal to a digital signal in the digitizer 1110. Some embodiments may perform some signal processing in the digitizer 1110. The digitized input signal is processed in a header/payload splitter 1150 to divide each physical sub-channel into the header and the payload.

After the split, the header is passed to a header demodulator 1155 and the payload is sent to a gated-signal buffer 1105. The header demodulator 1155 processes the header enough to determine the physical sub-channel the packet is intended for. The demodulated header is passed to a sub-channel controller 1120 that knows if a sub-channel is allocated to the particular satellite modem 132. Where the header corresponds to an allocated sub-channel, a signal is sent to the gated-signal buffer 1105 to store the payload. Where there is no signal because the sub-channel is not intended for the particular satellite modem 132, the gated-signal buffer 1105 does not continue to store the payload and does not pass it along. Allocated sub-channels are stored in the gated-signal buffer 1105 and eventually passed as an allocated sub-channel for demodulation.

Figure 11B:
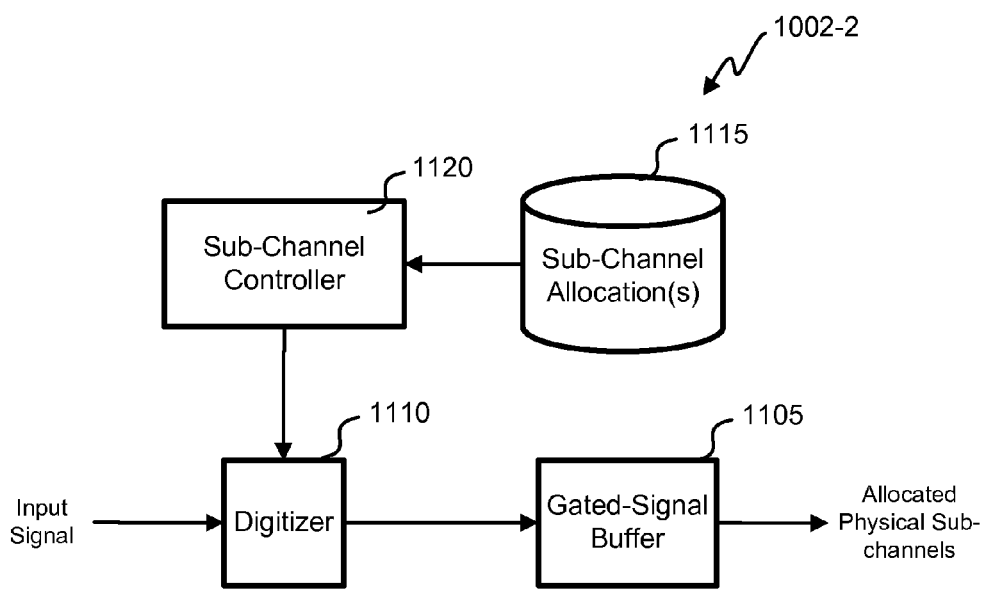

Referring next to FIG. 11B, a block diagram of another embodiment of the physical sub-channel filter 1002 is shown. This embodiment does not decode headers, but knows in advance where the allocated sub-channels will appear in the input signal. A sub-channel controller 1120 refers to a sub-channel allocations 1115. The sub-channel allocation times are sent beforehand such that the sub-channel controller 1120 can know where to activate the digitizer 1110. The gated-signal buffer 1105 holds the digital samples corresponding to the physical sub-channels allocated to the satellite modem 132.

Figure 12A:
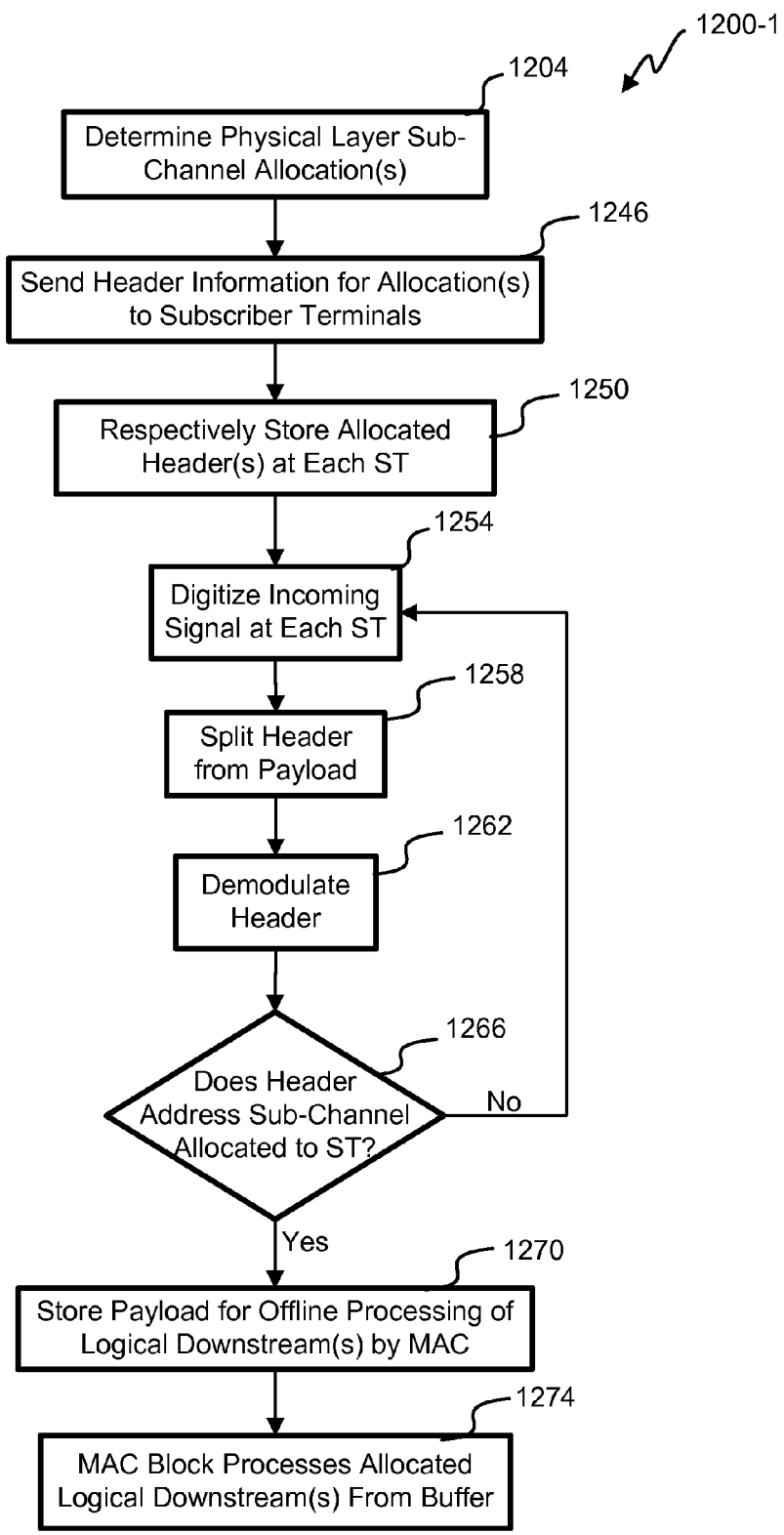
FIGS. 12A and 12B illustrate flowcharts of embodiments of a process for filtering out the physical sub-channel(s)

With reference to FIG. 12A, a flowchart of embodiment of a process 1200-1 for filtering out the physical sub-channel(s) is shown. This embodiment of the process 1200-1 could be performed on the sub-channel filter 1002-1 depicted in FIG. 11A, for example. The depicted portion of the process begins in block 1204 where the SMTS 310 determines how to allocate the physical sub-channel allocation 1115. The header information corresponding to the allocated physical sub-channels is communicated to the satellite modems 132 in block 1246. Each ST 130 stores its respective header information in block 1250.

In a loop of blocks 1254, 1258, 1262 and 1266, the allocated sub-channels are found and separated. In block 1254, the input signal is digitized at each subscriber terminal 130. The header is split from the payload in block 1258. The header is demodulated in block 1262. A determination in block 1266 as to whether the header corresponds to a sub-channel allocated to the ST 130. Where the header does not match, the process loops back to block 1254 to look at the next header.

Where the header matches an allocated header, processing goes from block 1266 to block 1270. The payload of the physical sub-channel is stored for offline processing of the logical downstream by the MAC block 1026. The MAC block 1026 process the allocated logical downstreams from the buffer in block 1274. When a payload is stored in block 1270, processing loops back to block 1254 to process the next physical sub-channel.

Figure 12B:
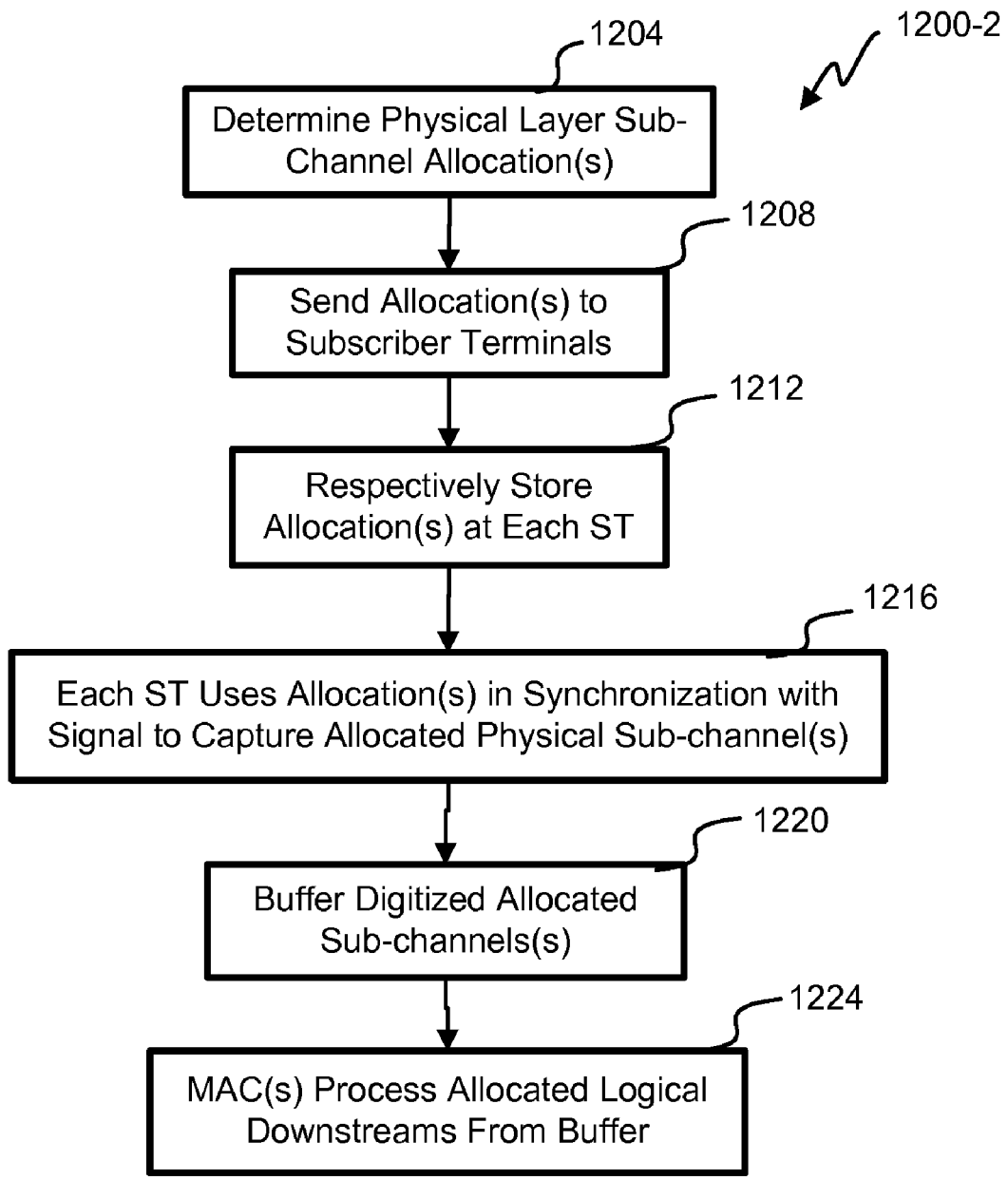

Referring next to FIG. 12B, a flowchart of another embodiment of a process 1200-2 for filtering out a physical sub-channel(s) is shown. This embodiment of the process 1200-2 could be performed on the sub-channel filter 1002 depicted in FIG. 11B, for example. The depicted portion of the process begins in block 1204 where the physical layer sub-channel allocation is determined by the SMTS 310. That allocation is sent over the satellite link to the satellite modems 132 in block 1208. Each ST 130 stores its allocation of sub-channel along with the information to capture those physical sub-channels in block 1212.

The sub-channel filter 1002 uses its allocation information in synchronization with the input signal to capture the allocated sub-channels in block 1216. Those allocated sub-channels are buffered in block 1220. The MAC block 1026 processes the logical downstreams from the gated-signal buffer 1105 in block 1224.

Figure 13:
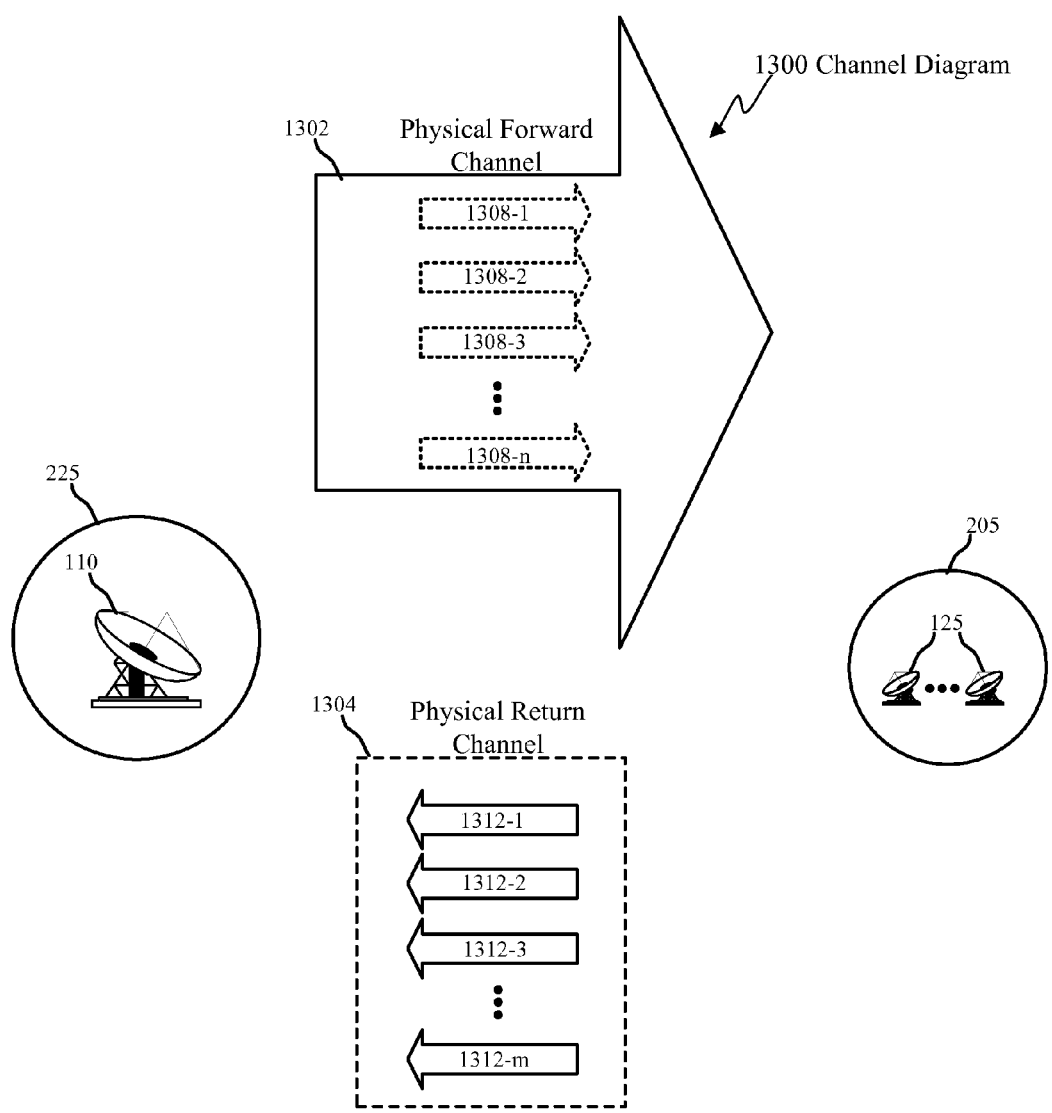
FIG. 13 depicts a diagram of an embodiment of a channel diagram.

Referring to FIG. 13, an embodiment of a channel diagram 1300 is shown. Only the channels for a single feeder spot beam 225 and a single service spot beam 205 are shown, but embodiments include many of each spot beam 225, 205 (e.g., various embodiments could have 60, 80, 100, 120, etc. service spot beams 205 and 5, 10, 16, 20, 25, etc. feeder spot beams 225). The forward channel 1302 includes n physical forward sub-channels 1308 traveling from the gateway antenna 110 to the service spot beam 205. Each satellite modem 132 may be allocated one or more of the physical forward sub-channels 1308. m MF-TDMA return sub-channels 1312 make up the physical return channel 1304 between the subscriber terminal (ST) antennas 125 and the feeder spot beam 225.

Figure 14A:
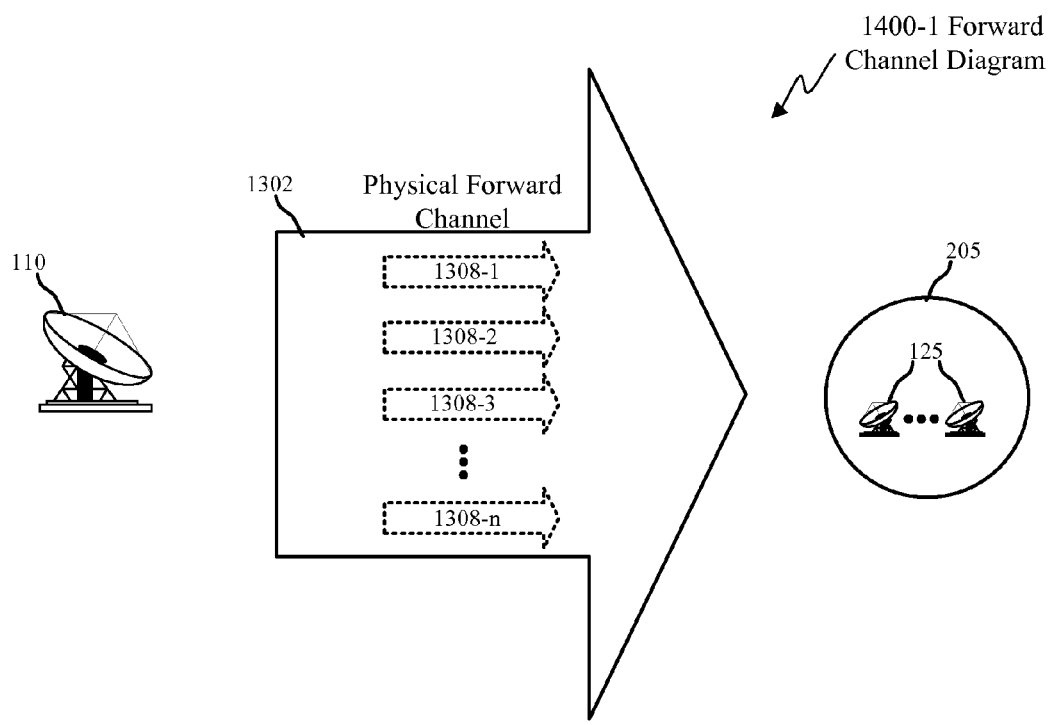
FIGS. 14A and 14B depict block diagrams of embodiments of a forward channel diagram, which goes from a gateway antenna to the subscriber terminal antennas in a service spot beam area.

With reference to FIG. 14A, an embodiment of a forward channel diagram 1400-1 is shown, which goes from a gateway antenna 110 to the subscriber terminal antennas 125 in a service spot beam area 205. The physical forward channel 1302 operates at above 1 Gbps in this embodiment such that a service spot beam 205 receives that bandwidth, but in other embodiments could be above 100 Mbps, 250 Mbps, 500 Mbps, 750 Mbps, 1.5 Gbps, 5 Gbps, or 10 Gbps or more. A single carrier is used for transporting the physical forward channel 1302, but other embodiments could use multiple carriers (e.g., 2, 3, 4, 6, 8, or more carriers). The satellite modem 132 tracks at full rate (e.g., 1 Gbps), but doesn't completely demodulate at full rate all of the time. Full demodulation and processing only happens for assigned physical forward sub-channels 1308 in the forward channel 1302. Demodulation may happen in spurts, to allow for processing over a longer period of time.

In this embodiment, the physical forward channel 1302 is shown as an arrow encapsulating n dashed arrows, which are the n physical forward sub-channels 1308. The physical forward sub-channels 1308 are fractional portions of forward channel 1302. In some embodiments, the forward channel 1302 is divided into superframes. The time occupied by the physical forward sub-channels 1308 could vary over time. By reducing the size of the physical forward sub-channels 1308, satellite modems 132 have to do less processing for their assigned physical sub-channel(s) 1308. For embodiments that do not use superframes, physical forward sub-channels 1308 are addressed to one or more satellite modems 132 without the rigidity of a superframe structure.

In one embodiment, the forward channel 1302 is destined for a DOCSIS MAC block 1026-2, but other embodiments could use a WiMAX MAC block or custom MAC block 1026-1. The DOCSIS MAC block 1026-2 expects the forward channel 1302 to behave like a cable television (TV) media. In this embodiment, the physical forward sub-channels 1308 are mapped to a cable TV channel or a logical downstream before processing by the DOCSIS MAC block 1026-2. There could be one or more physical forward sub-channels 1308 that are input to the DOCSIS MAC block 1026-2 as a single cable TV channel or logical downstream. In another embodiment, the DOCSIS MAC block 1026-2 could be capable of accepting multiple cable TV channels or logical downstreams simultaneously. The physical forward sub-channels 1308 could be in digital form or modulated before coupling to the DOCSIS MAC block 1026-2. In this way, the satellite physical layer can be mapped to the DOCSIS protocol in the data link layer.

Satellite modem 132 could be capable of processing different amounts of the forward channel 1302. Throughout the satellite communications system 100, there are a populations of satellite modems 132 that could have different maximum rates at which they can process the forward channel 1302. For example, some embodiments of the satellite modem 132 could process at ¼ datarate, ⅓ datarate, ½ datarate, ⅔ datarate, ¾ datarate, full speed or any other fraction of the full data rate. In some cases, the satellite modem 132 could be incapable of running beyond a specified fraction of the full rate or artificially capped even though capable of faster speeds. The gateway 115 knows the capability of each subscriber terminal 130 so as to not commit the subscriber terminal 130 to accepting data faster than can be processed.

Figure 14B:
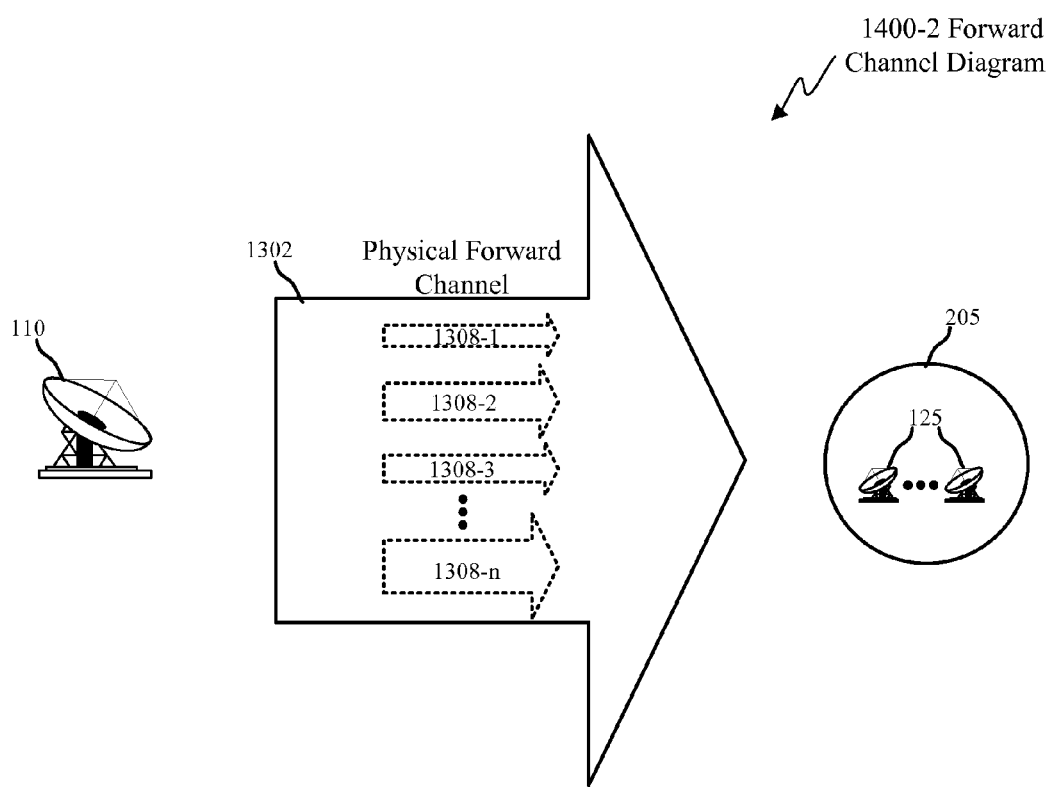

Referring next to FIG. 14B, another embodiment of a forward channel diagram 1400-2 is shown. This embodiment also has n physical forward sub-channels 1308, but each physical sub-channel 1308 could have a different size with a corresponding amount of time consumed for that size. These varying sizes could respectively vary over time for each physical sub-channel 1308 or could remain the same after provisioning. Each satellite modem 132 is assigned to one or more physical forward sub-channels 1308. The satellite modem 132 receives the forward channel 1302, but only completely processes the portion of the forward channel 1302 that has the physical sub-channel 1308. A physical sub-channel 1308 may or may not have data for each satellite modem 132 allocated to that physical sub-channel 1308. That is to say, a particular physical sub-channel 1308 could be assigned to a number of satellite modem 132 who would fully decode the particular physical sub-channel 1308 and not fully decode other physical forward sub-channels 1308.

Figure 15A:
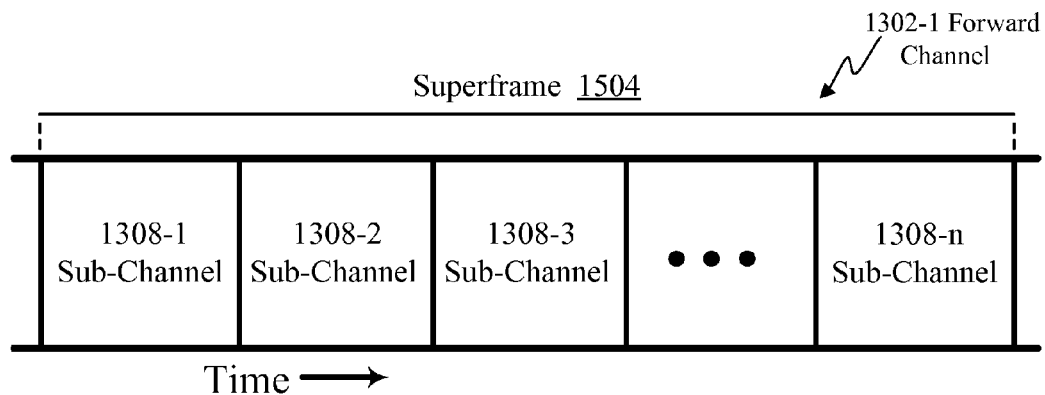
FIGS. 15A, 15B, 15C, and 15D depict diagrams of embodiments of a physical forward channel.

Referring next to FIG. 15A, an embodiment of a forward channel 1302-1 is shown. The forward channel 1302 includes a series of superframes 1504 in succession, where each superframe 1504 may have the same size or may vary in size. This embodiment divides a superframe 1504 into a number of physical forward sub-channels 1308. The physical forward sub-channels 1308 in each superframe 1504 are the same size in this embodiment, but other embodiments could have physical sub-channels that vary in time duration. The size of the physical forward sub-channels 1308 can change between different superframes 1504. Different coding and/or modulation can be optionally used for the various physical forward sub-channels 1308. In some embodiments, the physical forward sub-channels 1308 are as short as one symbol in duration or as long as hundreds of thousands of symbols.

Figure 15B:
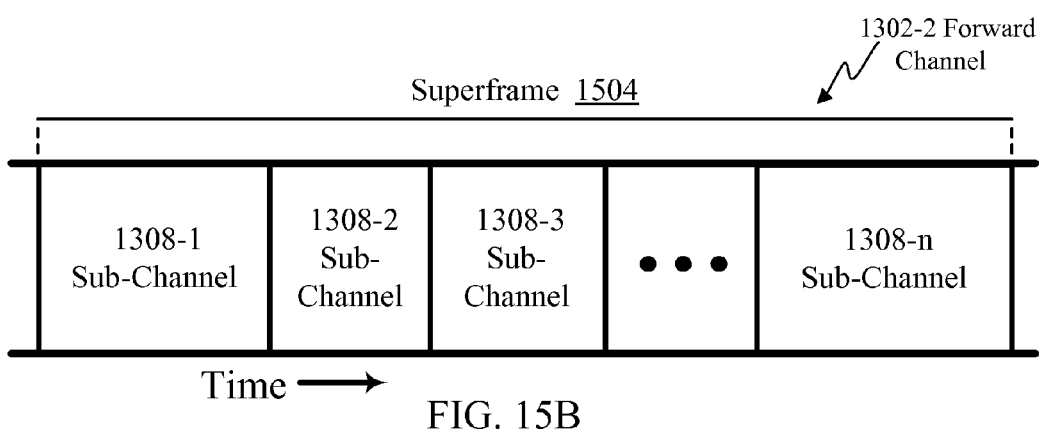

With reference to FIG. 15B, another embodiment of the forward channel 1302-2 is shown. This embodiment uses superframes 1504 that are the same size or could change in size. The superframe 1504 is divided into any number of physical forward sub-channels 1308. The number of physical forward sub-channels 1308 in the superframe 1504 could remain static or change over time. Each satellite modem 132 is told by SMTS 310 when the physical sub-channels allocated to the satellite modem 132 appear relative to the superframe 1504. The information to determine the allocation can appear in the forward channel 1302 or on another separate channel.

Figure 15C:
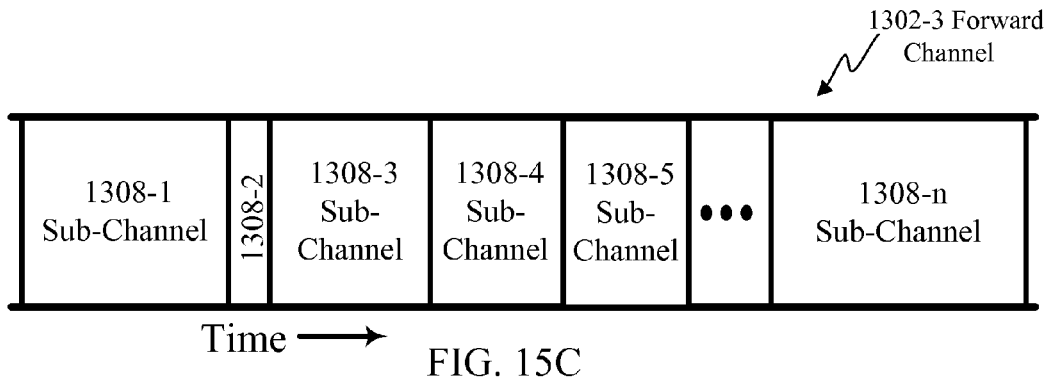

Referring next to FIG. 15C, yet another embodiment of the forward channel 1302-3 is shown. This embodiment does not break the forward channel into superframes. Instead, physical forward sub-channels 1308 are presented in series. The series could be a repeating sequence of physical forward sub-channels 1308 in order. Other embodiments could present physical forward sub-channels 1308 in an unpredictable manner according to the time needed to service those physical forward sub-channels 1308.

Figure 15D:
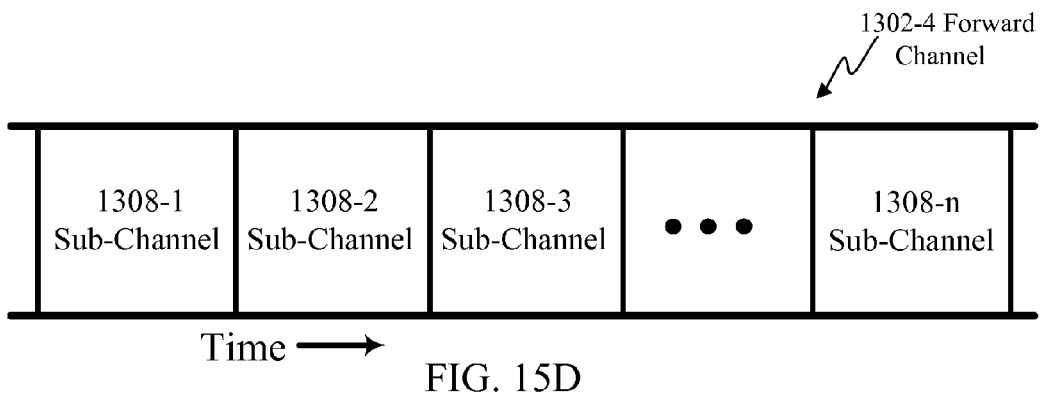

With reference to FIG. 15D, still another embodiment of the forward channel 1302-4 is shown. In this embodiment, the physical forward sub-channels 1308 are presented sequentially. Additionally, the physical forward sub-channels 1308 are equal in time-length. The coding, modulation and data rate within the physical sub-channel 1308 can vary. Additionally, the time-length of the physical forward sub-channels 1308 can remain the same or vary periodically.

Referring next to FIG. 16A, another embodiment of a forward channel 1302-1 is shown. This embodiment uses physical forward sub-channels 1308 of uniform size in each superframe 1504, but can vary the amount of physical forward sub-channels 1308 between superframes 1504. Since the size of superframes does not change in this embodiment, more physical forward sub-channels 1308 would decrease their size and vice-versa. Although not shown or done in this embodiment, some embodiments could vary the size of the superframe 1504 as the size of the physical forward sub-channels 1308 increases.

With reference to FIG. 16B, an embodiment of a forward channel 1302-2 is shown. This embodiment uses physical forward sub-channels 1308 of varying sizes and in varying numbers between superframes 1504. For example, the first superframe 1504-1 has x physical forward sub-channels 1308, the second superframe 1504-2 has y physical forward sub-channels 1308 and the third superframe 1504-3 has z physical forward sub-channels 1308, where x, y and z are different numbers. In one embodiment, each superframe 1504 contains 1 Gbit and divided among the physical forward sub-channels 1308 in varying amounts, but in other embodiments, the superframes 1504 could contain 100 Mbit, 250 Mbit, 500 Mbit, 750 Mbit, or 1.5 Gbit of information. Various embodiments could have varying numbers of the physical forward sub-channels 1308, for example, 4, 8, 16, 32, 64, 128, 256, 512, 1024, or 2048 physical sub-channels. In an extreme case, there could be as many physical forward sub-channels 1308 as there are symbols in a superframe 1504. There could be one or more satellite modems 132 assigned to a physical sub-channel 1308.

The use of the physical forward sub-channels 1308 is regulated by the SMTS 310 and can be done as a function of load balancing. The size of the physical forward sub-channels 1308 could be fixed and the number of satellite modems 132 assigned to each could change. As channels become loaded, the satellite modems 132 could be spread out among them. In an embodiment with dynamically sized physical forward sub-channels 1308, the sizes could expand and contract with the bandwidth for a set amount of assigned satellite modems 132.

With reference to FIG. 16C, yet another embodiment of a forward channel 1302-3 is shown. This embodiment does not divide the forward channel 1302 into superframes. The size of the time slice for each physical forward sub-channel 1308 varies over time. Satellite modems 132 can look at the header for each sub-channel 1308 to determine if the payload is meant for that satellite modem 132.

Referring next to FIG. 16D, still another embodiment of a forward channel 1302-4 is shown. This embodiment also does not use superframes to divide the forward channel 1302. Each sub-channel occupies the same sized time slice in this embodiment. At times, the size of the sub-channel could be modified.

Figure 17:
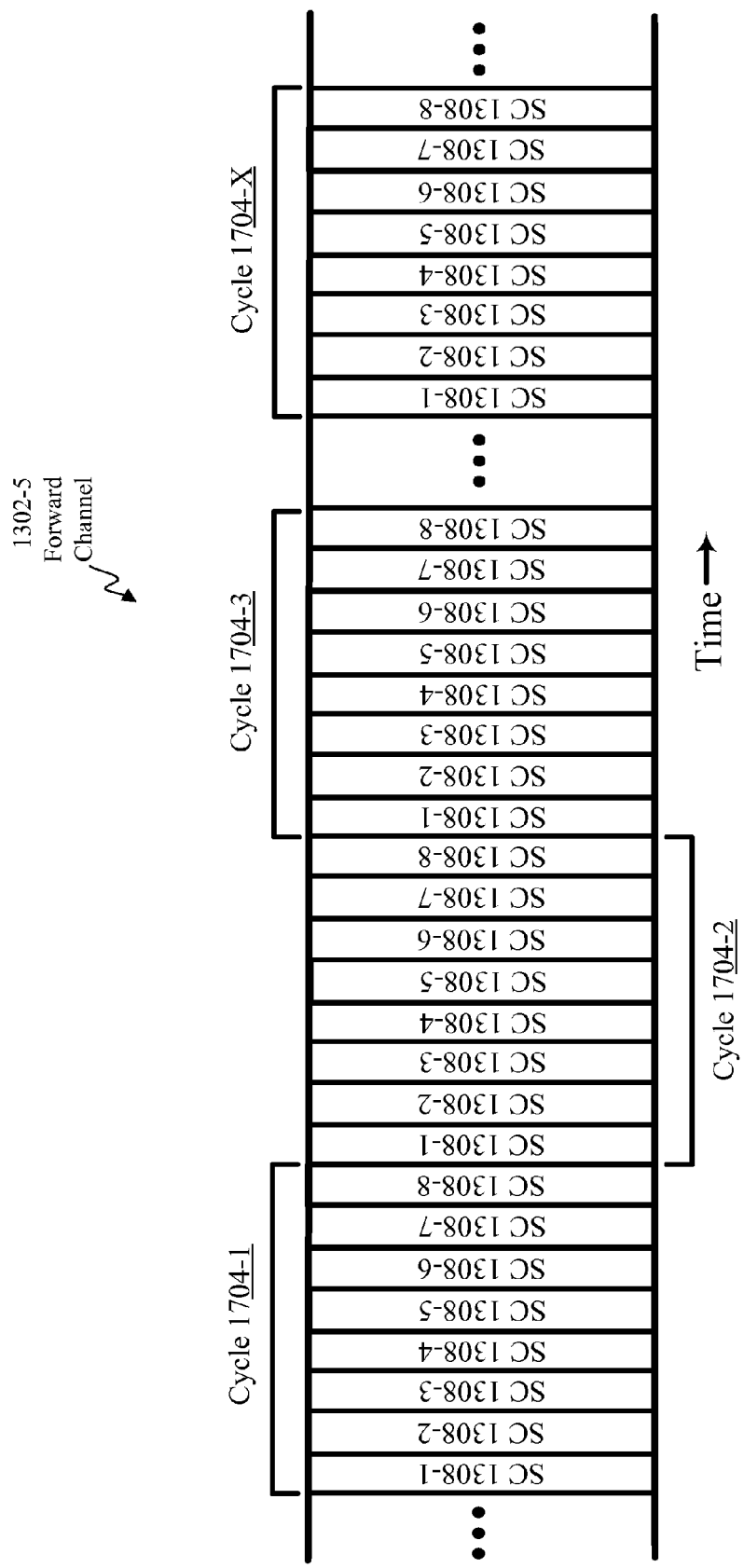
FIG. 17 depicts a block diagram of an embodiment of a physical forward channel.

With reference to FIG. 17, an embodiment of a physical forward channel 1302-5 is shown. In this embodiment, there are eight forward sub-channels 1308. Each sub-channel 1308 is a single symbol wide. The forward sub-channels 1308 repeat in a cycle 1704. To receive a particular sub-channel, every eighth symbol is decoded while the others are discarded. A particular satellite modem 132 may be assigned one or more forward sub-channels 1308.

Figure 18A:
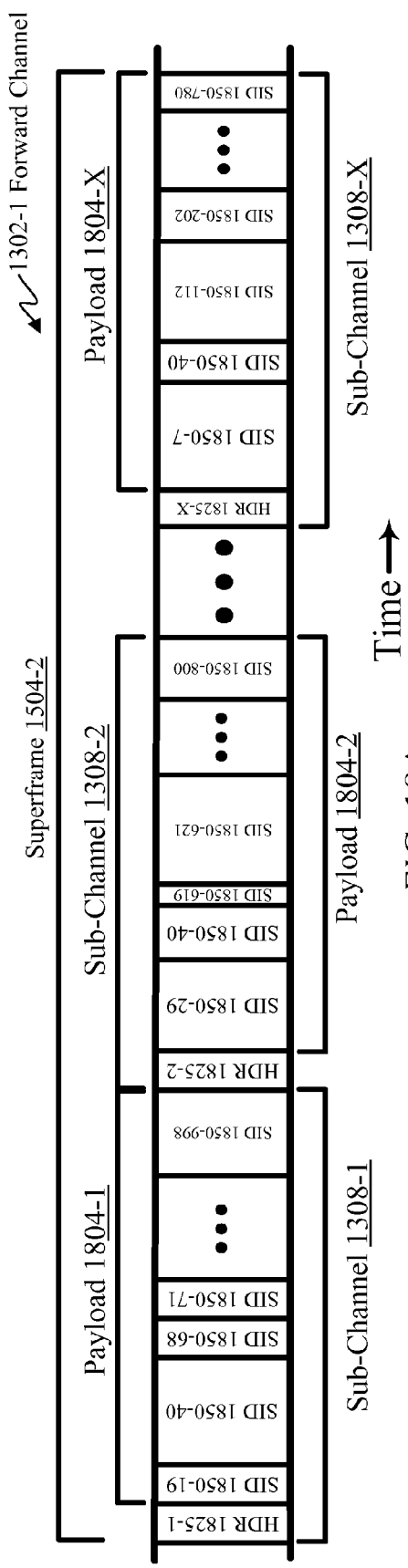
FIGS. 18A, 18B, 18C, and 18D depict diagrams of embodiments of a physical forward channel.

With reference to FIG. 18A, an embodiment of a physical forward channel 1302-1 is shown in greater detail than FIG. 16A. This embodiment has x physical forward sub-channels 1308 in the superframe 1504. Each physical sub-channel 1308 is identified with a header (HDR) 1825 and a payload 1804. The payload 1804 is further divided into packages referenced by a service identifier (SID) 1850. The SID 1850 may correspond to serial numbers of satellite modems 132 that should receive the packages designated by the SIDs 1850. The packages include command and control information processed by the MAC block 1026 and data passed to the CPE 160. In any event, each satellite modem 132 at the MAC layer is instructed to accept packages with certain SIDs 1850 or serial numbers while ignoring others.

Table 2 below shows an embodiment of mapping for a number of satellite modems 132, but a table or database for all satellite modems 132 would likely have thousands or millions of entries. Each satellite modem 132 only pays attention to certain physical forward sub-channels 1308 and accepts packages designated. For example, the first satellite modem 132 will strip off physical forward sub-channels four and seven 1308-4, 1308-7 from the physical forward channel 1302 in the PHY layer. Within physical sub-channels four and seven 1308-4, 1308-7, the first satellite modem 132 will accept any packages denoted by the first and seventeenth SID 1850-1, 1850-17 in the data link layer. For unicast information, only one satellite modem 132 is assigned a particular SID, but two or more satellite modems 132 may be assigned a particular SID for multicast information. For example, but the first and tenth satellite modems 132 will accept a multicast package designated by SID 1850-17 on physical sub-channel seven. Satellite modems 132 could be assigned additional physical sub-channels (SC) 1308 to get higher quality of service.

TABLE 2

SID Mapping for Satellite Modems

| Satellite Modem | Physical sub-channel(s) | SID(s) |
|---|---|---|
| 0001 | SC 4, SC 7 | SID 1, SID 17 |
| 0002 | SC 4, SC 7 | SID 19 |
| 0003 | SC 8, SC 10 | SID 7, SID 40 |
| 0004 | SC 12 | SID 68 |
| 0005 | SC 2, SC 39 | SID 71 |
| 0006 | SC 45, SC 11 | SID 40, SID 202, SID 998 |
| 0007 | SC 4 | SID 29, SID 112 |
| 0008 | SC 89 | SID 619 |
| 0009 | SC 90 | SID 621, SID 780 |
| 0010 | SC 12, SC 7 | SID 504, SID 17 |

Although the embodiment of Table 2 shows some satellite modems 132 receiving more than one physical sub-channel 1308 or more than one SID 1850, other embodiments may have one physical sub-channel 1308 and/or SID 1850. Table 3 shows an example of an embodiment that only allows one physical sub-channel 1308 per subscriber terminal 130 and only one SID 1850. Additionally, there could be universal SID(s) 1850 or group SID(s) 1850 that all or some satellite modems 132 accept as directed to them. Use of a SID 1850 that is used by more than one satellite modem 132 allows multicast of such as configuration commands and status messages, for example.

TABLE 3

SID Mapping for Satellite Modems

| Satellite Modem | Physical sub-channel(s) | SID(s) |
|---|---|---|
| 0001 | SC 4 | SID 1 |
| 0002 | SC 7 | SID 19 |
| 0003 | SC 10 | SID 7 |
| 0004 | SC 12 | SID 68 |
| 0005 | SC 39 | SID 71 |
| 0006 | SC 11 | SID 40 |
| 0007 | SC 4 | SID 29 |
| 0008 | SC 89 | SID 619 |
| 0009 | SC 90 | SID 621 |
| 0010 | SC 7 | SID 17 |

Each satellite modem 132 is told which SIDs 1850 and physical forward sub-channels 1308 to pay attention to. The SID 1850 assignments could be sent in each physical sub-channel 1308 using a predetermined SID 1850 such that each satellite modem 132 knows to review the predetermined SID 1850 to find SID 1850 assignments or an instruction for a subscriber terminal to look at another physical sub-channel. In this way, satellite modems 132 can be moved among sub-channels and assigned to various SIDs 1850. The predetermined SID 1850 could be the same for each physical sub-channel 1308 or customized for each physical sub-channel 1308.

Figure 18B:
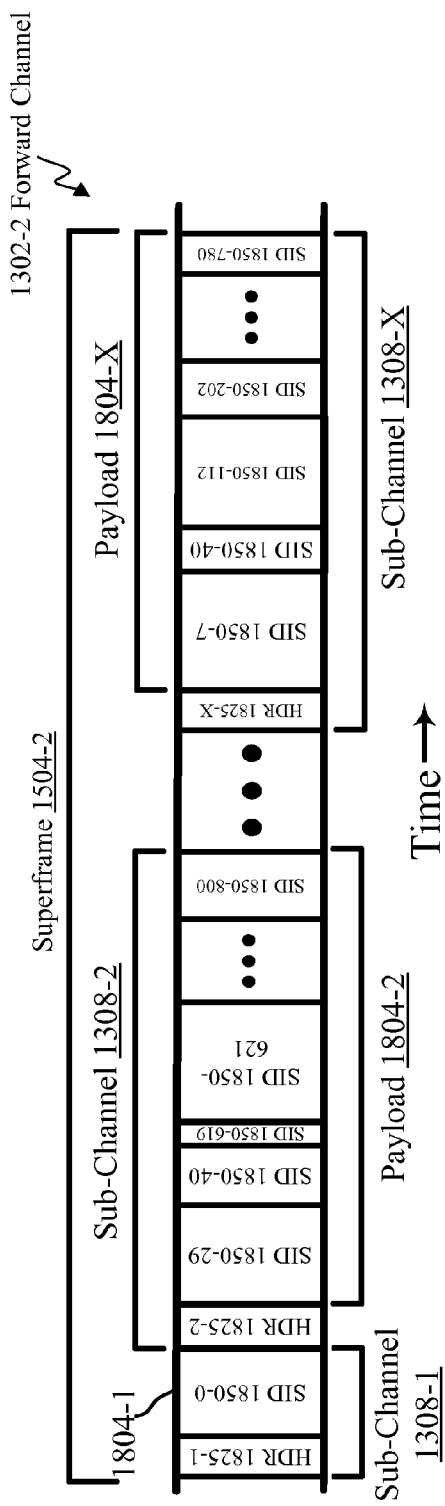

Referring next to FIG. 18B, another embodiment of a physical forward channel 1302-2 is shown in greater detail than FIG. 16B. This embodiment has a first physical sub-channel 1308-1 dedicated to delivering a predetermined SID 1850-0 having physical sub-channel and SID assignments. Each satellite modem 132 would couple to the forward channel 1302 find the first physical sub-channel 1308-1 to find the predetermined SID 1850-0 and start accepting the specified physical forward sub-channels 1308 and packages specified by the assigned SIDs in those physical forward sub-channels 1308. The package designated by the predetermined SID 1850-0 could also specify the size and structure of the superframe 1504-2 and physical forward sub-channels 1308, but other embodiments could use autocorrelation to find the beginning of superframes 1504 and/or physical forward sub-channels 1308. Some embodiments could send the first physical sub-channel 1308-1 on an infrequent basis such as every two, three, five, or ten superframes 1504.

In one embodiment, the physical forward sub-channels 1308 are defined as some fraction of the symbols as shown in FIG. 17. For example, there could be eight physical forward sub-channels 1308 where every eighth symbol corresponds to a particular physical sub-channel 1308. Each subscriber terminal 130 would look at a symbol, ignore seven and then look at another.

One embodiment could avoid further division of the superframe 1504 beyond the physical sub-channel 1308. Each satellite modem 132 would be given their own physical sub-channel 1308 that could vary in length. The location of the physical sub-channel 1308 for a particular satellite modem 132 could be changing in each superframe. A map could indicate the location of the physical sub-channel 1308 or the satellite modem 132 could just look for headers in the general location of the superframe 1504 to avoid processing the whole superframe 1504 in order to find the particular physical sub-channel 1308 of interest.

Figure 18C:
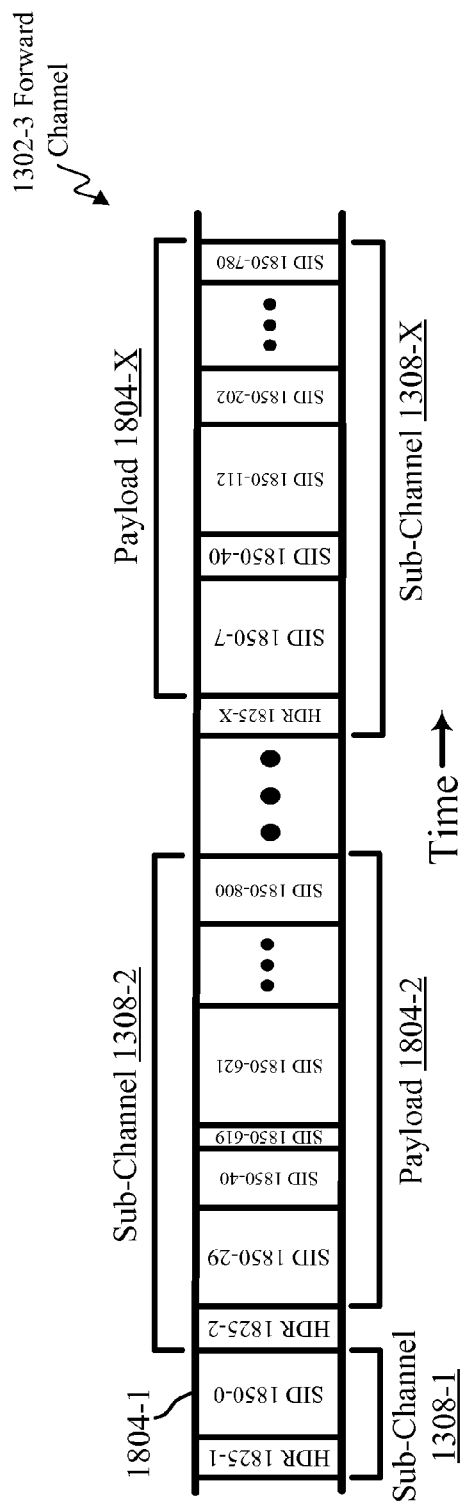

With reference to FIG. 18C, an embodiment of a physical forward channel 1302-3 is shown in greater detail than FIG. 16C. This embodiment does not use superframes and has forward sub-channels 1308 of different sizes.

Figure 18D:
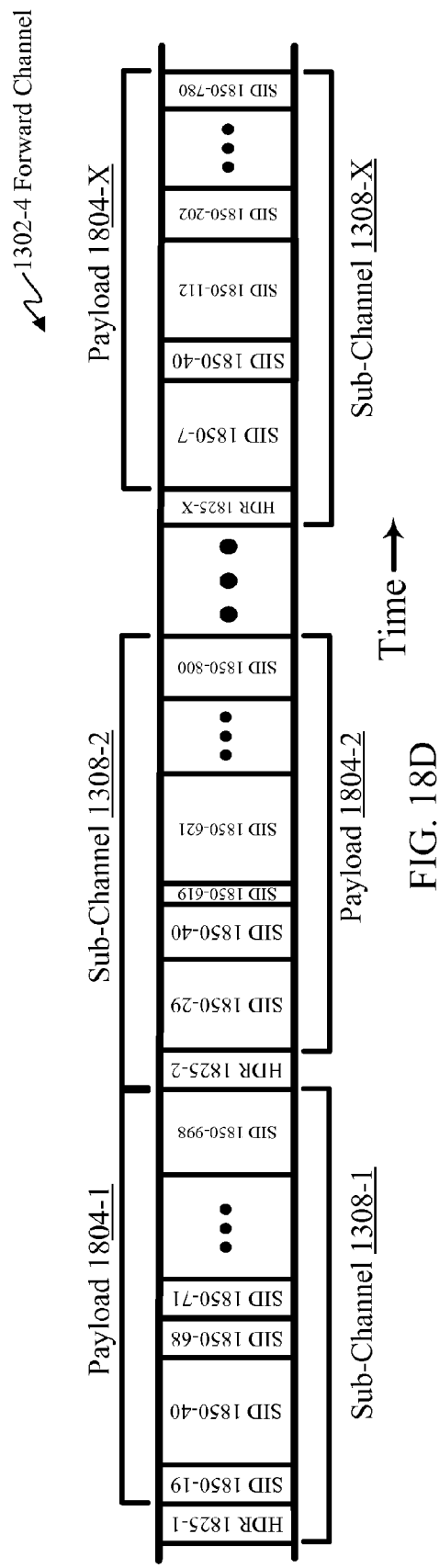

Referring next to FIG. 18D, an embodiment of a physical forward channel 1302-4 is shown in greater detail than FIG. 16D. This embodiment also does not use superframes, but all of the forward sub-channels 1308 of the same size. The coding and/or modulation could be different for the forward sub-channels 1308 such that the amount of data in a sub-channel 1308 varies even if the time slice remains the same.

The system 100 is organized into a number of domains as shown in Table 4. The MAC sub-layer for each satellite modem 132 operates in a domain or a MAC domain. For example, a domain may correspond to an Internet service provider (ISP) entity. A domain is a logical group of satellite modems that is organized centrally. The domain manages assignment of SIDs 1850 for the satellite modems 132 in the domain. Provisioning service, quality of service and other command and control is specified by the domain. The scheduling of forward and return sub-channels 1308, 1312 is managed within the domain.

An algorithm in the SMTS 310 for each gateway 115 can regulate the domain. The algorithm can also coordinate among the various gateways 115 in the system 100. The system 100 can lease out sub-channels 1308, 1312 to various domains and coordinate their administration. The domain can operate in one, some or all service spot beams 205. The allocation of sub-channels between domains may vary in different service spot beams 205. Different domains may price their service in different ways offering different quality of service and terms of service, for example.

TABLE 4

Domain Mapping for One Service Spot Beam

| Entity | Domain | Forward SC | Return SC | Satellite Modem(s) |
|---|---|---|---|---|
| SatWISP | A | SC 1, SC 4 | SC 1 | 0001, 0009 |
| ACME | B | SC 3 | SC 2 | 0002, 0013 |
| Smith Internet | C | SC 5 | SC 3 | 0003, 0004, 0010 |
| Carlsbad ISP | D | SC 6 | SC 4 | 0005 |
| Satellite BB | E | SC 7 | SC 8 | 0006, 0008 |
| Smith Internet | F | SC 8 | SC 5, SC 6 | 0007, 0014 |
| NewCo | G | SC 2 | SC 7 | 0011, 0012 |

There are a number of satellite modems assigned to each domain. The entity in charge of the domain may have a single forward sub-channel and a single return sub-channel, for example. ACME occupies domain A and includes satellite modems 0001 and 0009 in a particular service spot beam 205. ACME controls the third forward sub-channel 1308-3 and the second return sub-channel 1312-2. The bandwidth in these sub-channels 1308, 1312 can be allocated in any way chosen by the domain between satellite modems 0001 and 0009.

Domains are separately managed in this embodiment. There could be multiple domains associated with a particular entity. For example, Smith Internet separately manages both domains C and F. In a channelization layer, satellite modems 132 could be moved between the two domains associated with Smith Internet. In the SMTS, a scheduling function could operate in the channelization layer to assess loading of a particular domain and its forward or return sub-channels 1308, 1312. A satellite modem 132 could be moved from one domain to another when the sub-channels become utilized beyond a particular threshold.

Domains may be separately managed due to regulatory requirements. For example, government information may be kept segregated from home Internet access by using separate domains. Those domains would have separate sub-channels 1308, 1312. Domains could be used for other reasons to segregate information from other groups of satellite modems 132. For example, the government could set up different domains for different levels of classification.

Figure 19A:
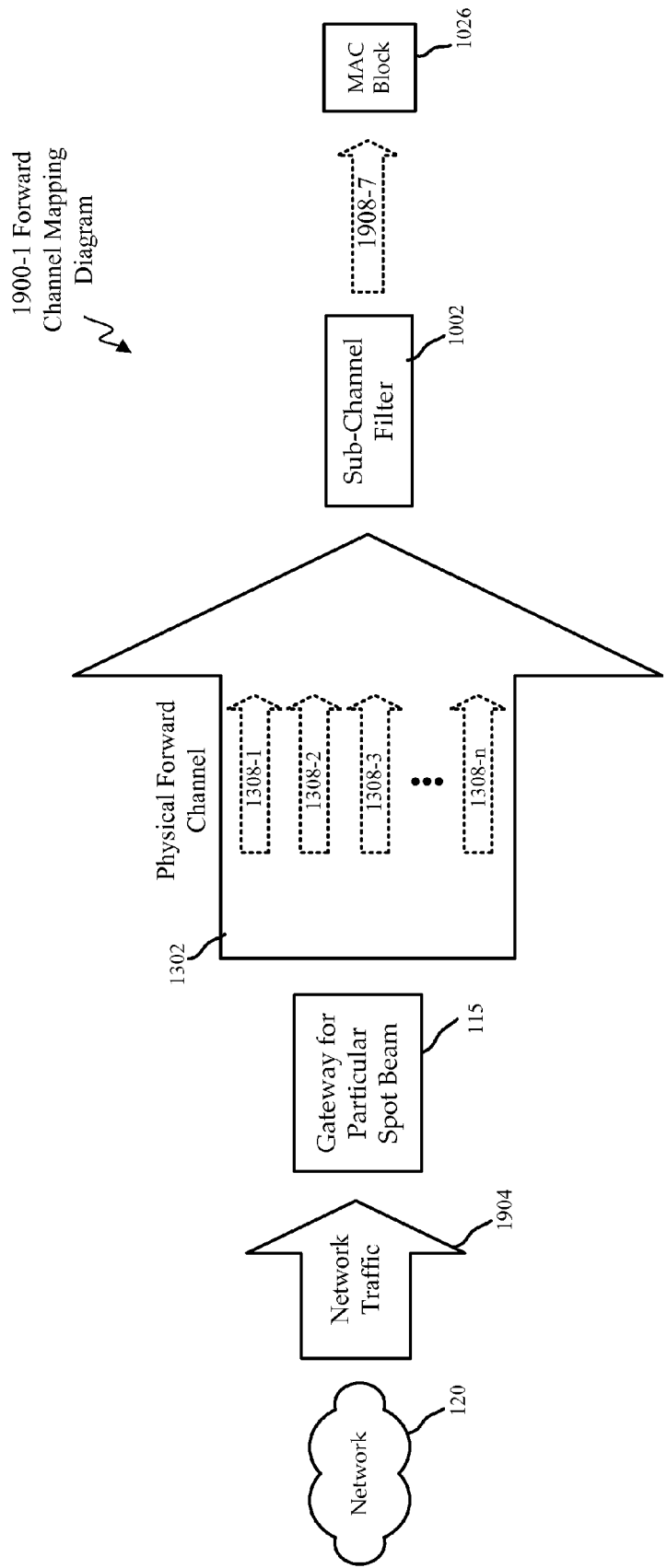
FIGS. 19A, 19B, 19C, and 19D depict diagrams of embodiments of a forward channel mapping diagram.

With reference to FIG. 19A, an embodiment of a forward channel mapping diagram 1900-1 is shown. The network 120 generates network traffic 1904 that is routed to the gateway 115. A determination is made in the SMTS 310 to which service spot beam 205 the target satellite modem 132 uses. The physical forward channel 1302 for that spot beam 205 is used. Within each satellite modem 132 within the service spot beam 205, the sub-channel filter 1002 screens for sub-channels allocated to the particular satellite modem 132. The assigned sub-channels become logical downstreams 1908. For example, the seventh sub-channel 1308 becomes the seventh logical downstream 1908-7, which is passed to the MAC block 1026 where SIDs 1850 are monitored for packages meant for the satellite modem 132. In this embodiment, the physical forward sub-channels 1308 are all the same size in time duration and the MAC block 1026 processes a single logical downstream 1908.

Figure 19B:
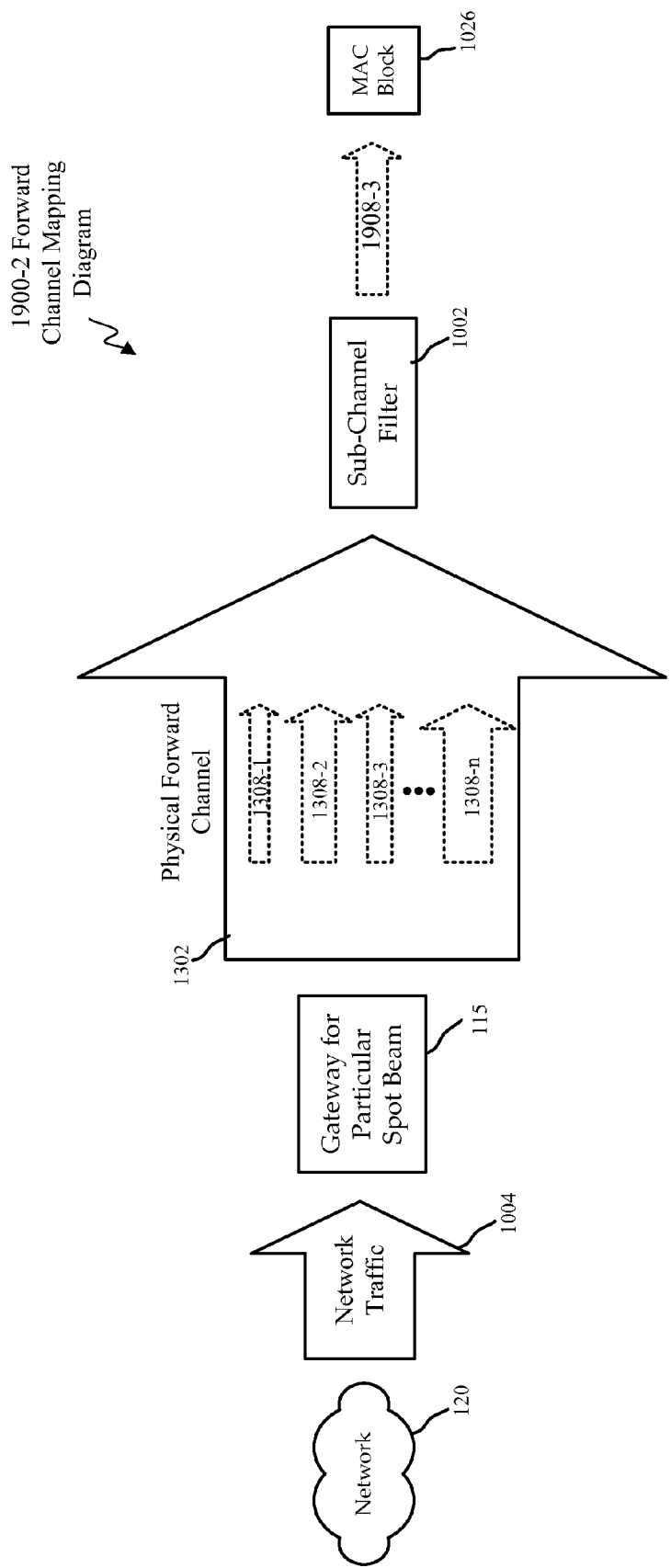

With reference to FIG. 19B, an embodiment of another forward channel mapping diagram 1900-2 is shown. In this embodiment, the physical forward sub-channels 1308 vary in the size of the time slice consumed on the physical forward channel 1302.

Figure 19C:
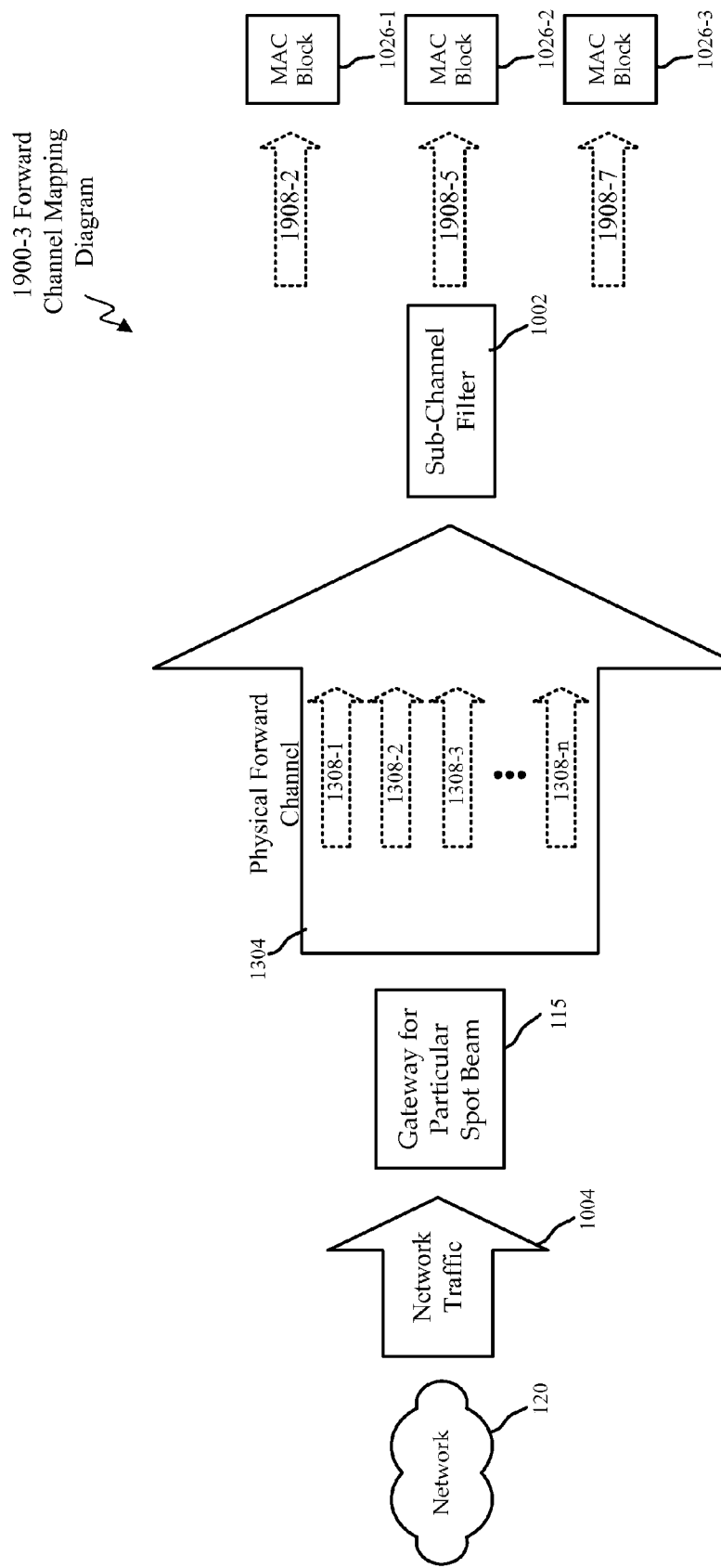

With reference to FIG. 19C, an embodiment of yet another forward channel mapping diagram 1900-3 is shown. In this embodiment, three logical downstreams 1908 are used by the satellite modem 132. The satellite modem 132 has three logical downstreams that can be processed at a time. Three MAC blocks 1026 are used in this embodiment to separately process the three logical downstreams 1908.

Figure 19D:
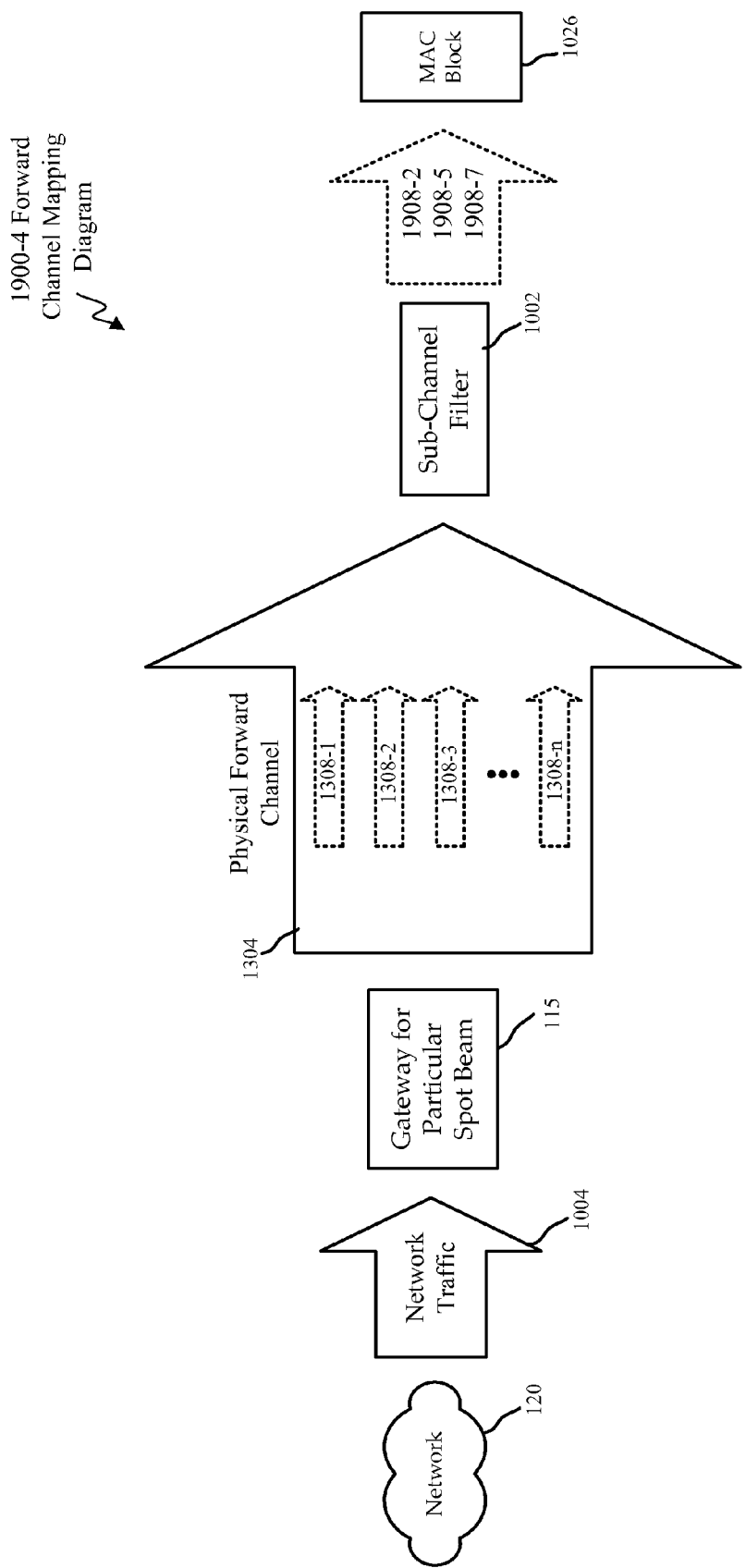

With reference to FIG. 19D, an embodiment of still another forward channel mapping diagram 1900-4 is shown. This embodiment also processes a number of logical downstreams at the same time. For example, three are processed in parallel, but other embodiments could process two, four, five, seven, or ten or more. The MAC block 1026 in this embodiment is capable of parallel processing of the logical downstreams 1908. The MAC block 1026 could have a single processing path in other embodiments and use buffering to process multiple logical downstreams 1908 with the single processing path.

In one embodiment, the logical downstreams 1908 are bonded together into a downstream channel group. This could be done prior to the MAC block 1026 or within the MAC block 1026. The multiple logical downstreams 1908 would be combined into a single bonded datastream. Information intended for other satellite modems 132 could be screened out prior to bonding. In this way, a single satellite modem 132 could gather information from multiple physical sub-channels 1308.

Figure 20:
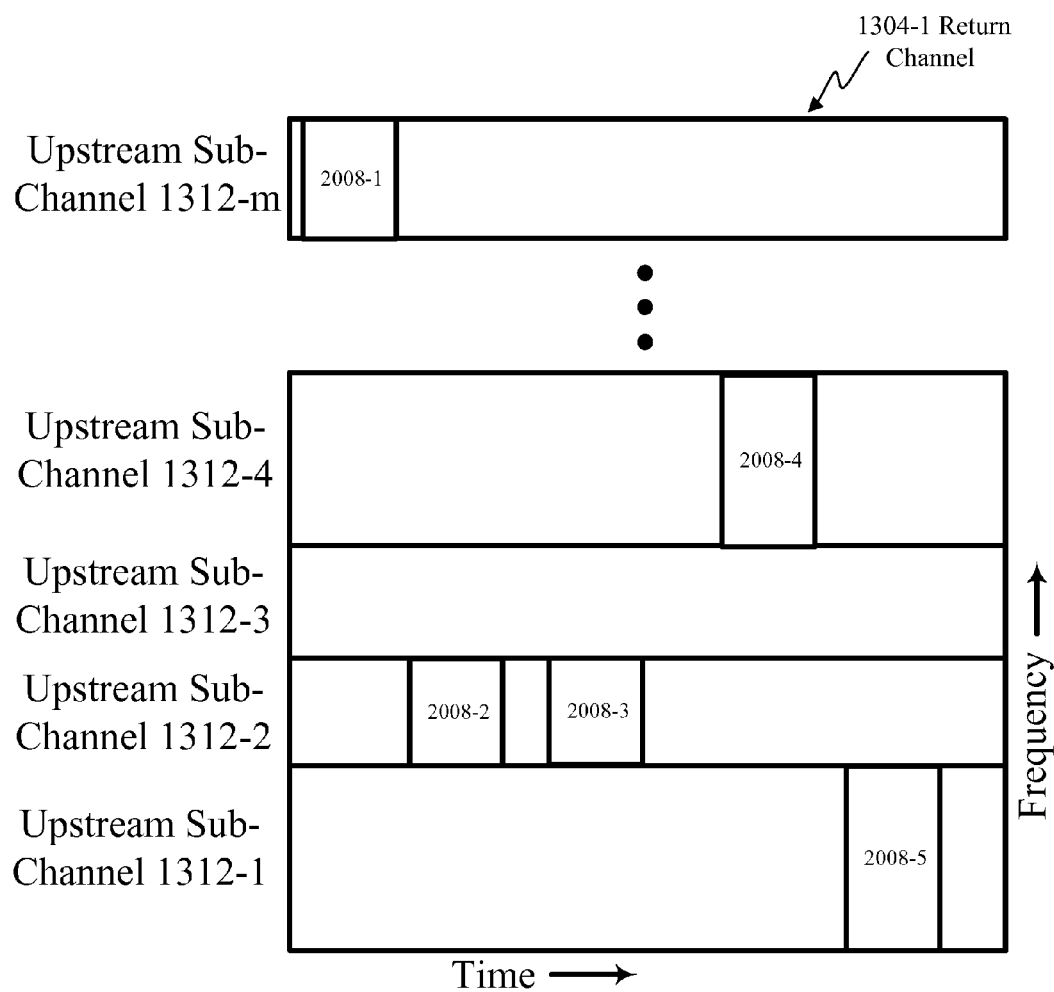
FIG. 20 depicts a diagram of an embodiment of a physical return channel.

With reference to FIG. 20, an embodiment of a physical return channel 1304-1 is shown. This embodiment uses MF-TDMA, but other embodiments can use CDMA, OFDMA, or other access schemes. The physical return channel 1304 has 500 MHz of total bandwidth in one embodiment. The total bandwidth is divided into m frequency return sub-channels 1312, which may differ in bandwidth, modulation, coding, etc. and may also vary over time based on system needs.

In this embodiment, each satellite modem 132 is sent a two-dimensional (2D) map to use for its upstream traffic. The two-dimensional map has a number of entries where each indicates a upstream sub-channel 1312 and time segment 2008 that can be used on the sub-channel 1312. For example, one satellite modem 132 is allocated return sub-channel m 1312-*m*, time segment one 2008-1; return sub-channel two 1312-2, time segment two 2008-2; return sub-channel two 1312-2, time segment three 2008-3; etc. The 2D map is dynamically adjusted for each satellite modem 132 according to anticipated need by the SMTS 310.

Figure 21:
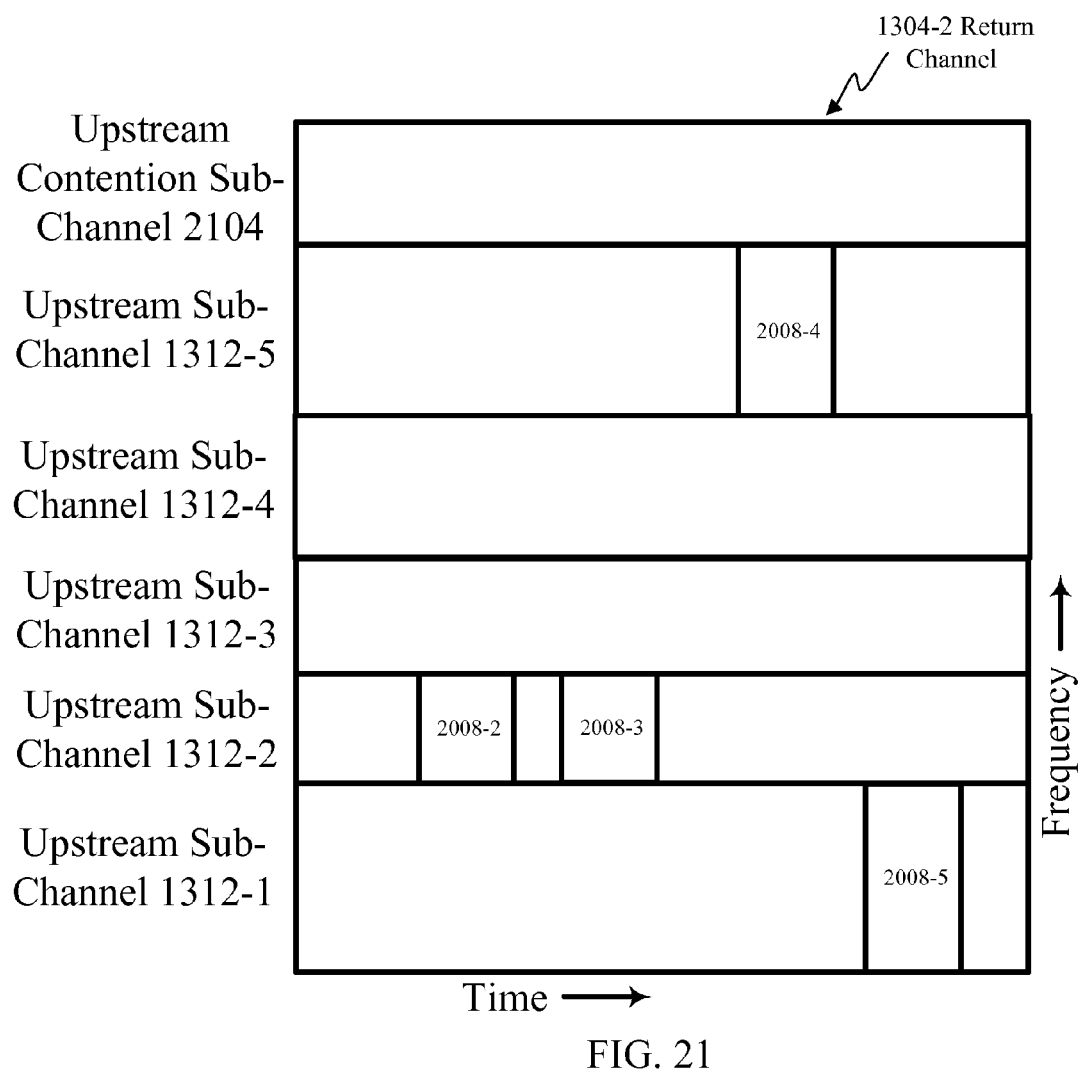
FIG. 21 depicts a diagram of an embodiment of a physical return channel.

Referring next to FIG. 21, another embodiment of a physical return channel 1304-2 is shown. This embodiment also uses MF-TDMA to separate transmissions. There are six upstream return sub-channels 1312 in this embodiment. Five of the upstream return sub-channels 1312 are scheduled such that the satellite modem 132 is the only transmitter for a particular time segment 2008. The sixth upstream sub-channel is a contention sub-channel 2104, which allows any satellite modem 132 to transmit at any time. There will be times where the transmissions overlap in a way that doesn't allow recovery of the two or more transmissions. The affected satellite modems 132 retransmit again and again until the message goes through. This embodiment has a fixed number of scheduled and contention return sub-channels 1312, 2104, but any number of each could be used in other embodiments. Some sub-channels could be switched from scheduled to contention or vice-versa dynamically in another embodiment.

High Data Rate Multiplexing Satellite Stream to Low Data Rate Subscriber Terminals In an embodiment, a single symbol stream on a single carrier (i.e., the physical forward channel 1302) is relayed through a satellite 105 in the forward direction. The symbol stream is logically divided into a plurality of physical forward sub-channels 1308. A number of satellite modems 132 accept some physical sub-channels 1308, but not others according to how the physical sub-channels 1308 are remotely assigned by the SMTS 310. In one example, the single symbol stream operates at 1 Gbps or more, uses a single carrier, and/or has three or more sub-channels. The satellite modem 132 tracks the physical forward channel 1302 at full rate, but only fully decodes a subset defined by one or more physical sub-channels 1308. The processing of the physical sub-channel(s) 1308 can be done at a slower rate than the symbol stream of the physical forward channel 1302. Embodiments map the physical sub-channels 1308 to logical downstreams 1908 in the MAC sub-layer.

In one embodiment, multiple logical downstreams 1908 share the same physical forward channel 1302 using the technique of time-division multiplexing of multiple physical sub-channels 1308 onto a single RF carrier in each service spot beam 205. Information is grouped in physical sub-channels 1308 in the PHY layer that correspond to logical downstreams 1908 in the MAC sub-layer. Individual modems 132 are addressable by service ID (SID) 1850 within the logical downstream 1908. When the MAC block 1026 sees a package identified with the SID 1850, it captures and processes that information.

In various embodiments, the number and configuration of sub-channels 1308 changes over time. These changes are done at the channelization sub-layer irrespective of what is done at the coding and modulation sub-layer. In addition to varying the number or size of the physical sub-channels 1308 over time or within frames, the relative size in the time domain and/or bandwidth can also be varied. One or more modems 132 are associated with the physical sub-channels 1308 and their corresponding logical downstreams 1908. Other embodiments could keep the number or physical sub-channels 1308 constant after initial provisioning.

Multiple MAC Domains

Multiple logical downstreams 1908 are supported over a single physical forward channel 1302 in this embodiment. Multiple domains are supported over the physical forward channel 1302. Multiple service provider entities can operate independent networks over the same satellite link. The entities could operate in one, some or all service spot beams 205. Any number of satellite modems 132 could belong to a particular domain.

Each domain includes one or more physical forward sub-channels 1308 and one or more physical return sub-channels 1312. Some embodiments limit the domain to a single physical forward sub-channel 1308, while others allow bonding of physical forward sub-channels 1308 to allow aggregating logical downstream 1908 within a domain. Embodiments that allow channel bonding, can have up to four logical downstreams 1908 in a domain. Other embodiments could bond two, three, five, seven, or ten or more physical forward sub-channels 1308 under the control of a single domain.

Each MAC domain has its own set of subscriber terminals 130 and associated CPE 160. Each domain also supports its own set of Service IDs and independently operates its own MAC allocation and management protocol, etc. to provide device identification, class-of-service management and upstream bandwidth allocation.

Intra-Domain Load Balancing

Some embodiments allow load balancing of satellite modems 132 between physical forward sub-channels 1308. The bandwidth requirements of the various satellite modems 132 allocated to a domain are analyzed. Satellite modems 132, which can be moved between various physical forward sub-channels 1308, are moved among physical forward sub-channels 1308 of a domain such that loading is likely to be uniform in one embodiment. Bandwidth allocations to satellite modems 132 assigned to a physical forward sub-channels 1308 can be adjusted based upon the amount of information being sent to each satellite modem 132 in the domain. Buffering and latency are monitored in the SMTS 310 to allow dividing physical forward channel 1302 delay either uniformly or according to tiers of quality of service. The physical forward sub-channel size can be adjusted relative to other physical forward sub-channels 1308 according to loading of satellite modem 132 in assigned to that physical forward sub-channel 1308. The physical forward sub-channels 1308 could be of different sizes in one embodiment with some scheme to distribute satellite modem 132, for example, low-bandwidth users in small physical forward sub-channels 1308 or infrequent users in small physical forward sub-channels 1308.

Rather than move satellite modems 132 between physical forward sub-channels 1308 in the same domain, the satellite modems could be moved between domains. Each MAC domain has one or more associated satellite modems 132. Moving satellite modems between domains can be used to effect load balancing, for subscriber segregation or for other functions. The domains are separately managed and may or may not be associated with different service provider entities.

The SMTS 310 includes a RM/LB block 620 to schedule the forward link. The RM/LB block 620 has knowledge of the modem decode speed for each domain. The decode speed could be defined by the capability of the satellite modem 132 or artificially capped below the capability of the satellite modem 132. The scheduling function of the RM/LB block 620 schedules modems 132 according to speed of download that can be handled by modem, for example, half-rate or quarter-rate modem. When a particular modem is requesting information, it is not sent on the forward channel 1302 in a manner faster than can be or should be decoded.

Physical return sub-channels 1304 can be scheduled for each domain independently. Each satellite modem is given a two-dimensional map indicating frequency or return sub-channel 1312 and time segment 2008 such that a particular satellite modem 132 is changing frequency to transmit in the proper time segment. Some embodiments of the satellite modem 132 allow transmission on two frequencies at the same time such that the time segments 2008 overlap.

Downstream Channel Bonding

In one embodiment, multiple logical downstreams 1908 operate over a single physical forward channel 1302 on a single carrier. A satellite modem 132 can simultaneously receive multiple logical downstreams 1908. These logical downstreams 1908 could be bonded together to form a single downstream channel group. The downstream bandwidth available to the satellite modem 132 can be increased by using bonding.

Some satellite modems could only receive a single logical downstream 1908, while others could receive multiple logical downstreams 1908. In scheduling information, the SMTS 310 knows which type of satellite modem 132 is receiving the information and uses a single logical downstream 1908 or multiple logical downstreams 1908. Additionally, the bandwidth needs of the satellite modem 132 are accounted for in the SMTS 310.

Dynamic Sub-Channel Sizing

This embodiment allows dynamic allocation of physical forward sub-channels 1308 between domains. The domains are kept separate for billing, traffic model, quality of service, regulatory or convenience purposes. The domains co-exist on the same physical forward or return channel 1302, 1304, but are separated by their respective physical sub-channels (SC) 1308, 1312. For example, Tables 5 and 6 show allocation of physical sub-channels 1308, 1312 in the morning and evening. Sub-channels used by education are reassigned to residential internet in the evening.

TABLE 5

Domain Mapping for One Service Spot Beam in Morning

| Entity | Domain | Forward SC | Return SC | Satellite Modem(s) |
|---|---|---|---|---|
| Government | A | SC 1, SC 4, SC7 | SC 1, SC 2 | 0001, 0009 |
| Education | B | SC 2, SC 3, SC6 | SC 3, SC 4 | 0002, 0013 |
| Point of Sale | C | SC 5 | SC 5, SC 6 | 0003, 0004, 0010 |
| Residential Internet | D | SC 8, SC 9 | SC 7, SC 8 | 0005, 0006, 0007, 0008 |

TABLE 6

Domain Mapping for One Service Spot Beam in Evening

| Entity | Domain | Forward SC | Return SC | Satellite Modem(s) |
|---|---|---|---|---|
| Government | A | SC 1, SC 4, SC7 | SC 1, SC 2 | 0001, 0009 |
| Education | B | SC 2 | SC 3 | 0002, 0013 |
| Point of Sale | C | SC 5 | SC 5, SC 6 | 0003, 0004, 0010 |
| Residential Internet | D | SC 8, SC 9, SC 3, SC6 | SC 7, SC 8, SC 4 | 0005, 0006, 0007, 0008 |

Separate domains are allocated sub-channels 1308, 1312 differently based upon priority, time of day and quality of service. For example, there could be an education domain, a basic home Internet domain, a point-of-sale domain, and a government domain. A time of day algorithm could limit the sub-channels 1308, 1312 when school is out of session for the day or due to weekends or vacations. Some domains could be given priority to expand to occupy under utilized sub-channels 1308, 1312.

Some embodiment could simply observe usage on each domain. When there is overloading or usage beyond a threshold, the SMTS 310 could start re-assigning the sub-channels 1308, 1312. A particular domain may have a floor specifying the least amount of sub-channels that can be assigned 1308, 1312. In the allocation, the floor level of service is provided at all times. For example, the education domain B could have a minimum of one forward and return sub-channel 1308, 1312 specified that would grow to a maximum of three forward sub-channels 1308 and two return sub-channels 1312.

Although some embodiments could have an allocation of forward sub-channels 1308 to a satellite modem 132 according to some predetermined schedule, other embodiments could dynamically adjust the sub-channel allocation and adjust the allocation when there is under- or over-utilization. The various domains could have a defined priority that allow excess capacity to be allocated or removed according to priority.

This embodiment presumes forward sub-channels 1308 of the same size, but other embodiments could adjust the sub-channel size to change the relative allocation of bandwidth. These embodiments could take a hybrid approach of expanding sub-channel size some amount before allocating additional sub-channels to a particular satellite modem 132.

MAC Chip Adapted

In one embodiment, off-the-shelf DOCSIS terrestrial cable chips are used for satellite broadband modems. Some embodiments use WiMAX chips in satellite system instead of DOCSIS chips. The satellite physical layer is translated to a DOCSIS physical layer such that the off-the-shelf DOCSIS terrestrial cable chip could be used.

Referring to Table 7, it shows various layers of abstraction in a reference model. A new translation layer is inserted between the satellite PHY layer and the data link layer. This embodiment uses an off-the-shelf DOCSIS terrestrial cable chip, which the translation layer spoofs into thinking that the terrestrial cable chip is communicating with a terrestrial cable plant rather than a satellite link.

TABLE 7

Satellite Link Communication Layers

| Layer | Function |
| --- | --- |
| Application Layer | Application layer for subscriber equipment |
| Transport Layer | Responds to service request from Application Layer |
| Network Layer | Network interface to subscriber terminal |
| Data Link Layer | Media Access Control (MAC) Sub-layer for DOCSIS Logical Link Control (LLC) Sub-layer for DOCSIS |
| Translation Layer | Satellite PHY layer is translated to a DOCSIS physical layer |
| PHY Layer | Channelization Sub-layer limits information decoded for the physical sub-channel, which is a fraction of the physical forward channel Coding & Modulation Sub-layer allows static or adaptive coding and modulation Satellite Transport Sub-layer allows transport over satellite link(s) |

Figure 22:
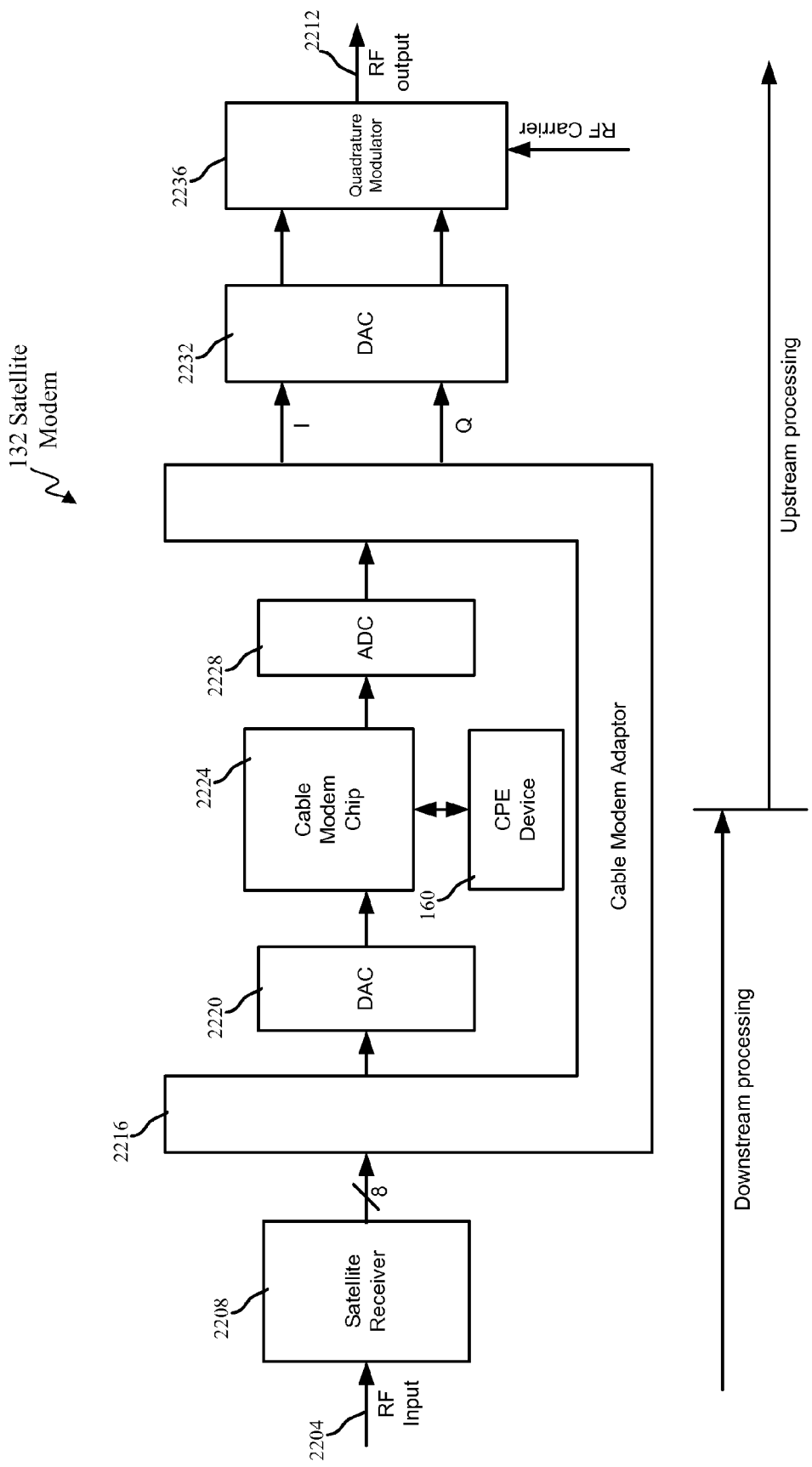
FIG. 22 depicts a block diagram of an embodiment of a satellite modem and customer premises equipment (CPE)

FIG. 22 is a simplified block diagram of a satellite modem 132 and CPE 160 according to one embodiment of the present invention. Satellite modem 132 receives and processes a downstream RF input signal 2204 from a satellite source. RF input signal 2204, for example, may represent a Ka-band or a Ku-band satellite transmission. In some embodiments, RF input signal 2204 may be produced by a subscriber terminal termination system (SMTS) 310 or gateway device and received by satellite modem 132 at an externally connected antenna.

Satellite modem 132 also produces and transmits an upstream RF output signal 2212. RF output signal 2212 may contain data received from a customer premises equipment (CPE) device 160 for transmission to the SMTS 310. As illustrated, cable modem chip 2224 includes one or more bi-directional interfaces to CPE device 160. The cable modem chip 2224 can perform MAC functions. In some embodiments, among other possibilities, these interfaces may include Ethernet, USB, FireWire (IEEE 1394), WiFi (IEEE 802.11x), and WiMAX (IEEE 802.16).

Satellite receiver 2208 receives RF input signal 2204 and prepares it for processing by cable modem adaptor 2216. In various embodiments, RF input signal 2204 carries frequency-modulated data. Satellite receiver 2208, for example, may filter and downconvert one or more frequency channels of RF input signal 2204 and present their data to cable modem adaptor 2216 for further processing. In some specific embodiments, satellite receiver 2208 delivers the filtered and downconverted data to cable modem adaptor 2216 using an MPEG-2 transport stream.

Cable modem adaptor 2216 interfaces with a cable modem chip 2224 and, in various embodiments, may convert signals at the physical transport level between satellite and cable formats. Cable modem chip 2224, for example, may be a terrestrial DOCSIS chip designed for use with a coaxial-based broadband access network. Advantageously, cable modem adaptor 2216 does not require cable modem chip 2224 to have specialized interfaces or to be modified for use with a satellite system. Instead, as part of satellite modem 132, cable modem adaptor 2216 provides standard signaling that can be processed directly by cable modem chip 2224. Thus, cable modem adaptor 2216 can easily be updated with new or different cable modem chips as technology improves.

The first digital to analog converter (DAC) 2220 is disposed between cable modem adaptor 2216 and cable modem chip 2224. DAC 2220 receives a downstream digitized signal from cable modem adaptor 2216 and converts it to an analog input signal suitable for use by cable modem chip 2224. Downstream processing is discussed further in connection with FIG. 23 below.

On the upstream processing side, cable modem adaptor 2216 receives a digitized representation of the output signal produced by cable modem chip 2224 from analog to digital converter (ADC) 2228 and converts it for use with a satellite system. In some embodiments, for example, the output signal produced by cable modem chip 2224 may include short bursts of data complying with the DOCSIS or WiMAX standards. Cable modem adaptor 2216 may receive this data, re-encode it for satellite transmission, and produce quadrature (I/Q) digital output signals. Further details about upstream processing are provided in connection with FIG. 24 below.

The second digital to analog converter (DAC) 2232 and quadrature modulator 2236 cooperate to remodulate the upstream output from cable modem adaptor 2216. DAC 2232 receives the digitized quadrature output signals (I/Q) from cable modem adaptor 2216 and produces an analog waveform corresponding to each signal at its output. Quadrature modulator 2236 receives the two analog waveforms produced by DAC 2232 and uses them to modulate an RF carrier. Modulated RF output signal 2212 can then be transmitted upstream to the SMTS 310 or gateway device. In this way, satellite modem 132 leverages the DOCSIS cable modem networking standard for satellite transmission.

Figure 23:
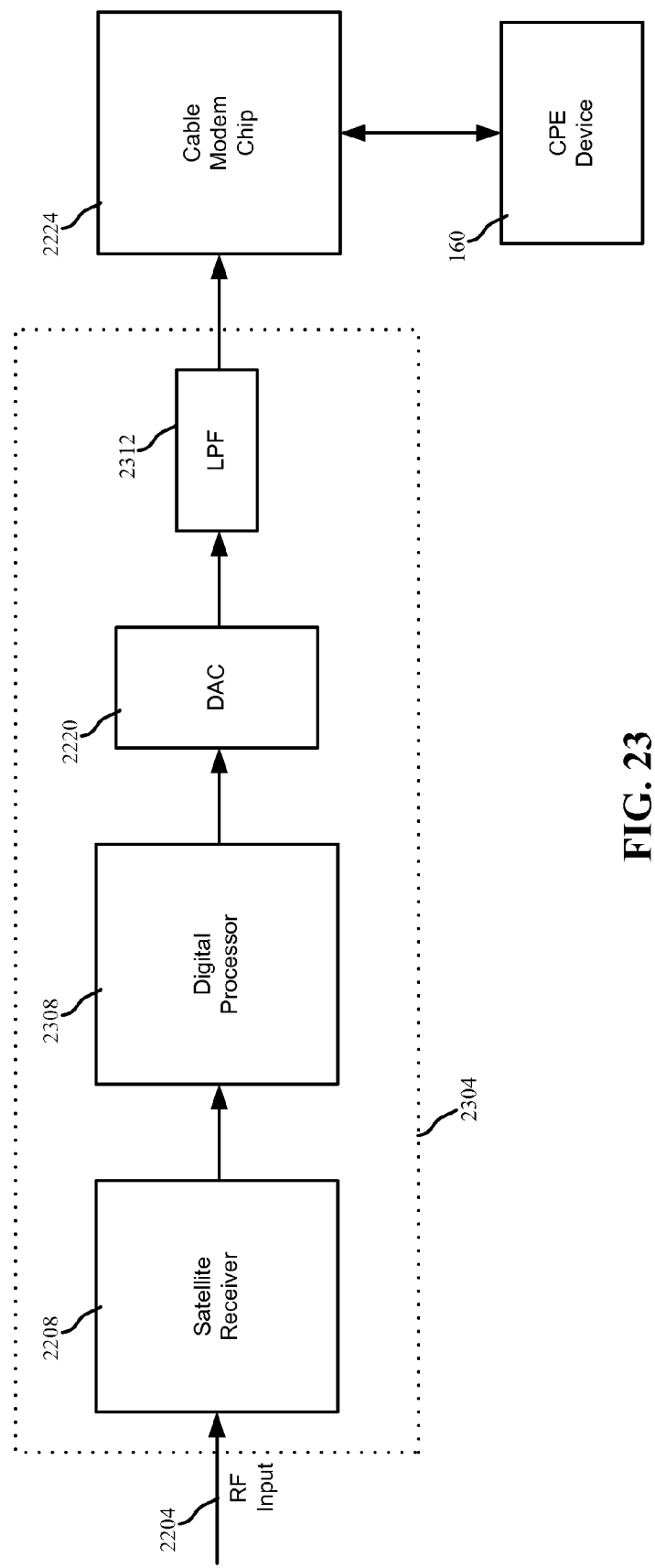
FIG. 23 depicts a block diagram of an embodiment of downstream processing of the subscriber terminal coupled to CPE.

FIG. 23 is a simplified block diagram depicting downstream processing according to one embodiment of subscriber terminal 130 coupled to CPE 160. As illustrated, RF input signal 2204 is received and processed before being delivered to cable modem chip 2224. Block 2304 represents one or more components that may be physically separated from cable modem chip 2224. Although described separately, it will be understood that one or more of the functional blocks may be integrated in a particular circuit or chip. Thus, for example, DAC 2220 may comprise a single-chip that also performs filtering and/or other signal-conditioning operations in addition to digital-to-analog conversion.

Satellite receiver 2208 receives RF input signal 2204 for downstream processing. As mentioned, RF input signal 2204 may be transmitted by an SMTS and may include frequency modulated data. Satellite receiver 2208 demodulates one or more of the frequency bands and may also perform error correction and resynchronization of the demodulated data. In some embodiments, satellite receiver 2208 produces an MPEG-2 transport stream from the demodulated data.

In further embodiments, satellite receiver 2208 produces multiple MPEG-2 transport streams corresponding to one or more demodulated sub-channels 1308. In this situation, satellite receiver 2208 may cooperate with digital processor 2308 to filter and rate limit the flow of data to match the input requirements of cable modem chip 2224.

Digital processor 2308 receives the output stream (or streams) from satellite receiver 2208 and converts it for use by cable modem chip 2224. For example, digital processor 2308 may convert the physical transport layer from a satellite format into a cable network format such as specified by the DOCSIS standard. In some embodiments, digital processor

2308 may be an application-specific integrated circuit (ASIC). Alternatively, digital processor 2308 may be a programmable logic device, such as a field programmable gate array (FPGA), or any number of other processing devices as known in the art.

In various embodiments, digital processor 2308 receives input of one or more MPEG-2 transport streams and processes them to produce one or more remodulated output signals. For example, digital processor 2308 may encode, interleave, map to symbols, filter, and remodulate the data in one or more transport streams before it is presented to cable modem chip 2224 for further processing. An optional packet filter may also be used to rate limit the flow of data to the cable modem chip 2224 allowing reduction of modulation complexity.

In some embodiments, MPEG-2 transport streams are processed, in part, according to ITU-T Recommendation J.83 (annexes A/B/C). Thus, in a specific embodiment, forward error correction is implemented with Reed-Solomon encoding, and protection against burst errors is achieved through the use of byte interleaving. The encoded and byte interleaved data may then be mapped to symbols, filtered using a square root raised cosine (SRRC) filter, and modulated using a 1024-QAM scheme. After remodulation processing has completed, the output signal may be sent to DAC 2220 for conversion to analog format and then filtered by low-pass filter (LPF) 2312 to remove high-frequency signal components. At this stage, cable modem chip 2224 can process the signal normally, unaware of the remodulation processing that was performed.

Figure 24:
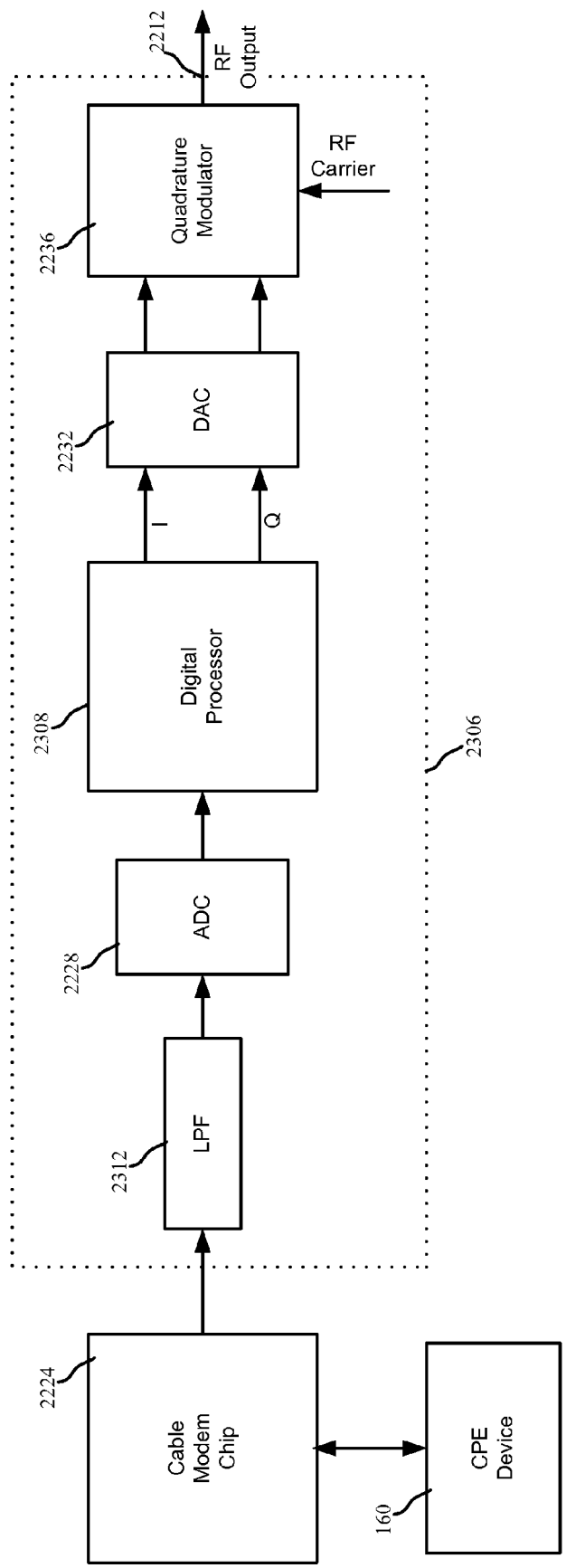
FIG. 24 depicts a block diagram of an embodiment of downstream processing of the subscriber terminal coupled to CPE.

FIG. 24 is a simplified block diagram depicting upstream processing according to one embodiment of satellite modem 132 and CPE 160. As illustrated, data from cable modem chip 2224 is processed for transmission with a satellite system. In block 2306, an upstream analog signal is received from cable modem chip 2224. The upstream signal, for example, may comprise one or more modulated carrier signals suitable for transmission over a coaxial-based broadband access network. For example, in some embodiments, these signals may include one or more 3.2 MHz frequency bands that are each centered at a frequency ranging from 5 MHz to 65 MHz. In addition, the output signal or signals from cable modem chip 2224 may be Reed-Solomon encoded, Trellis encoded, or not encoded and may appear as a continuous transmission or as transmission bursts.

One or more output signals from cable modem chip 2224 are filtered and digitized before being be presented to digital processor 2308. Thus, as illustrated, low-pass filter 2312 is applied to remove high-frequency components that may produce aliasing or otherwise degrade the signal when it is digitized. ADC 2228 digitizes the filtered analog signal and delivers its output to digital processor 2308.

Digital processor 2308 converts the signal for use in a satellite system. This may involve multiple processing steps that may depend upon the specific type of output received from cable modem chip 2224. Typically, cable modem chip 2224 produces DOCSIS compliant output including a physical PHY layer, MAC layer, and one or more higher-level networking layers. In some embodiments, digital processor 2308 converts the PHY layer for satellite transmission while preserving information in the higher networking layers thereby enabling DOCSIS conventions to be used in a satellite communication system 100.

In a specific embodiment, digital processor 2308 multiplies the digitized signal from ADC 2228 by a complex multiplier to develop in-phase and quadrature components. Digital processor 2308 may also contain logic for identifying the phase and correct sampling interval for the quadrature components. Predetermined symbols in the quadrature components may provide a reference point for identifying phase and sampling interval.

Once phase and timing have been established, digital processor 2308 may extract bytes from the quadrature components and reassemble them in a new physical transport. For example, this process may include one or more the following operations: removing existing framing information, preambles and error correction overhead, then processing the bytes for satellite transmission by turbo encoding the bytes, mapping the encoded bytes to appropriate symbols, prepending a new preamble, and applying one or more filtering stages.

After digital processor 2308 has converted the signal, it is remodulated and transmitted via the satellite network. As illustrated, DAC 2232 receives quadrature output signals (I/Q) from digital processor 2308 and converts them to corresponding analog waveforms. Quadrature modulator 2236 receives the analog waveforms and uses them to modulate an RF carrier, thereby producing RF output signal 2212.

Multi-User Detection in Satellite Return Link

Use of multi-user detection (MUD) to frequency-multiplexed satellite return link (scheduling algorithms, etc). One embodiment has one or more contention return sub-channels 2104. These can be used for bandwidth requests by subscriber terminals 130 or for other purposes. Processing of these upstream sub-channels can take into account multiple hypothesis to successfully receive two, four or more subscriber terminals 130 using the same sub-channel at overlapping times. Some embodiments could have times that a particular sub-channel allows contention and times that it does not according to a predetermined schedule.

MUD is a signal processing technique that allows multiple transmitters to share a single frequency simultaneously. MUD is implemented as a receiver process in the SMTS 310 that receives superimposed transmissions from subscriber terminals 130 and finds maximum likelihood decisions that are "jointly optimum." Finding the jointly optimum decision is superior to finding multiple individually optimum decisions. In short, MUD provides for an increase in system capacity by maximizing frequency reuse.

In one embodiment, MUD is implemented into the SMTS demodulators 628 to increase return channel 1304 capacity. In the satellite communications system 100, if an upstream contention sub-channel 2104 is designated a MUD frequency, signals received on this upstream contention sub-channel 2104 would be processed with MUD processing instead of normal processing. Depending on the number of upstream contention sub-channels 2104 desired per blade 624, the implementation may range from a piggyback card to an additional rack mountable chassis containing MUD processing for additional sub-channels 2104. MUD sub-channels 2104 can be configured as contention sub-channels 2104 or used on return sub-channels 1312 that would only have contention when a subscriber terminal 130 is not working properly and taking another's reserved channel time.

With reference to FIG. 21 again, an embodiment of a return channel 1304 is shown. This embodiment has five non-contention upstream return sub-channels 1312 and one that allows contention. The map to each subscriber terminal 130 can define use of non-contention return sub-channels 1312 and define which channels are contention sub-channels 2104. Contention sub-channels 2104 can be used at any time by a subscriber terminal 130. Coding and daterates may be adjusted for the upstream and contention return sub-channels 1312, 2104.

Table 8 shows how various subscriber terminals 130 could be instructed on use of a sub-channel contentiously or not.

The map could change periodically to redefine which subscriber terminals 130 can use which sub-channels contentiously. In this simple example, each channel is allowed to be contentious for three terminals, but all others are instructed that it is not and given mapped time slots.

TABLE 8

Sub-Channel Map for Use of Contention

| Terminal | Ch. 1 | Ch. 2 | Ch. 3 | Ch. 4 | Ch. 5 | Ch. 6 |
|---|---|---|---|---|---|---|
| 1 | Y | N | N | N | Y | Y |
| 2 | Y | Y | N | N | N | Y |
| 3 | Y | Y | Y | N | N | N |
| 4 | N | Y | Y | Y | N | N |
| 5 | N | N | Y | Y | Y | N |
| 6 | N | N | N | Y | Y | Y |

Since MUD allows successful overlap in sub-channel use, some subscriber terminals 130 could be instructed that a particular channel is not contentious and some told that it is contentious. Up to three could be instructed that a particular sub-channel allows contention while another is told that it is non-contentious without losing any information. The SMTS 310 knows how these assignments are done such that the MUD algorithm can be used or not in a particular situation. Further the amount of contenting subscriber terminals 130 possible can be used to let the MUD algorithm know the possible situations to consider.

Some embodiments could use knowledge of the possible contenting subscriber terminals 130 to further improve the MUD algorithm. Headers corresponding to the possible subscriber terminals 130 are known through the scheduling such that at least part of the possible data from each subscriber terminal 130 is known.

There may be times when no contention is used on the upstream sub-channels 1312. When dedicated return sub-channel 1312 for all subscriber terminals 130 is too burdensome, lossless assignment of sub-channels to allow contention is allowed. This allowance of contention can be incremental to reduce the different hypothesis to consider. Once lossless assignment is no longer possible because the MUD algorithm cannot handle more, the SMTS 310 can continue to add to subscribers allowed to use a sub-channel in a contentious mode. Where the MUD algorithm finds it cannot resolve the overlapping signals, that information would be lost, but could be retransmitted.

Multi-Rate Downstreaming in Multiple Sub-Channel Environment

Application of multi-rate downstreaming to a multiple sub-channel high-datarate single carrier downstream. The physical forward sub-channels 1308 can have different sizes, datarates and/or coding, all of which can change adaptively. Subscriber terminals 130 can be moved around from one physical forward sub-channel 1308 to another between superframes based upon loading, number of subscriber terminals 130, weather, and power consumption.

Referring back to FIGS. 16A and 16B, two different sub-channel schemes are shown. FIG. 16B allows for different sizes of the sub-channels 1308 and FIG. 16A allows changing the number of sub-channels 1308 in a superframe 1504. On top of this, the coding scheme used and datarate can change from frame-to-frame or even sub-channel-to-sub-channel. For example, the coding could be any of BPSK, QPSK, 8PSK, 16APSK, 32APSK and the datarate could vary from 250 Mbps to 2 Gbps.

Table 9 shows an embodiment of how things change between superframes 1504. In Table 9, coding, datarate and size for each sub-channel 1308 is shown for two superframes 1504. For example, the fourth sub-channel 1308-4 uses 32PSK coding at a 1 Gbps datarate for one-quarter of the superframe 1504, but then changes the datarate to 750 Kbps and leaves the coding and sub-channel size the same. A map of this could be sent to each subscriber terminal 130 for the whole superframe or sent on a particular sub-channel for that sub-channel only. Embodiments could avoid use of superframes 1504 using headers or status messages to denote the location of future sub-channels, their coding, modulation, datarate, and size.

TABLE 9

Sub-Channel Map (Coding, Datarate, Size)

| Sub-Channel | Superframe 1 | Superframe 2 |
|---|---|---|
| 1 | BPSK, 500 Kbps, ⅛ | QPSK, 500 Kbps, ½ |
| 2 | QPSK, 1 Gbps, ⅛ | QPSK, 1 Gbps, ⅛ |
| 3 | 16APSK, 1 Gbps, ½ | 16APSK, 1 Gbps, ⅛ |
| 4 | 32PSK, 1 Gbps, ¼ | 32PSK, 750 Kbps, ¼ |

The SMTS 310 is tracking the forward link quality and adjusting the coding, modulation, datarate and size dynamically using adaptive coding and modulation, for example. Tracking can be with knowledge of weather conditions from third-party sources, by tracking which service spot beams 205 are experiencing the most errors, by knowing the capabilities of each subscriber terminal 130, etc. The determinations can be based upon trends, past similar time periods and instantaneous observations.

Configuration messages are sent in each superframe 1504 and/or sub-channel 1308 to announce future changes. The subscriber terminals 130 receive the configuration messages and adapt accordingly. In other embodiments, autocorrelation is used to determine one or more of the coding, datarate, modulation and sub-channel size without forewarning.

The SMTS 310 can also adjust coding, modulation, datarate and size to reduce power consumption at the gateway 115 and/or subscriber terminals 130. When the need for bandwidth for subscriber terminals 130 is low, subscriber terminals 130 can be moved to a lesser amount of sub-channels 1308 and even leave some sub-channels 1308 vacant altogether. Vacant sub-channels 1308 would free up resources in the SMTS 310 that could be used for other purposes or could allow power saving modes.

The processing requirements for a sub-channel 1308 could be reduced by shrinking the size, using simpler coding and/or modulation and having lower datarates for those subscriber terminals 130 unlikely to require any bandwidth. As things changed, the sub-channels 1308 could also be reduced in size or number or subscribers could be moved to sub-channels more compatible with current needs.

There could be different subscriber terminals 130 with different capabilities deployed in the satellite communications system 100. Physical forward sub-channels 1308 could be assigned to accommodate the capabilities of a particular subscriber terminal 130. As new coding, modulation, daterates and sub-channel sizes become practical on new equipment, older subscriber terminals 130 could be programmed to avoid those sub-channels 1308.

Satellite System Optimization

Current satellite systems strive to cover a single country or defined geography completely either constantly or by moving beams. This invention intentionally only covers 50-90% of a country with service spot beams 205 (e.g., 50%, 60%, 70%, 75%, 80%, or 90% coverage) to provide broadband service. Feeder spot beams 225 may exist in the areas not covered with service spot beams in one variation. The service spot beams 205 could be generally directed at underserved or unserved areas, but not covering both completely. In one variation, areas of the country with high-bandwidth needs are targeted (i.e., underserved). The bandwidth for the underserved area is higher than other satellite systems covering that area. In another variation, areas of the country with no or spotty coverage are targeted (i.e., unserved). In one variation, the satellite communication system 100 is limited to two-way consumer satellite broadband service.

Referring once again to FIG. 2A, an example of where service spot beams 205 only cover a portion of the country and feeder spot beams 225 cover non-overlapping areas is shown. FIG. 2B allows some overlap. In any event, the satellite 105 cannot cover the entire country with service spot beams 205. Indeed, only 50%, 60%, 70%, 75%, 80%, or 90% can be covered in various embodiments. One embodiment allows moving the service spot beams 205 infrequently or not at all. In any event, the service spot beams are not moved dynamically, to provide country coverage of more than 50%, 60%, 70%, 75%, 80%, or 90%. This less-than-full coverage design is achieved on the satellite communications system 100 described elsewhere in this application. In some embodiments, the geographic region is a governmental boundary within a country or a group of countries.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A satellite modem for communicating with a satellite, the satellite modem comprising:
 a satellite receiver configured to receive a receive satellite signal;
 a satellite transmitter configured to transmit a transmit satellite signal;
 a terrestrial cable modem including a circuit for media access control; and
 an adapter communicatively coupled with the satellite receiver, the satellite transmitter and the terrestrial cable modem circuit for media access control, and the adapter being configured to:
  filter a sub-channel of information from a signal from the satellite receiver for further processing,
  translate signaling and/or protocol between the satellite receiver and the terrestrial cable modem, and
  translate signaling and/or protocol between the terrestrial cable modem and the satellite transmitter.

2. The satellite modem according to claim 1, wherein the terrestrial cable modem circuit is configured to communicate with a wired cable plant.

3. The satellite modem according to claim 1, wherein the terrestrial cable modem circuit is configured to receive an analog signal from the adapter that is not used in reception of a satellite signal.

4. The satellite modem according to claim 1, wherein the terrestrial cable modem circuit is configured to transmit an analog signal from the adapter that is not used in transmission of a satellite signal.

5. The satellite modem according to claim 1, wherein the adapter is configured to remodulate digital information received from the satellite link and couples the remodulated digital information to the terrestrial cable modem circuit.

6. The satellite modem according to claim 1, wherein the adapter is configured to demodulate a signal received from the terrestrial cable modem circuit and remodulates the signal for the satellite link.

7. The satellite modem according to claim 1, wherein the terrestrial cable modem circuit is an off-the-shelf circuit chip.

8. The satellite modem according to claim 1, wherein the terrestrial cable modem circuit is configured to operate operates according to a Data Over Cable Service Interface Specifications (DOCSIS) standard.

9. The satellite modem according to claim 1, wherein the terrestrial cable modem circuit is configured to operate according to a World Interoperability for Microwave Access (WiMAX) standard.

10. A satellite modem for communicating with a satellite, the satellite modem comprising:
    a satellite receiver configured to receive a receive satellite signal;
    a satellite transmitter configured to transmit a transmit satellite signal;
    a terrestrial modem; and
    means, communicatively coupled with the satellite receiver, the satellite transmitter and the terrestrial cable modem, for:
        filtering a sub-channel of information from a signal from the satellite receiver for further processing,
        translating signaling and/or protocol between the satellite receiver and the terrestrial cable modem, and
        translating signaling and/or protocol between the terrestrial cable modem and the satellite transmitter.

11. The satellite modem according to claim 10, wherein the terrestrial cable modem is configured to communicate with a wired cable plant.

12. The satellite modem according to claim 10, wherein the terrestrial cable modem is configured to receive an analog signal that is not used in reception of a satellite signal.

13. The satellite modem according to claim 10, wherein the terrestrial cable modem is configured to transmit an analog signal that is not used in transmission of a satellite signal.

14. The satellite modem according to claim 10, wherein the means is further for remodulating digital information received from the satellite link and coupling the remodulated digital information to the terrestrial cable modem.

15. The satellite modem according to claim 10, wherein the means is further for demodulating a signal received from the terrestrial cable modem and remodulating the signal for the satellite link.

16. The satellite modem according to claim 10, wherein the terrestrial cable modem is an off-the-shelf circuit.

17. The satellite modem according to claim 10, wherein the terrestrial cable modem is configured to operate according to a Data Over Cable Service Interface Specifications (DOCSIS) standard.

18. The satellite modem according to claim 10, wherein the terrestrial cable modem is configured to operate according to a World Interoperability for Microwave Access (WiMAX) standard.

19. The satellite modem according to claim 10, wherein the terrestrial cable modem is configured to perform media access control.

20. A method for receiving information from a satellite, the method comprising:
    receiving at a satellite receiver a satellite signal, the satellite signal being:
        coupled to an antenna, and
        received from a satellite;
    processing the satellite signal to produce a data stream from information sent over the satellite link;
    filtering a sub-channel of the data stream to form a filtered data stream; and
    delivering the filtered data stream to a terrestrial cable modem circuit for media access control.

21. The method according to claim 20, further comprising encapsulating the filtered data stream into an MPEG-2 transport stream for the terrestrial cable modem.

22. The method according to claim 20, wherein the media access control to further filter the filtered data stream.

23. The method according to claim 20, further comprising:
    remodulating the filtered data stream with an analog carrier; and
    coupling the analog carrier to the terrestrial cable modem.

24. The method according to claim 20, wherein the receive satellite signal uses a single carrier.

* * * * *